(12) United States Patent
Graves

(10) Patent No.: US 9,860,615 B2
(45) Date of Patent: Jan. 2, 2018

(54) SYSTEM AND METHOD FOR PHOTONIC SWITCHING

(71) Applicant: Huawei Technologies Co., Ltd., Shenzhen (CN)

(72) Inventor: Alan Frank Graves, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 14/712,295

(22) Filed: May 14, 2015

(65) Prior Publication Data

US 2016/0337724 A1 Nov. 17, 2016

(51) Int. Cl.
*H04J 14/00* (2006.01)
*H04Q 11/00* (2006.01)

(52) U.S. Cl.
CPC ..... *H04Q 11/0003* (2013.01); *H04Q 11/0005* (2013.01); *H04Q 2011/005* (2013.01); *H04Q 2011/0045* (2013.01)

(58) Field of Classification Search
CPC ........... H04Q 11/0001; H04Q 11/0003; H04Q 11/0005; H04Q 2011/0045; H04Q 2011/005; H04Q 2011/0024; H04L 45/74; H04L 47/32; H04L 49/10; H04L 49/9042
USPC ......... 398/45, 51, 54, 49, 50, 46, 48, 52, 56
See application file for complete search history.

(56) References Cited

U.S. PATENT DOCUMENTS

| | | | |
|---|---|---|---|
| 7,369,555 B2 | 5/2008 | Jarl | |
| 8,971,321 B2 * | 3/2015 | Graves | H04Q 11/0005 370/389 |
| 9,282,384 B1 * | 3/2016 | Graves | H04Q 11/0005 |
| 9,584,885 B2 * | 2/2017 | Mehrvar | H04Q 11/0005 |
| 9,654,849 B2 * | 5/2017 | Graves | H04Q 11/0003 |
| 9,654,853 B2 | 5/2017 | Mehrvar et al. | |
| 9,661,405 B2 * | 5/2017 | Mehrvar | H04L 49/356 |
| 2002/0101919 A1 * | 8/2002 | Takada | H04L 25/0262 375/225 |
| 2002/0191250 A1 * | 12/2002 | Graves | H04Q 11/0066 398/82 |

(Continued)

FOREIGN PATENT DOCUMENTS

| | | |
|---|---|---|
| CN | 101035066 A | 9/2007 |
| JP | 2001326687 A | 11/2001 |

(Continued)

OTHER PUBLICATIONS

Benson, T., et al., "Understanding Data Center Traffic Characteristics," WREN '09, Barcelona, Spain, Aug. 21, 2009, 8 pgs.

(Continued)

*Primary Examiner* — Hibret Woldekidan
(74) *Attorney, Agent, or Firm* — Slater Matsil, LLP

(57) ABSTRACT

A method includes obtaining a first packet, where the first packet has a length and comparing the length of the first packet to a length threshold. The method also includes when the length of the first packet is greater than or equal to the length threshold, placing the first packet in a long packet container and transmitting the long packet container to a first photonic switch and when the length of the first packet is less than the length threshold, placing the first packet in a first short packet container and transmitting the first short packet container to a second photonic switch.

28 Claims, 34 Drawing Sheets

(56) References Cited

U.S. PATENT DOCUMENTS

| | | | | |
|---|---|---|---|---|
| 2003/0026262 A1* | 2/2003 | Jarl | ............... | H04L 12/5601 370/394 |
| 2006/0165416 A1* | 7/2006 | Moursund | ......... | H04B 10/1125 398/135 |
| 2009/0168723 A1* | 7/2009 | Meylan | ............ | H04L 1/1841 370/331 |
| 2012/0051747 A1* | 3/2012 | Haran | ............... | H04L 47/13 398/58 |
| 2013/0229916 A1* | 9/2013 | Isobe | ................ | H04L 1/1854 370/230 |
| 2014/0269351 A1* | 9/2014 | Graves | ............. | H04L 49/10 370/250 |
| 2014/0334818 A1* | 11/2014 | Mehrvar | ......... | H04Q 11/0066 398/51 |
| 2014/0334819 A1* | 11/2014 | Mehrvar | ......... | H04Q 11/0003 398/51 |
| 2014/0355977 A1 | 12/2014 | Bjornstad et al. | | |
| 2015/0263945 A1 | 9/2015 | Blessing et al. | | |
| 2015/0289035 A1 | 10/2015 | Mehrvar et al. | | |
| 2016/0044393 A1* | 2/2016 | Graves | ............. | H04Q 11/0003 398/51 |
| 2016/0334575 A1 | 11/2016 | Graves et al. | | |
| 2016/0337723 A1* | 11/2016 | Graves | ............. | H04Q 11/0003 |
| 2016/0337725 A1* | 11/2016 | Graves | ............. | H04Q 11/0005 |
| 2016/0337731 A1 | 11/2016 | Graves | | |

FOREIGN PATENT DOCUMENTS

| | | |
|---|---|---|
| WO | 2014120203 A1 | 8/2014 |
| WO | 2014139438 A1 | 9/2014 |
| WO | 2014183126 A1 | 11/2014 |

OTHER PUBLICATIONS

Bernier, et al. "A Hybrid Photonic-Electronic Switching Architecture for Next Generation Datacenters," © 2015.

* cited by examiner

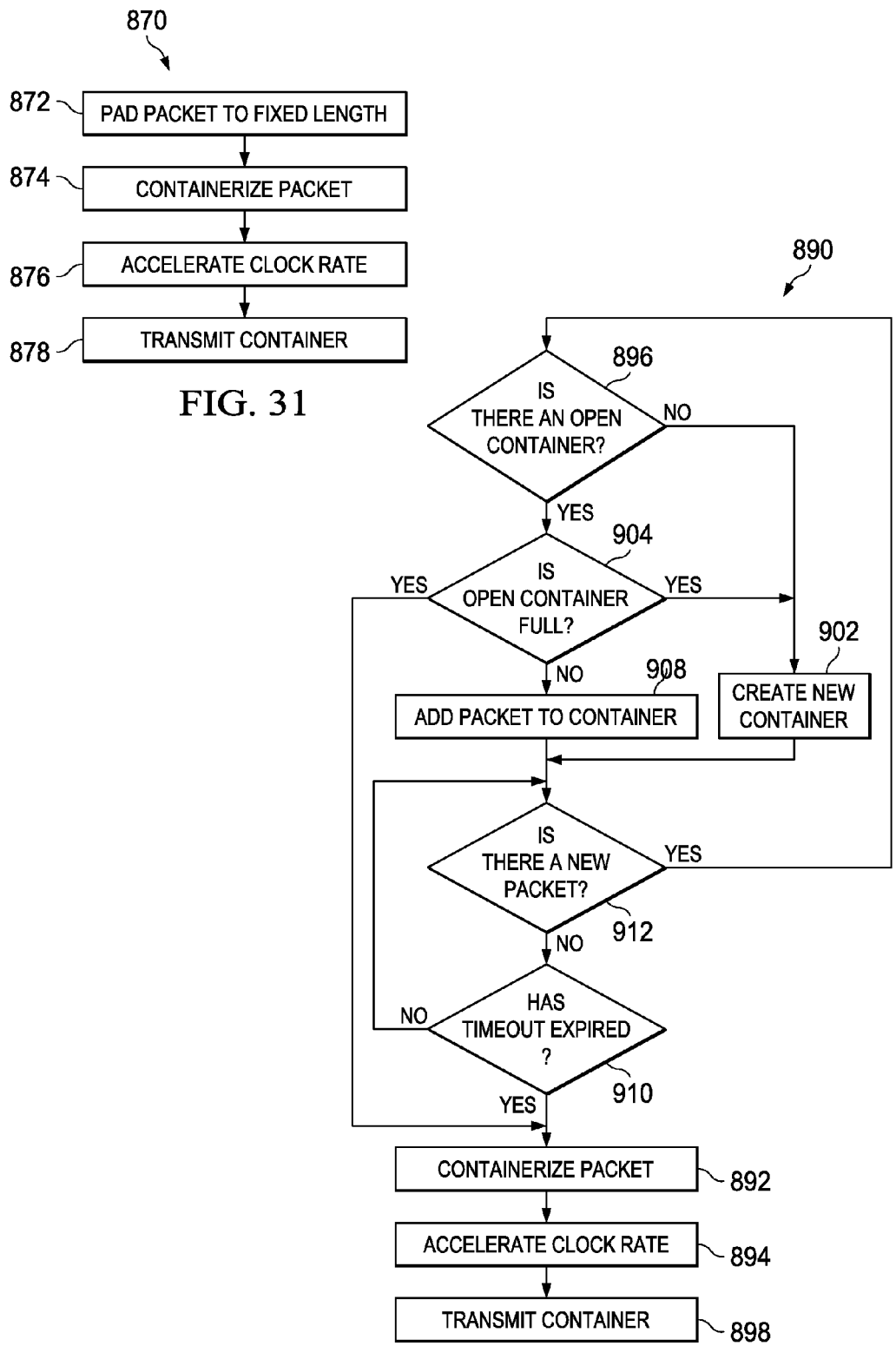

SYSTEM AND METHOD FOR PHOTONIC SWITCHING

TECHNICAL FIELD

The present invention relates to a system and method for photonics, and, in particular, to a system and method for photonic switching.

BACKGROUND

Data centers route massive quantities of data. Currently, data centers may have a throughput of 5-10 terabytes per second, which is expected to increase in the future. Data centers contain huge numbers of racks of servers, racks of storage devices, and other racks often with top-of-rack (TOR) switches, which are interconnected via massive centralized packet switching resources. In data centers, electrical packet switches are used to route data. However, electrical packet switches have capacity limitations. To overcome those capacity limitations, it may be desirable to use an optical packet switch in a data center.

Optical burst mode switches collect batches of packets from each source TOR which are destined for the same destination TOR across a switch and map them into a multi-packet container or burst of data, which are transmitted across the switch. These containers may be many times the length of the longest packets. Burst mode switches work well when the per-destination packet rate is high, because the containers fill rapidly, even with a short container timeout. However, when a burst mode switch is used within a data center for switching between top of rack (TOR) switches, the traffic may be fragmented, and containers may be slow to fill. This may lead to a long fill period for some containers, with a long-timeout period, which may introduce delay and/or containers timing out, causing partially filled or almost empty containers to be transmitted, which may significantly reduce bandwidth efficiency and traffic data throughput.

SUMMARY

An embodiment method includes obtaining a first packet, where the first packet has a length and comparing the length of the first packet to a length threshold. The method also includes when the length of the first packet is greater than or equal to the length threshold, placing the first packet in a long packet container and transmitting the long packet container to a first photonic switch and when the length of the first packet is less than the length threshold, placing the first packet in a first short packet container and transmitting the first short packet container to a second photonic switch.

An embodiment method includes receiving, from a first photonic switch, a short packet container and extracting a first packet from the short packet container. The method also includes receiving, from a second photonic switch, a long packet container and extracting a second packet from the long packet container. Additionally, the method includes combining the first packet and the second packet to produce a packet stream.

An embodiment system includes a packet splitter configured to receive an input packet stream and split the input packet stream into a first subset of packets in a short packet stream and a second subset of packets in a long packet stream, where packets of the short packet stream have lengths less than a length threshold and packets of the long packet stream have lengths greater than or equal to the length threshold. The system also includes a first photonic switch optically coupled to the packet splitter, where the first photonic switch is configured to switch the short packet stream and a second photonic switch optically coupled to the packet splitter, where the second photonic switch is configured to switch the long packet stream.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following description taken in conjunction with the accompanying drawings, in which:

FIG. 31 illustrates a flowchart of an embodiment method of containerizing long packets;

FIG. 32 illustrates a flowchart of an embodiment method of containerizing short packets;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
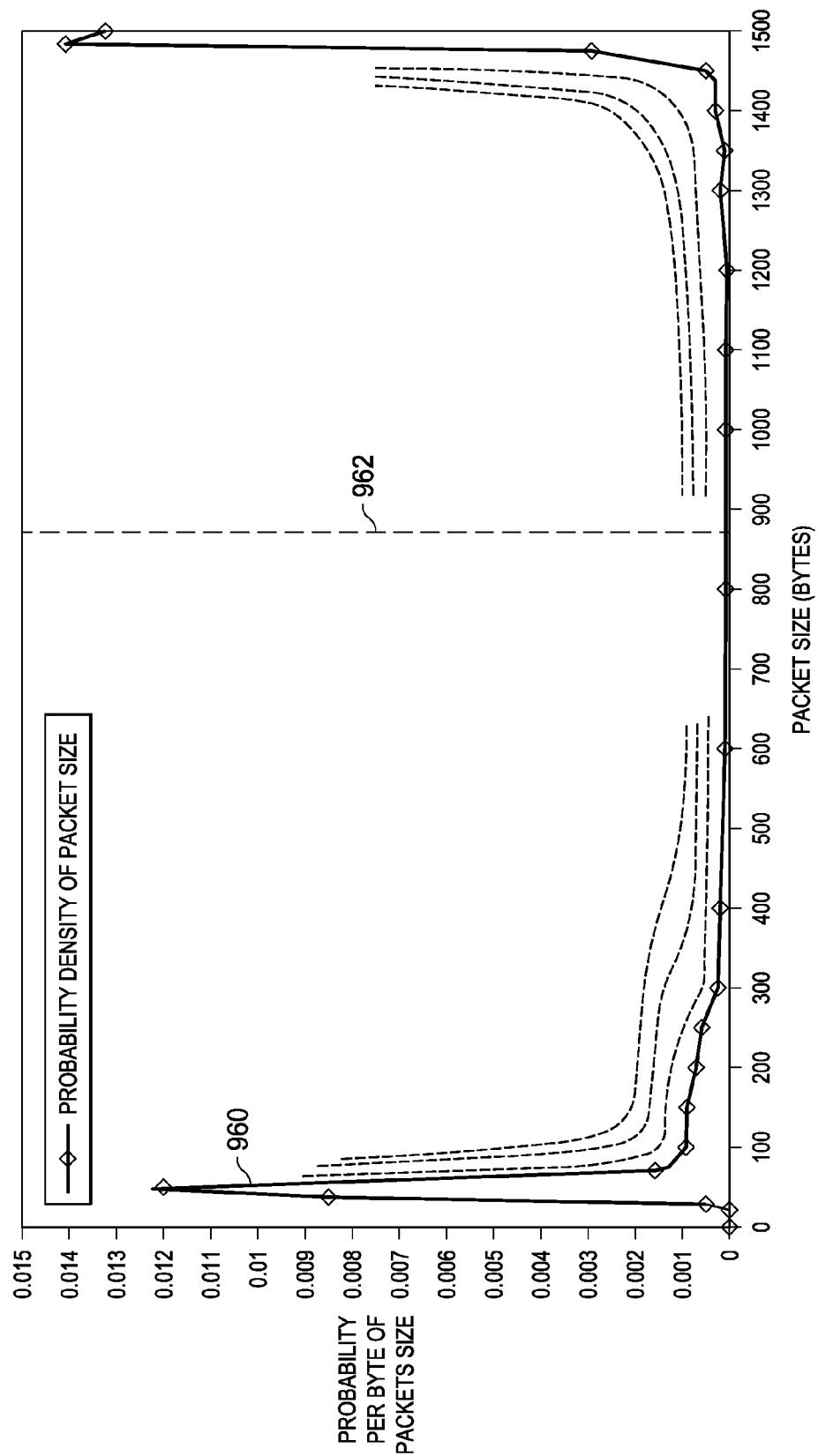
FIG. 1 illustrates a graph of the distribution of packet size in a data center.

An embodiment photonic packet switching system splits incoming packets for a particular destination into two streams based on a threshold packet length, which may be pre-set, adjustable, or dynamic. For packets having a maximum length of 1500 bytes, the threshold may be between about 400 bytes and about 1000 bytes. The data packet length for traffic in a data center may be bimodal, with many packets at or close to the maximum packet length, and many packets having a very small packet size. FIG. 1 illustrates a graph of the bimodal distribution of traffic based on measurements on a data center. Curve 960 shows the distribution of data, and line 962 shows the threshold between long packets and short packets. The threshold may be varied from system to system or dynamically based on traffic. Packets may be separated by size for different treatment of long packets and short packets.

Because, in the bimodal packet density distribution of packet length, the portion of the distribution above the threshold length is dominated by packets close to the maximum length, and the portion of the distribution below the threshold length is dominated by packets at close to the minimum length, it is desirable for the two sets of packet lengths to be handled differently. When the packet stream is dominated by the longest packets with a low probability of shorter packets, individual fixed length containers matched in payload capacity to the longest packets may be used. This works well, because the longest length packets dominate the distribution, and the shorter packets may be padded out to fill the container with good overall efficiency, because the rate of occurrence of these packets is low. Packets below the threshold are dominated by the shortest packets. The short packets may be assembled into multi-packet containers with short durations (for example from about 30 ns to about 120 ns). This reduces the container filling delay and the bandwidth/bus capacity expansion for unfilled containers. Thus, the packets above the threshold are individually padded out to the length of a maximum length packet and encapsulated in a fixed length container, with one packet per container. The long packets are switched as individual packets, for example by a large port count space switch operating at 100 Gb/s per port, with a frame time of around 100 ns to around 120 ns, or a 40 Gb/s per port rate with a frame time of around 250 ns to around 300 ns. The packets above the threshold make up about 85% to about 95% of the total bandwidth depending on the threshold (although a smaller percentage of the number of packets). The short packets are mapped in containers which may be the same length as the long containers, for use with a shared common switch, or by a different photonic switch. In another example, the short packet container is smaller than the long packet container, and the short packet containers are switched by an ultrafast photonic switch. The short packets are mapped to containers with multiple packets per container. The multi-packet containers only carry about 5% to about 15% of the bandwidth (although a larger percentage of the number of packets).

An ultra-fast photonic switch with a limited port count may be used to switch the short packet stream. A direct matrixed single stage photonic switch may be used, which has direct addressing. Short containers with small payloads may be switched. The container length may be reduced to carry one of the longest packets, for example 48 ns for a 600 byte threshold at 100 Gb/s. This may be further reduced by using concatenation, for example to 30 ns or less, which increases the container supply and reduces the wasted container bandwidth from single packet payloads.

Figure 2:
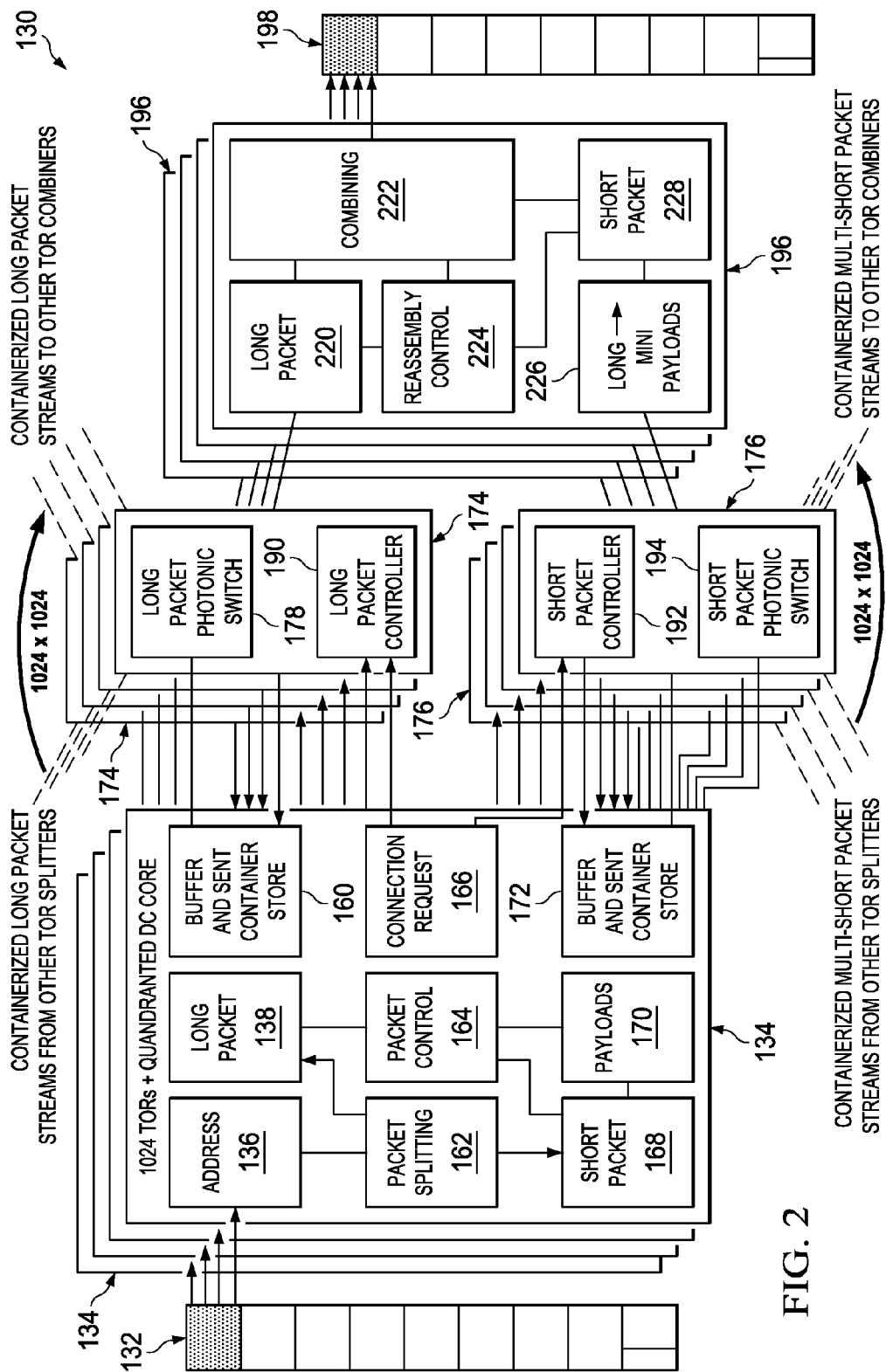
FIG. 2 illustrates an embodiment system with two photonic switches.

FIG. 2 illustrates photonic switch 130 for switching optical packets by separate photonic switch fabrics. Long packets and short packets are assembled into similarly sized containers. With 1024 quad-output top of rack switches (TORs), four 1024×1024 long packet photonic switches and a companion set of four 1024×1024 short packet photonic switches are used in a quadranted architecture. Packets are transmitted by TORs 132 to the packet splitters 134, where the packets are separated into two streams of packets, one containing packets above a length threshold and one containing packets at or below the length threshold. The packet splitters are shown in FIG. 2 as being separate from the TORs, but may be integrated into the TORs. At the input side of the peripherals, the packet splitters create two streams of conditioned packet containers, where the containers in each stream are destined for a peripheral destination TOR on the output side of the switch in the packet combiners. The packet combiners, which are also pictured as stand-alone devices, but may be integrated into the destination TORs, receive incoming short packet containers and long packet containers from all source peripherals destined for that destination, and reassemble the packet flows from the two paths using packet sequence integrity to correctly reconstitute each packet stream, which is then passed into the rest of the TOR. This facilitates large port count fast synchronous photonic switches to switch both streams, for thousands of 100 Gb/s ports. For example, a 4096×4096 port photonic switch with a throughput capacity of 400 Tb/s, and four such switches, could be used as quadrant switch in a flat (non-hierarchical) data center core with a total throughput of 1.6 Petabits/second ($1.6 \times 10^{15}$ bits/sec.).

The arrival of a packet at the input of the packet splitter 134 indicates that either a new long packet container is needed or that a new short packet container may be needed, for example when an unfilled non-timed-out container to the same destination is not already in existence. The destination TOR address of a packet and the packet length are determined in address module 136 in packet splitters 134. There may be one packet splitter per source TOR. In one example, the destination TOR address and packet length are determined based on the packet header. In another example, the packet splitter is integrated in the source TORs, and the destination TOR address and packet length are known. The packet length, address, and packet are sent to splitting block 162.

The packets are separated into a long packet stream and a short packet stream by splitting block 162, by comparing the packet length to the threshold. Packets with a length above the threshold are classified as long packets, while packets with a length less than or equal to the threshold are classified as short packets. A sequence number is assigned to the packet at the source TOR, for reassembly of the packet order for flows to each specific destination TOR from each source TOR. Short packets are directed to short packet block 168, while long packets are directed to long packet block 138. In long packet block 138, long packets are containerized, with one packet placed in the payload, which is padded out to have a predetermined packet length that may correspond to the maximum packet length, before becoming associated with a container. The container may contain the TOR-to-TOR addressing information, although this is not used in the intervening photonic switches. The addressing information includes the source TOR address and destination TOR address, the actual packet length which is used for removing the padding in the packet combiner, a cyclic redundancy check (CRC) over the container, and a sequence number, which is used for correctly packet-order sequencing the source TOR-specific data flows in the packet combiner.

Also, the containers are accelerated. The container clock rate is higher than the input clock length. The inter-container gap (ICG) or inter-packet gap (IPG) may be increased by time-compressing the container to allow time for the switch to be reconfigured between the end of one container and the start of the next container, and to account for skew (differences in delay). Acceleration may also be applied, because the incidence of some bursts of shorter than maximum length packets may cause a transient increase in container rate, which is smoothed to a small steady increase by use of buffering Despite the system being loop timed and designed to minimize path length differences, there may be residual skew between the packet splitter and the photonic switch, and in the photonic switch between switch stages. The destination address is passed to connection request module 166 to set up the long packet switch connection.

When the need for a new long packet container is established, a connection request is transmitted by connection request module 166 to long packet photonic switch controller 190, in long packet photonic switching fabric 174, which sets up the switch connections in long packet photonic switch 178 in parallel with formatting, packing, containerizing and accelerating the packet in its container.

After sufficient time for the connection to be set up, the long container is transmitted to long packet photonic switch 178 for switching to the destination, after rate smoothing from buffer and sent container store 160. An output gating function may temporarily halt the container flow, causing the buffers to fill, or to cause a dummy container in the flow to be overwritten. Dummy containers are containers with no traffic payload which may be used for various purposes, such as padding out streams under light traffic conditions to avoid buffer under-flow, carrying maintenance messages, or for purposes such as optical link calibration and timing calibration as background tasks. Long packet photonic switch 178 may be a three stage highly dilated Clos photonic switch or a matrixed photonic switch. The long packet container is also written to the storage component of the buffer and sent container store 160. If an ACK is received, indicating that the connection has been established, the copy of the container is deleted from the sent container store. If a NACK is received, the stored container is marked for retransmission.

Some of the containers in the container flow are not valid traffic containers. When packet splitter 134 does not have any long packet arriving and waiting for the containerization process, the packet splitter may insert a dummy container into the flow. The dummy container is passed to packet switch 178 as part of the normal flow. The switch may discard the dummy container. When a dummy container is generated, it is noted by the controller of the output gating. The gate controller also tracks whether the sent container store is holding a container ready for retransmission. When the dummy container is initiated, a connection request for a new connection for a container in the sent container store is initiated. When there is not a container ready for retransmission, the dummy container may be routed to a destination TOR, for example to the destination TOR which has not been communicated with for the longest to refine the calibration of the optical links through the switch to that TOR, to avoid a protracted training cycle on the front end of every traffic container.

Short containers are mapped into payloads which may carry multiple packets in short packet block 168. The short packet containers are transmitted when they are full or when a time period (the time-out) expires. A timer is triggered by the creation of a new short packet container for a destination which does not already have an open container. The containers are assembled in payload module 170. At the time the container is opened, a request for a container destination connection in a future frame is sent to short packet photonic switch controller 192 in short packet photonic switching fabric 176 from connection request module 166 to set up a connection in short packet photonic switch 194 for the container.

When the container is full or the timer expires, rate smoothing from buffer and sent container store 172 is performed. Then, the container is transmitted to short packet photonic switch 194 for switching to the destination. A copy of the sent short packet container is saved in the storage component of the buffer and sent container store 172. If an ACK is received, the copy of the sent container is discarded. If a NACK is received, the stored container is marked for retransmission.

Packet control module 164 coordinates the long and short packet transmissions.

The two packet streams are switched by long packet photonic switch 178 and short packet photonic switch 194, respectively. In one example, separate switches are used. Alternatively, different ports on a single switch may be used. The switched containers are directed to packet combiners 196. There may be one packet combiner per destination TOR.

Long packet containers are received by long packet block 220. The long packet container is deconstructed, and the padding is removed using the padding length indicator. The packet destination address is read to confirm that the container has been delivered to the correct TOR, and the packet source address and sequence number are read from the container overhead. The packets, along with the source address and sequence number, are written into the software defined buffer based on the source address.

Short packets are received by payload module 226. The short packet payloads are extracted from the container.

Then, in short packet module 228, the short packets are de-containerized. The short packet containers are deconstructed, and the pointer information is read to extract the mini-containers, which include the packets and their sequence numbers. The transport container source and destination addresses are read and the destination address is used to validate that the container has been correctly delivered. The source address is associated with each mini-container. The mini-containers are deconstructed, and the packets, along with the source address and sequence number, are written into the software defined buffer based on the source address. The software definition facilitates buffers being created within zones of large shared memory. The software defined buffer has reserved spots for each sequence number for each stream. In combining module 222, the long packet stream and the short packet stream are combined based on the sequence numbers. This is controlled by reassembly controller 224. The sequences of short and long packets from the source TORs are adaptively interleaved by ordering the sequence numbers to recreate the original packet stream from each source TOR. The buffers for each stream are read out in sequence number order, where the sequence numbers represent the original order of the containers. When the buffers reach a specified fill level and there are no gaps in sequence numbers, the buffer is read out in sequence order. When there is a gap in the sequence number, the packet combiner knows it is missing a container, and may request the retransmission of a missing container. Reading out of the buffer may be done by a variety of methods, including round robin, or other approaches more responsive to the fill level. The output flow is assembled from all of the specific source related buffers. Because the individual buffers were read in strict packet sequence order without gapping in the sequence, the individual flows are packed in the same order as they entered the packet splitter. Thus, packet sequence integrity within each TOR-to-TOR flow can be maintained.

Finally, the combined packet streams are directed to destination TORs 198.

The long packet photonic switch and short packet photonic switch have the same port count, because they both have one input per source TOR and one output per destination TOR. However, the long packet photonic switch carries between about 85% and about 95% of the load with normal to peak traffic, and a somewhat smaller share of the load at lower loads. The short packet traffic falls off more gradually than the long packet traffic at low traffic loads due to background processes in the data center. The short packet photonic switch carries between about 5% and about 15% of the load at normal to high traffic levels, and a somewhat larger share of the load (but not an increased absolute level of short packet traffic) at lower traffic levels. There is a modest headroom or margin in the long packet photonic switch, which may allow a relaxation of the acceleration to compensate for bursts or groups of shorter long packets. For the short packet switch, there may be a capacity to accommodate a growth of about 6.67:1 to about 20:1 in peak used bandwidth, depending on the threshold. When this level is not exceeded, the short packet switch will not saturate.

On the long packet path, packets shorter than full length long packets may arrive in bursts, where the packet arrival rate is greater than a steady stream of full length packets. For examples, when 1500 byte packets arrive at a rate of one packet ever 120 ns for 100 Gb/s operation, 1000 byte packets may arrive at a rate of one packet every 80 ns. Short bursts of shorter than full length long packets may cause a significant transient increase in the bit rate when these packets are padded out to 1500 bytes. This significantly increases the clock rate, but may be reduced to a smaller clock rate increase when the packets are first-in first-out buffered in a packet buffer, which may have a capacity between about 16 packets and about 40 packets. Additional details on clock rate changes are further discussed in U.S. patent application Ser. No. 14/455,034 filed on Aug. 8, 2014, and entitled "System and Method for Photonic Network," which this application incorporates hereby by reference.

Figure 3:
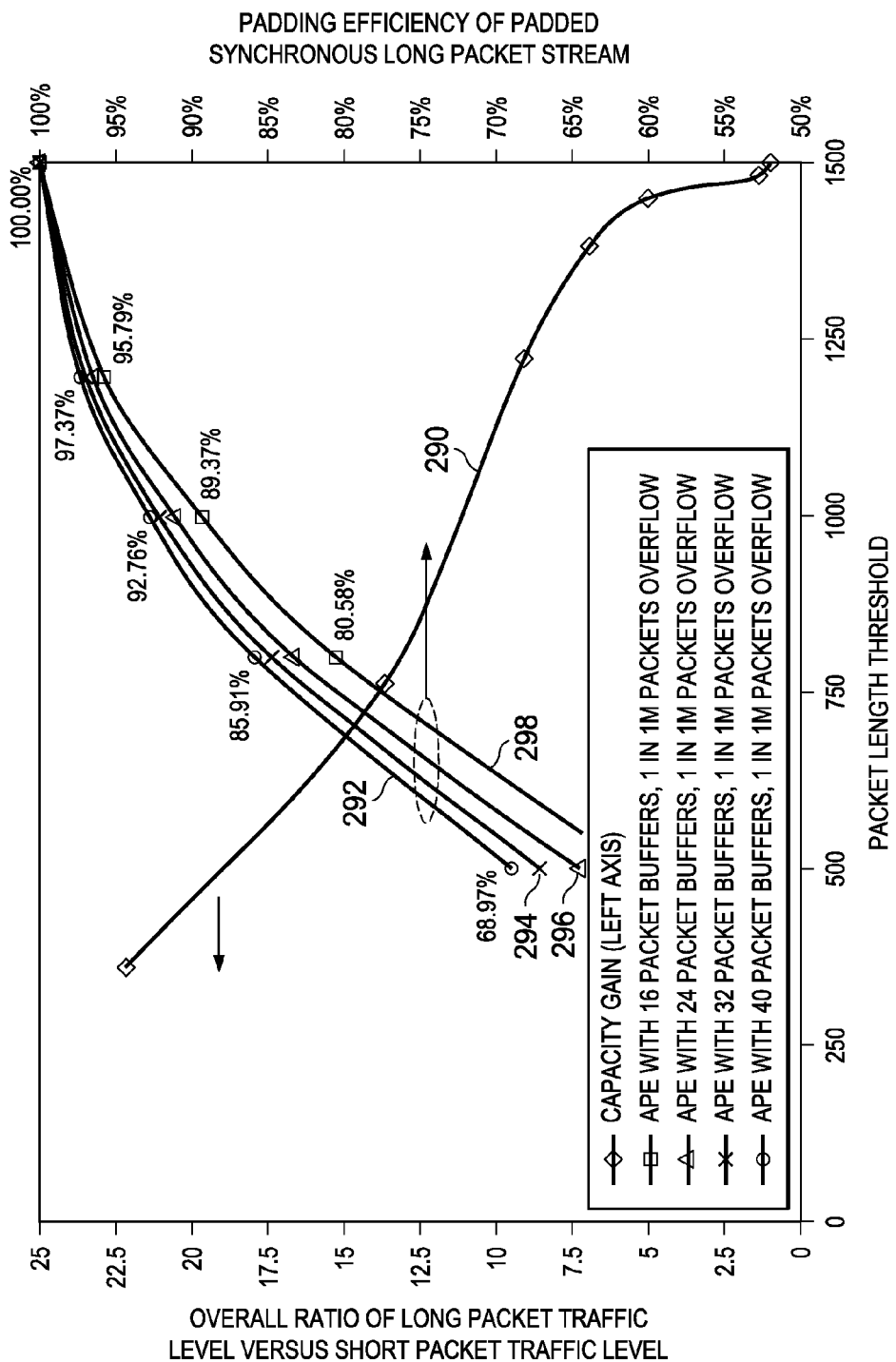
FIG. 3 illustrates a graph of overall node capacity gain versus packet length threshold.

FIG. 3 shows the overall node ratio of long packet traffic to short packet traffic capacities and synchronous circuit switching packet padding efficiency versus packet length threshold for a one in 1,000,000 probability of buffer overflow. The padding efficiency is equal to the reciprocal of the clock rate increase. A padding efficiency of 80% has a clock rate acceleration of 125%, and a padding efficiency of 90% has a clock rate acceleration of 111%. Curve 290 shows the capacity gain as a function of the packet length threshold. Curve 292 shows the padding efficiency with 40 packet buffers, curve 294 shows the padding efficiency with 32 packet buffers, curve 296 shows the padding efficiency with 24 packet buffers, and curve 298 shows the padding efficiency with 16 packet buffers.

Figure 4:
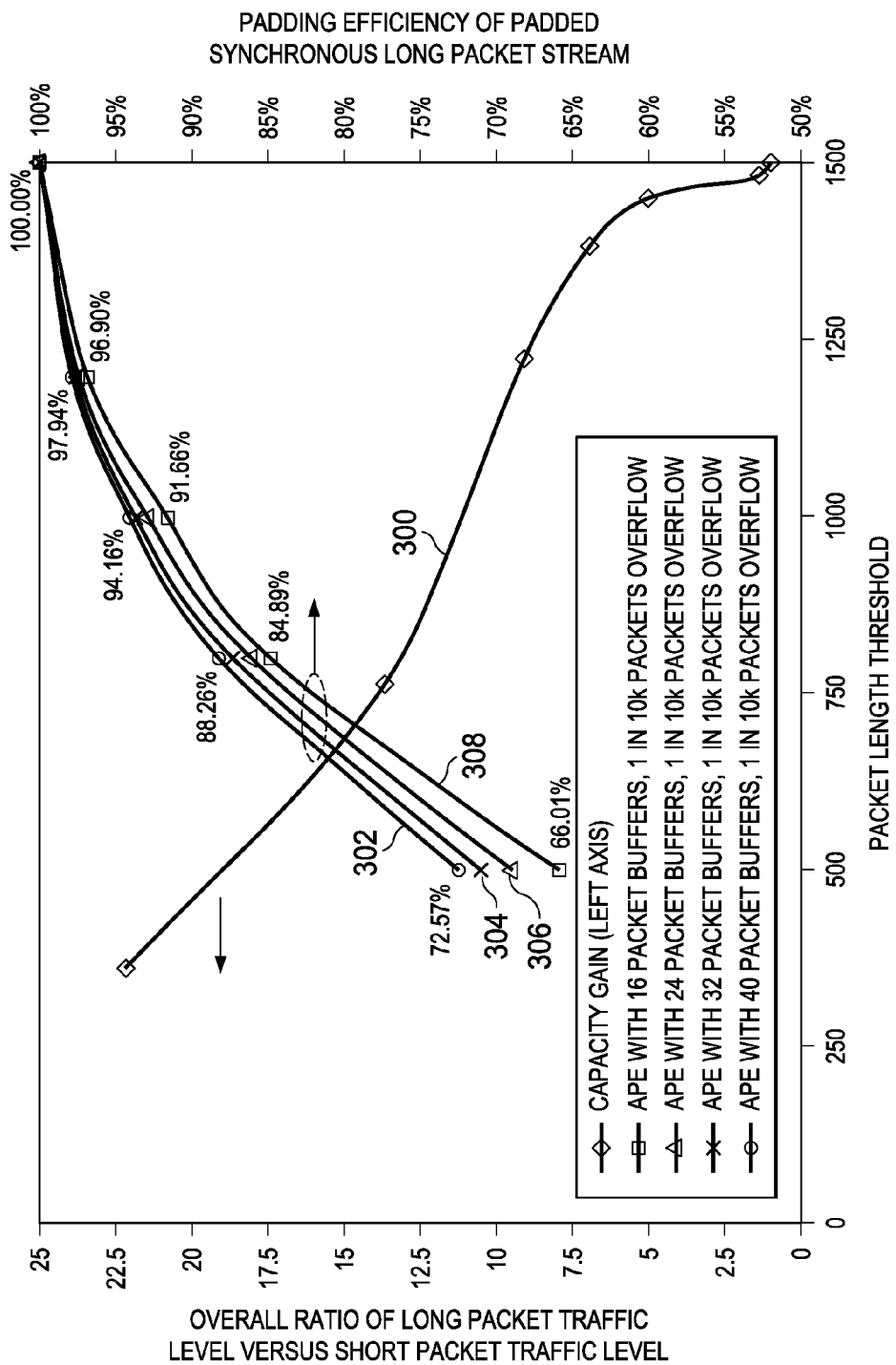
FIG. 4 illustrates another graph of overall node capacity gain versus packet length threshold.

FIG. 4 shows the overall node ratio of long packet traffic to short packet traffic capacities and synchronous circuit switching packet padding efficiency versus packet length threshold for a 0.01% probability of buffer overflow. Curve 300 shows the capacity gain as a function of the packet length threshold. Curve 302 shows the padding efficiency with 40 packet buffers, curve 304 shows the padding efficiency with 32 packet buffers, curve 306 shows the padding efficiency with 24 packet buffers, and curve 308 shows the padding efficiency with 16 packet buffers. Longer buffers better improve aggregate padding efficiency (APE) at the expense of delay. There is a trade-off between the delay and the APE, and hence clock rate acceleration. In one example, this delay is set to just below the processing delay of the centralized processing block, which generates the switch connection mapping, resulting in the connection processing in that block setting the overall processing delay.

Also, container overhead information contributes to clock rate acceleration. The overhead information may be about 10 bytes to about 20 bytes, leading to additional acceleration of about 0.67% to about 1.33%.

Short packet photonic switch 194 is a fast circuit switch operating at the container frame rate. For 100 Gb/s packet splitters and 1500 byte long packets, a frame duration is about 120 ns, based on the level of clock acceleration to address bursts of short packets, but no acceleration for padding, container overhead, or an increase in the IPG/ICG. The frame rate increase and clock rate increase to combat short bursts reduces the frame duration from 120 ns to between about 85% of 120 ns (750 byte threshold) and about 95% of 120 ns (1000 byte threshold), for a maximum frame duration under these conditions of between 103 ns and 113 ns. Shorter frame times may be used with higher acceleration and faster switching speeds.

Figure 5:
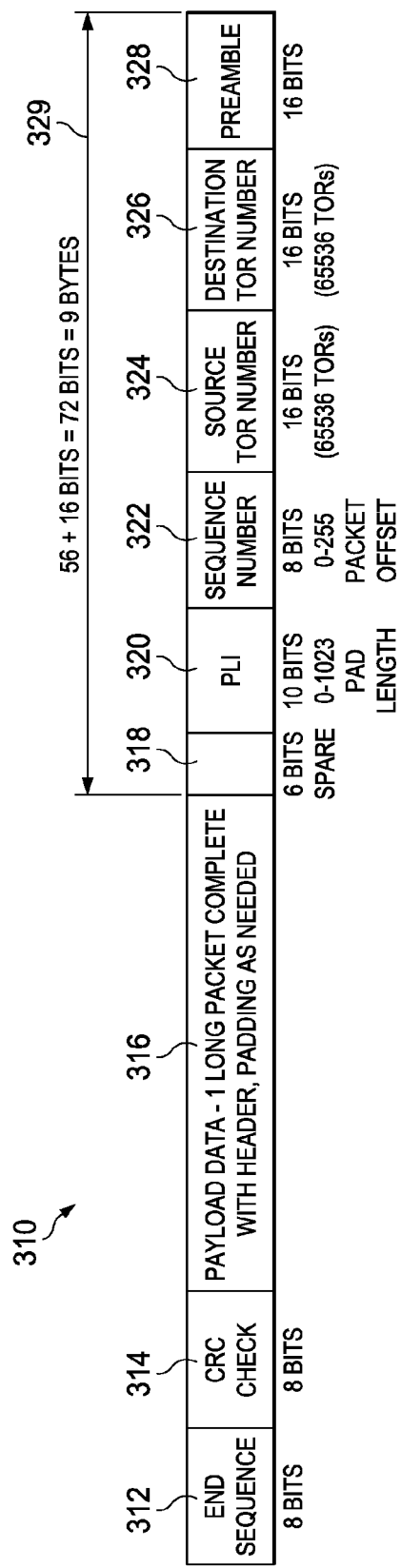
FIG. 5 illustrates an embodiment long packet container.

FIG. 5 illustrates long packet container 310 with a header, payload data, and trailer. Payload data 316 contains one long packet, including the packet header, along with padding. The payload data may be slightly over 1500 bytes. The long packet has a length between the long packet threshold, which may be between about 400 bytes and about 1000 bytes, and the maximum long packet length, which may be 1500 bytes. Long packets which are shorter than the maximum long packet length are padded out to a predetermined length, which may correspond to the maximum long packet length. When the long packet has a length equal to the maximum packet length, additional padding may not be added. The packet clock is accelerated to facilitate the handling of small bursts of packets shorter than the full packet length. The small bursts of shorter packets arrive to be padded more frequently, and the packets with more padding arrive at the switch more frequently. The acceleration level depends on the length of the smoothing buffer, and may be combined with packet acceleration for increasing the IPG or ICG for more time for setting up the photonic switch and handling timing skew. Additional details on controlling optical switch setup times are included in U.S. patent application Ser. No. 14/455,034 and U.S. patent application Ser. No. 14/508,676 filed on Oct. 7, 2014, and entitled "System and Method for Commutation in Photonic Switching," which this application incorporates hereby by reference.

The header includes preamble 328, destination TOR address 326, source TOR address 324, sequence number 322, PLI 320, and spare bits 318. Preamble 328 may be two bytes of a distinctive sequence. In other examples, a different length preamble, or no preamble, may be used.

Long packet container 310 includes destination TOR address 326 and source TOR address 324, which may each be 16 bits, for addressing as many as 65,536 source TORs and 65,536 destination TORs. 4×100 Gb/s TORs in a quad-ranted topology data center provide sufficient addressing capacity for data centers with 26 Petabits/sec core throughput. The source TOR address may be used for reconstituting the sequencing integrity when recombining the long and short packet flows. Also, the source TOR address may be used in rapid formatting of addresses for return messages.

Sequence number 322, which may be 8 bits for a packet offset between 0 and 255, is used to restore the order of the source streams at the destination when the short packet stream is combined with the long packet stream. The sequence numbers are applied at the source TOR or packet splitter according to the destination TOR address, and each ascending/ascending re-cyclic sequence of sequence numbers applies to containerized packets destined for the same destination TOR. In an ascending re-cyclic sequence of sequence numbers, the sequence numbers are ascending, but cycle back to zero after reaching a maximum sequence number. When reassembling the flow sequence at the destination, both the sequence number and the source address of the flows are used to match the received packets to the correct flows (source address) and establish the correct sequence in each of those flows (ascending/ascending re-cyclic sequence numbers).

Padding length indicator (PLI) 320 marks the demarcation point between the payload and the padding. The PLI provides a direct figure of the padding length to be removed by the packet combiner at the destination TOR. A PLI of 10 bits can accommodate a range of 0 bytes to 1023 bytes of padding, suitable for a long packet size ranging from 477 bytes to 1500 bytes. Using 11 bits would support any long packet length from 0 bytes to 1500 bytes.

Six spare bits 318 complete the header, leading to a long packet container header 329 with 72 bits, or nine bytes.

The trailer includes end sequence 312 and CRC check 314. An eight bit CRC check may be placed across the container. Alternatively, another value of CRC check size or another method of integrity validation may be used.

End sequence 312 may be eight bits. Alternatively, another end sequence, for example a two byte distinctive pattern, or no end sequence, may be used. In long packet container 310 the total overhead is 11 bytes. In other examples, other overhead amounts may be used.

When a common control processing approach is used with prior common channel signaling of connectivity to the switch control pipelined processing entity, a similar header structure may be used, because it may be used by the destination TOR to confirm that the correct routing has occurred, and that the packet sequence integrity is intact. Also, the header may be used to handle ongoing routing to correct dependent servers, and to facilitate rapid acknowledgment messages being generated in the return path.

For a 100 Gb/s ported 1.6 Pb/s four plane data center with 4096 quad-ported TORs, the TOR address field must contain 12 bits to address 4096 locations. With an eight bit packet sequence number to unambiguously identify packet sequence offsets of 256 packets peak-to-peak, the total destination address space is 12+8=20 bits=2.5 bytes. Another 2.5 bytes supports a similar full source addressing to the same level. Allocating another byte for CRC brings the header and trailer without preamble trailer sequence to six bytes. Expanding the address field to 65,536 source TORs and 65,536 destination TORs, plus the sequence number and a byte for CRC, brings the header to seven bytes without a preamble or end sequence. Thus, a 10-12 byte overhead may be used, which is less than 1% of the overall payload capacity for a maximum length packet.

Figure 6:
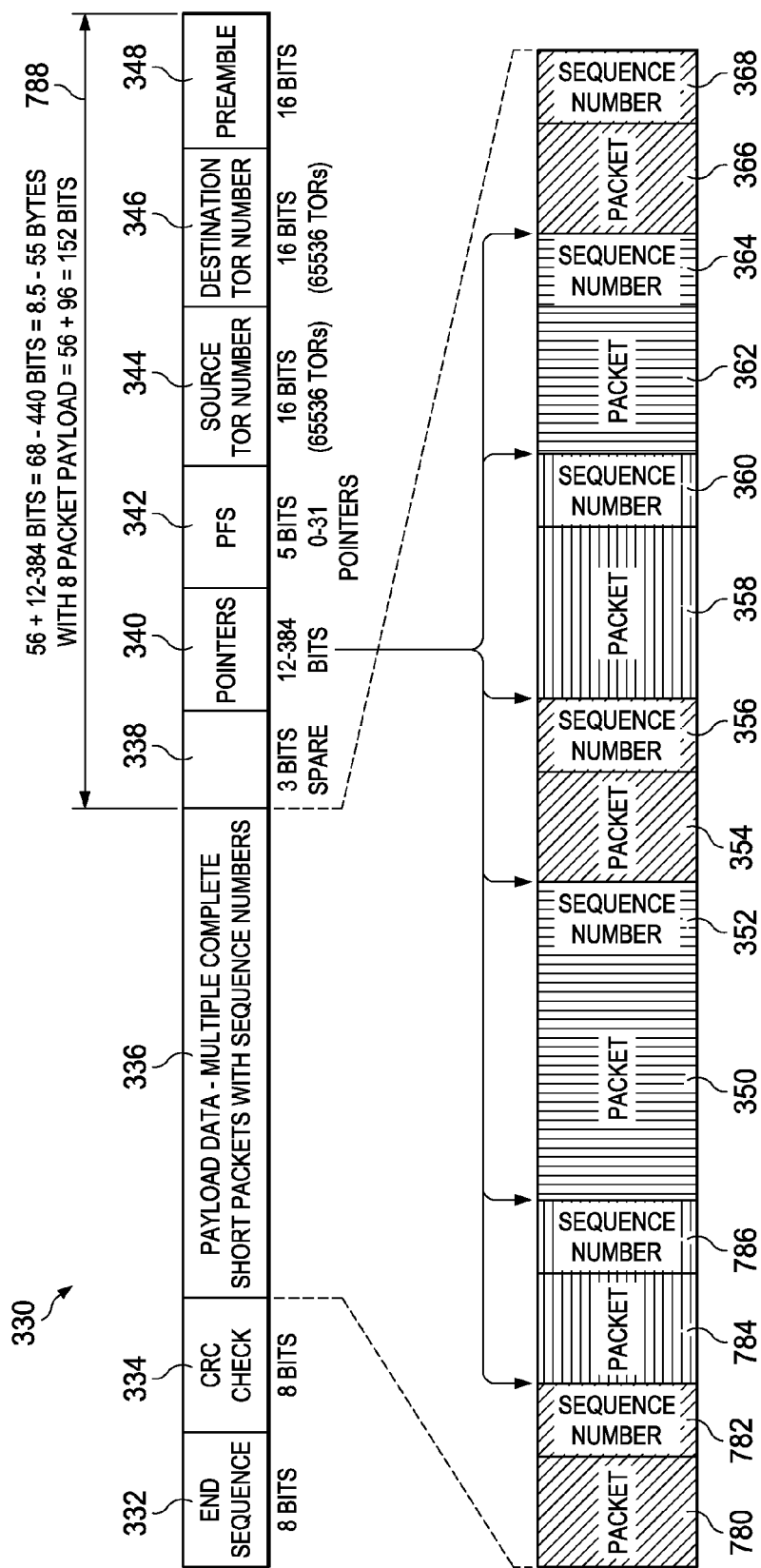
FIG. 6 illustrates an embodiment short packet container.

FIG. 6 illustrates short packet container 330. The short packet container contains a header, payload data, and trailer. Payload data 336 includes one or more complete short packets, each packaged in its own mini-container including the packet header, and the sequence number(s) corresponding to the individual short packets. In this example, the payload is sized to make the overall container the same size as the long packet container, which facilitates switching the short packets and the long packets by the same switch or the same switching technology. Because the header size is variable, the payload may be from about 1420 bytes to about 1490 bytes. Short packets, which can have a length between the shortest packet and the packet length threshold, are mapped into the payload. The packet clock is accelerated to the same level as the long packets, to retain the same frame length.

Payload data 336 includes multiple short packets, and sequence numbers corresponding to the individual packets. For example, packets 780, 784, 350, 354, 358, 362, and 366 correspond to sequence numbers 782, 786, 352, 356, 360, 364, and 368, respectively. The sequence numbers are used for restoring the ordering of the streams from the source TORs at the destination TOR packet combiner. The sequence numbers may be 8 bits for a packet offset of between 0 and 255.

The header includes preamble 348, destination TOR address 346, source TOR address 344, pointer field size (PFS) 342, pointer field 340, and three spare bits 338. The preamble may be a two byte distinctive pattern. Alternatively, a different length preamble, or no preamble, may be used.

The destination TOR address 346 is the address of the destination TOR. It may be 16 bits, to identify up to 65,536 TORs. Similarly, the source TOR address 344 may also be 16 bits, to identify up to 65,536 source TORs. The source TOR address may be used for sequence integrity when the short packet containers and long packet containers are combined.

Pointer field 340 delineates the packet boundaries between multiplexed short packets. Pointer field 340 contains up to 32 12-bit pointers, which occupy up to 48 bytes. The pointers define short packet boundaries in the payload. In an example with a 1500-byte payload and 50-byte short packets, up to 29 short packets may be placed in a short packet container.

PFS 342 has five bits to indicate the presence of up to 32 pointers. PFS may be used to dynamically vary the pointer size. Pointer field 340 may be adjusted based on the number of pointers in use. When fewer pointers are used, more space may be allocated for the payload data.

The header also optionally contains 3 spare bits. Header 788 may be from about 8.5 bytes to about 55 bytes. In one example, with an eight packet payload, the header is 152 bits or 19 bytes.

The trailer includes CRC check 334 and end sequence 332. An eight-bit CRC check may be used across the entire container. Alternatively, another method of integrity validation may be used.

End sequence 332 may be one or two bytes with a distinctive pattern. Alternatively, no end sequence, or another end sequence, may be used.

A high port count multi-stage photonic switch, suitable for photonic packet switching, may use a variety of architectures, such as a three-stage highly dilated Clos switch, which is controlled by a series-parallel structure using pipelined control, or a matrixed switch using direct addressing. The pipelined control and connection mapping process may take several microseconds to complete due to the complex interactive nature of generating connection maps for indirectly addressed switches with free path search algorithms. However, because the control system is a pipeline of control processing elements, various parts of the process of generating sequential connection maps may be implemented simultaneously on each of many processors in the pipeline, with a hand-off between activities to produce a flow of connection maps every frame period, offset by several microseconds from the receipt of the raw connection requests for each frame in the process. This delay is invisible to the switching delay and switching process when the overall computation delay through the control pipeline is shorter than the container assembly, acceleration, and buffering delays in the packet splitter, which may be about 16 frames to about 64 frames, or about 1.92 μs to about 7.68 μs, depending on the buffer size. A value of around 40 frames, for a 40 packet buffer, has a delay of 5 μs, which provides 5 μs for the control to complete the connection commutation. This is independent of delays from cross-data center fibers running from the packet splitter and the core switch, because the connection request is transmitted along the same optical path as the container to be switched on a separate optical carrier, so both are subject to a similar optical delay. To accommodate this independence, a send before ACK and store in case of NACK approach may be used, so that containers can be sent without having to wait as long as 5-10 μs to receive an ACK. Also, the packet splitter is phase locked to the switch, both at the container phasing level, so the IPGs/ICGs on the inputs are aligned, and at the frame numbering level, by controlling the timing of the packet splitter from the switch timing so the switch receives containers time-aligned to the switch.

The packet splitter does not necessarily wait for an ACK that a connection is in place before transmitting the container. Instead, the packet splitter transmits the container a fixed time period after requesting a connection, coinciding with the frame number, and places the sent container in a sent container store awaiting an ACK or a NACK. When the packet splitter is close to the photonic switch, the ACK or NACK may arrive before the container is transmitted, and the sent container store immediately dumps the container as it is written when an ACK is received, or the container is not written to the sent container store. When the packet splitter is farther from the photonic switch, the ACK or NACK has a longer round trip delay, the sent container store holds the container until an ACK or a NACK is received.

The control blocks may include the interaction of source matrix controllers (SMCs), group fan-in controllers (GFCs), and orthogonal mappers. The control process, along with a particular example of a photonic switch, is further described in U.S. patent application Ser. No. 14/455,034. Other topologies, such as a three stage space switch highly dilated Clos switch, or a matrixed switch, may be used. When a three stage space switch Clos switch is used, a center stage controller (CSC) is used, which assembles center stage connection maps from the results from the SMCs and the GFCs. When a matrixed switch is used a direct and much faster addressing with fast output port contention resolution can be used. Additional details on an ultrafast photonic switch are further discussed in U.S. patent application Ser. No. 14/710,815 filed on May 13, 2015, and entitled "System and Method for Photonic Switch," which this application incorporates hereby by reference.

Figure 7:
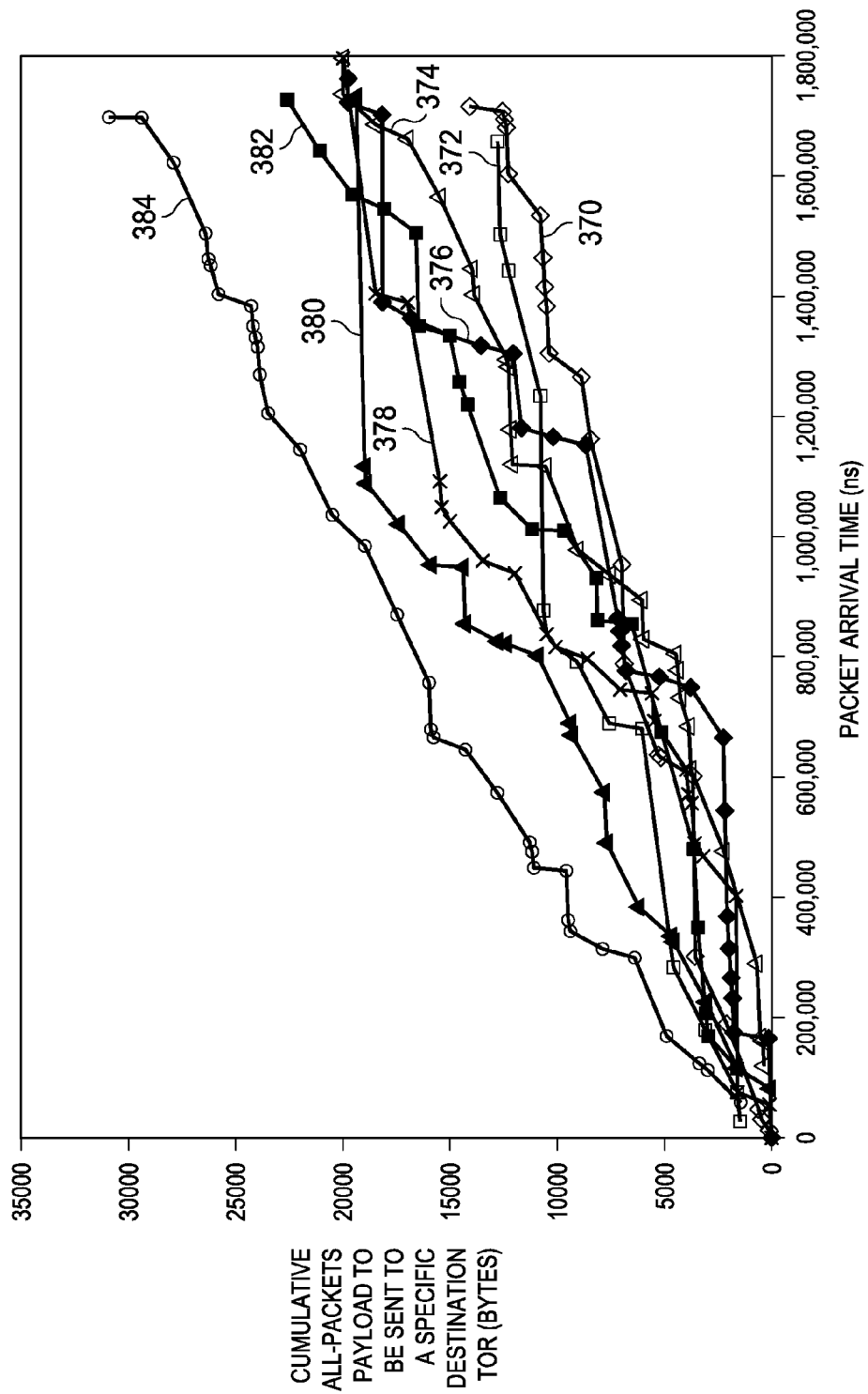
FIG. 7 illustrates a graph of cumulative short packet payload sent to a particular top-of-rack (TOR) switch over time.
Figure 8:
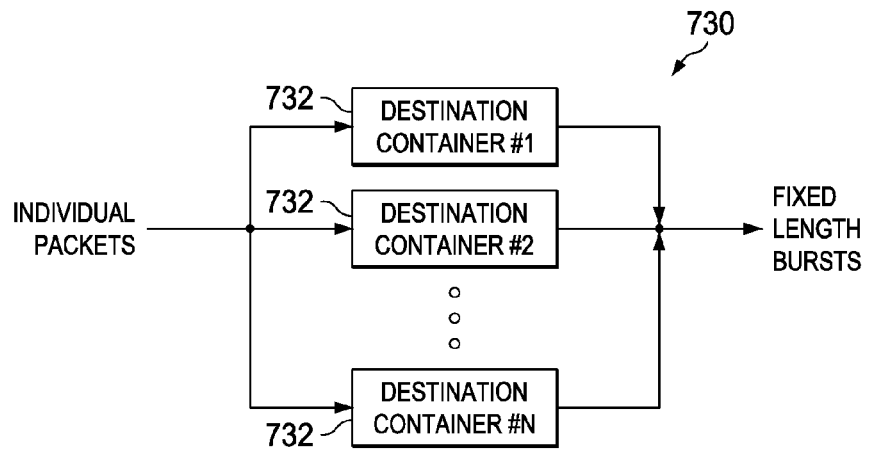
FIG. 8 illustrates an embodiment burst mode switch.

FIG. 7 illustrates a graph of cumulative packet length (un-split) packet payload to be sent to a specific TOR over time from a simple model which generates various lengths of packets at approximately the probability of occurrence, individually randomly addressed across a variable number of TORs, in this example 1024 TORs. FIG. 7 shows the behavior for traffic flows in eight destination-specific all-lengths container stacks, with curves 370, 372, 374, 376, 378, 380, 382, and 384 showing the behavior of eight stacks. The number of bytes in specific TOR-TOR streams over time is shown for all lengths of packets for similarly loaded TORs in a 1024 TOR Data Center. After 1.6 ms, the stacks have received between about 12,000 bytes and about 27,500 bytes, so the bandwidths are low, and the inter-packet arrival time is long. This corresponds to about 160 kilobits or 20 kilobytes over 1.6 ms. At less than 100% load the bandwidth may be lower, resulting in a lower packet delivery rate and longer fill times. FIG. 8 illustrates containerization process 730 of a photonic burst switch. Individual packets are accumulated in containers 732, with one container per destination. A container is created when a packet enters the switching process when there is not already an existing container for that packet's destination. When there is already an open container awaiting completion addressed to the same destination as the packet, the packet is added to the container. The containers are associated with a time-out, at the expiration of which they are transmitted, whether or not they are full. When a container fills before the expiration of the time-out, the next packet to that destination triggers the creation of a new container. Each container is transmitted when it is full, or at the expiration of the timeout period. The containers have a fixed length, for example many times the length of the largest payload entity, such as a longest packet. Burst mode switch frame times may be 1 μs to 5 μs, although 500 ns-10 μs or more can be used. The containers are switched as synchronous or asynchronous bursts, although synchronous switches can more efficient under some conditions. Burst mode switches are well suited for systems with a limited number of individual massive data flows, for example packet transport systems. A large container resulting from a long frame time is easy to switch, but may take significant time to fill.

Data center traffic is different than high capacity data transport systems. Instead of connecting huge data stream cross-sections between relatively few directions (e.g. in a transport system it might be north, south, east, and west), the core switch in the data center interconnects hundreds, thousands, or tens of thousands of individual TORs, each of which may be communicating with one, some, or all of the other TORs. Thus, traffic from the source TORs to the destination TORs may be destination-fragmented, and may contain individual short flows, slow flows, or single packet transactions and flows. With short flows, slow flows, or fragmented destination traffic, containers may be transmitted partially full or nearly empty, reducing throughput. Because a burst switch aggregates packets for a specific destination, it is affected by the per-destination flow characteristics.

Figure 9:
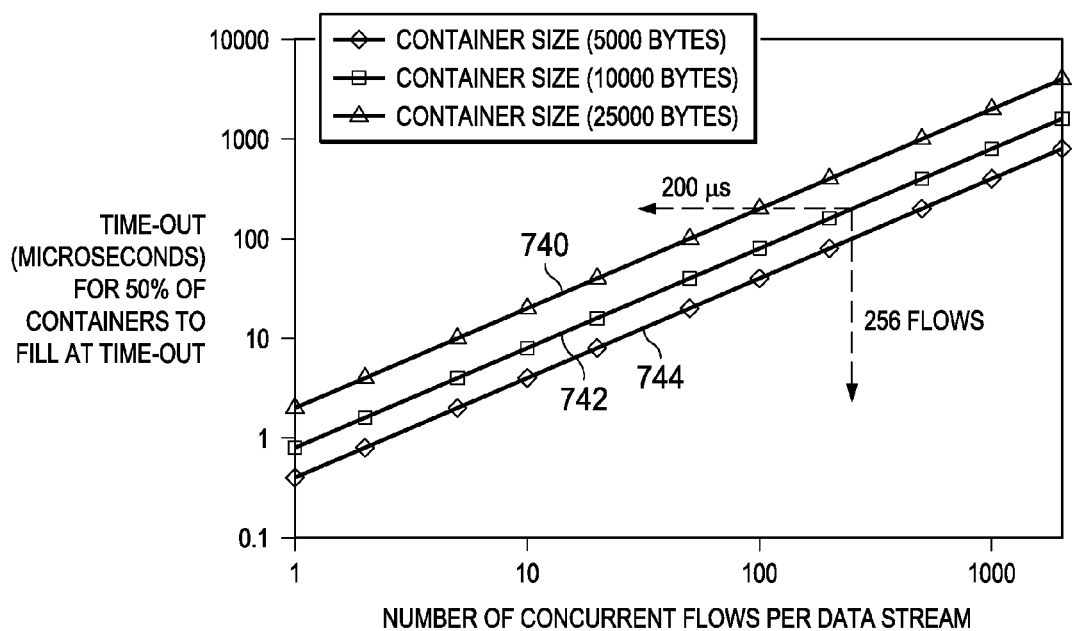
FIG. 9 illustrates a graph of timeout for half the containers to fill versus the number of concurrent flows per data stream.

FIG. 9 illustrates a graph of the timeout time for half of the containers to be full at timeout versus the number of concurrent flows per data stream at 100 Gb/s. Curve 740 shows the results for 5000 byte containers, curve 742 shows the results for 10,000 byte containers, and curve 744 shows the results for 25,000 byte containers. In curve 742, to achieve a filled container for one half of the containers transmitted, with a fragmentation of the destination traffic per source TOR into 256 destinations, a time-out of 200 µs is needed. This is almost two orders of magnitude higher than the delay across a switch in the core of a data center (2-10 µs). A much shorter time-out in the region of 2, 5, 10 or 25 µs may be used with a burst mode switch. Shortening the time-out leads to for a lower percentage of containers being filled or significantly partially filled, leading to bandwidth expansion, because an unfilled container occupies the same bandwidth/bus occupancy as a filled container, and the switch goodput (the throughput of usable data) is reduced by this bandwidth expansion factor.

Figure 10:
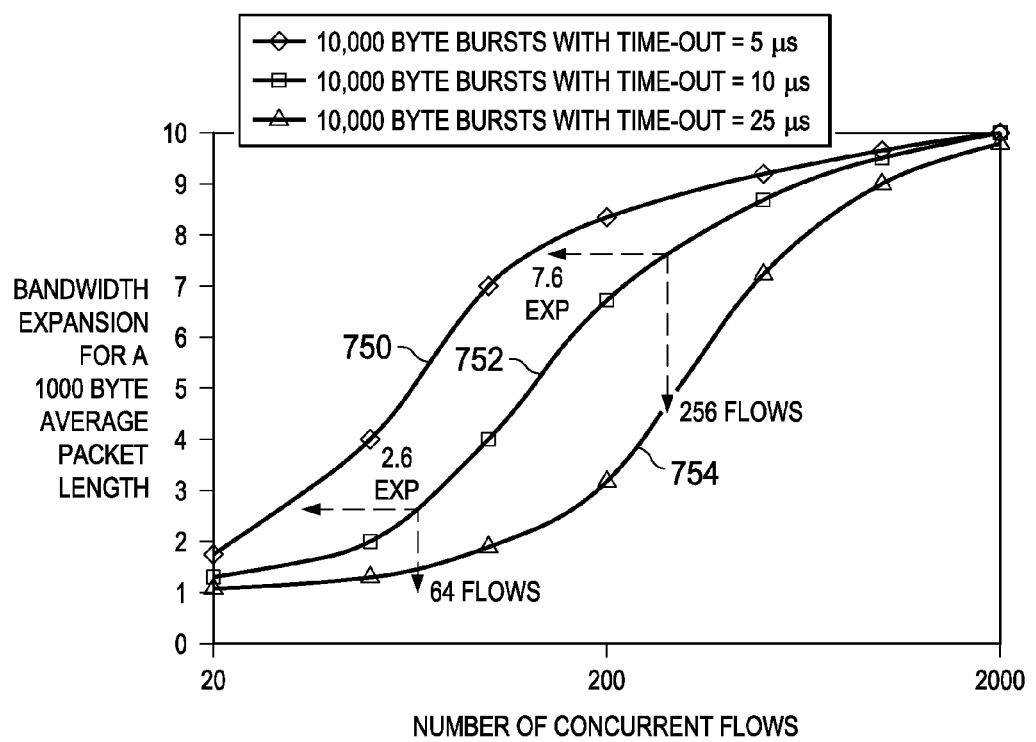
FIG. 10 illustrates a graph of bandwidth expansion versus the number of concurrent flows.

FIG. 10 illustrates a graph of bandwidth expansion for a 1000 byte average packet length versus the number of concurrent flows with 10,000 byte bursts. Curve 750 shows the results for a 5 µs timeout period, curve 752 shows the results for a 10 µs timeout period, and curve 754 shows the results for a 25 µs timeout period. The results asymptotically converge to just over 1 at a low number of flows, due to container quantization effects. The bandwidth growth increases as the number of flows increases, reaching a plateau at a level of the container payload capacity of one packet length, because a container has at least one packet, because the container is created when the first packet arrives to be transported to the appropriate destination. For a packet length of 1000 bytes and a 10,000 byte payload container, this leads to a bandwidth expansion of 10:1. However, few packets are actually 1000 bytes long, with the majority of packets either close to 1500 bytes which, with a 10,000 byte container payload, gives a bandwidth expansion of 6.67:1, or are close to 50-100 bytes in length which, with a 10,000 byte container, gives a bandwidth expansion around 100-200:1. The throughput of a burst mode switch is low in a data center application when a TOR is communicating with a significant number of other TORs.

In a data center, the aggregated sever-server flows at the TOR may create a significant amount of bandwidth addressing fragmentation with short flows, slow flows, and large numbers or addresses being accessed simultaneously. A photonic switch switches the aggregated TOR-TOR traffic at a destination TOR level of granularity, which may include multiple server-server activities or a single server-server activity where some transactions are as short as a single packet. TOR to core switch traffic is the sum of the server-server traffic to servers not on the same TOR. Server activities may interact with multiple servers, and some individual activities may interact with multiple servers. The server communication equals the sum of the resources of constituent activities.

A simple view of a data center includes servers (and various other devices substituting for servers, such as memory arrays, or output ports to the outside world) homing on to their respective TORs, which feed the combined packet traffic streams to a large core data packet switch. Several activities may be going on simultaneously in each server. For example, server 1 of TOR k may have activities A, B . . . Y, Z. Activity A may involve server 1 of TOR k interworking with server M of TOR 1, and the traffic is routed through the core packet switch. In another example, server 1 of TOR k interacts with server M of TOR k, and a link is made at the local TOR. At the same time, activity B on Server 1 of TOR k may be interacting with server M on TOR k. Each of these activities involves separate data flows across the core switch. When the number of processes running on each of the servers which subtend each of the TORs is considered, the number of server-to-server flows may be very large. Some of the flows may be aggregated together for core switching when they occur at the same time and share both source and destination TORs. Thus, the traffic addressing at the TOR-TOR level may be very fragmented, depending on each TOR's community of interest, the group of TORs it tends to communicate with. This may be a small subset of the total number of TORs, or it may be a large number of TORs. Some flows are very long, but many of them are short, even single packet flows. The flow sizes may in some cases be millions of bytes or more, but most of the flows (but not most of the bandwidth) are relatively short. A significant number of flows may be short ACK, NACK, or simple instruction/request transactions. The server-to-server flows are combined at the TOR into source TOR to destination TOR data flows, depending on the geographic relationship between the servers within the data center. Thus, the nature of the traffic from the TOR output port to the other TOR input ports is likely to be highly fragmented, with multiple server and TOR destinations present at once, and with a significant subset of the flows being short or very short.

The presence of many small flows is problematic with long containers, unless a long wait time is used, because TOR-TOR flow inter-arrival times may be long. A significant number of flows may be single packet containers. Flows may have a long duration, but moderate capacity, suggesting that adjacent packets of the same flow may be well spaced out. There is a wide range in the number of concurrent flows that may exist at any one time on any TOR port in a data center. Multiple concurrent destinations per flow group or TOR port implies that multiple containers are built concurrently, leading to a long fill time.

FIG. 7 shows the modeled flow rates into 8 of 1023 container stacks for a TOR communicating equally with 1023 other TORs in a 1024 TOR data center. The responses of a 10,000 byte/container burst mode switch containerization process to examples at this level of traffic fragmentation, as well as with 256 byte and 64 byte fragmentation, are shown in FIGS. 11-14. The 256 and 64 destination fragmentation represent a TOR communicating with ¼ and $\frac{1}{16}^{th}$ of the other TORs, respectively. The horizontal arrows represent the time-out period, which is initiated on the reception of a packet requiring a new container, the vertical arrows represents the sent container overall capacity and the timing of the transmission of a that container. The transmission occurs at the end of the horizontal arrow when a time-out occurs or before the end of the horizontal arrow when the container fills before the time-out. The dotted horizontal lines represent the cumulative traffic bytes prior to the sending of the associated container.

Figure 11:
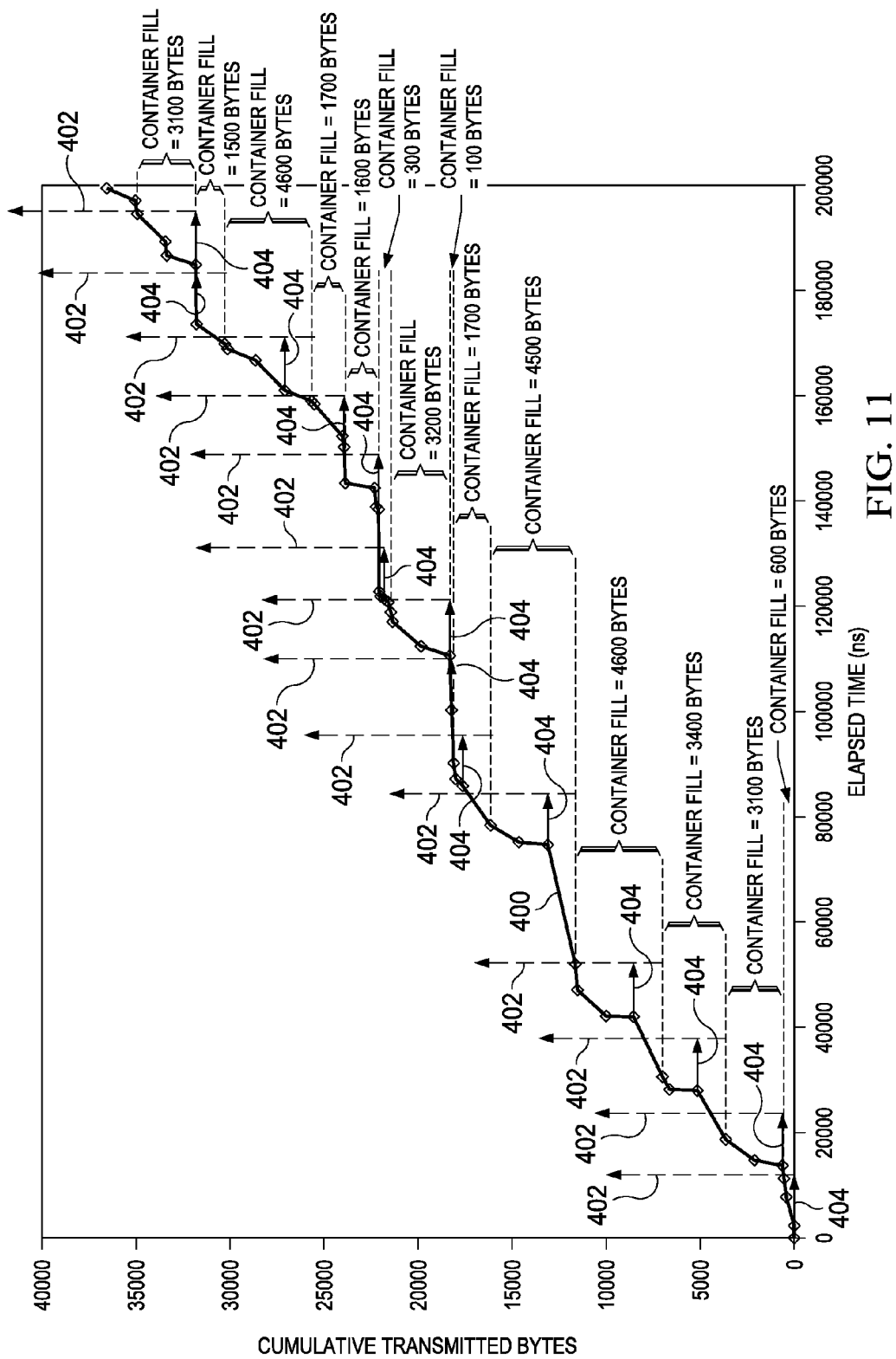
FIGS. 11-14 illustrate graphs of cumulative short packet payloads for a particular TOR over time.

FIG. 11 illustrates a burst mode switch quantizing a 64 destination traffic flow in a 100 Gb/s packet stream, with fill times 404 and container transmittal times 402. Curve 400 shows the arrival of new packets. With a 10 µs timeout, the container fill across the bandwidth of the switch is around 24.3%, resulting in a bandwidth increase of more than 4:1 across the bandwidth of the switch.

Figure 12:
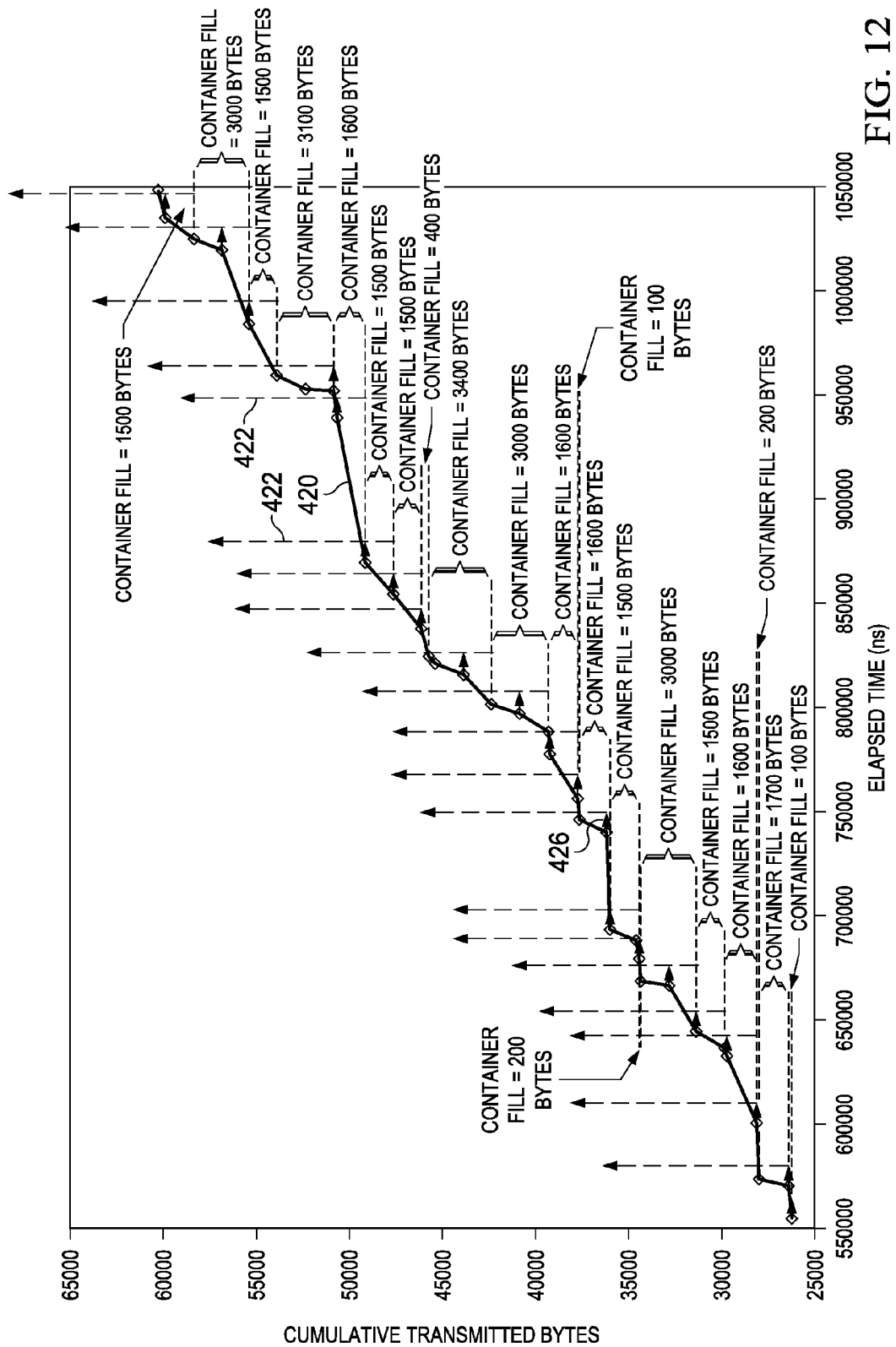

FIG. 12 illustrates a burst mode switch quantizing a 256 destination traffic flow in a 100 Gb/s packet stream. FIG. 12 shows container fill times 426, container transmittal times 422, and container arrival curve 420. With a 10 µs timeout, the container fill across the entire bandwidth of the switch is around 16.8%, with an increase in bandwidth of almost 6:1.

Figure 13:
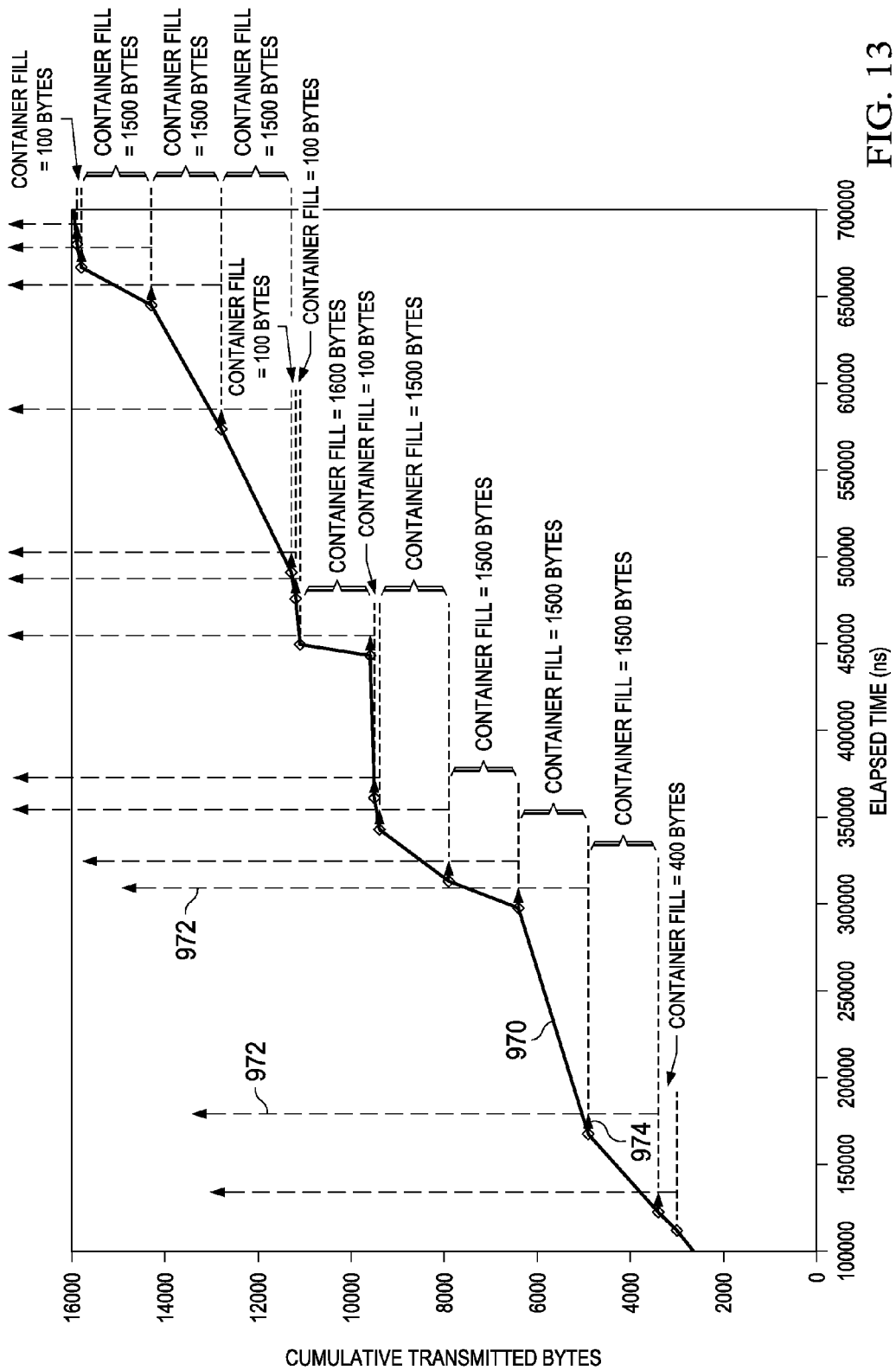

FIG. 13 illustrates a burst mode switch quantizing a 1024 destination traffic flow in a 100 Gb/s packet stream. FIG. 13 shows container fill times, container transmittal times 972, and container arrival curve 970, with packets being added to a container at times 974. With a 10 µs timeout, the container fill across the entire bandwidth of the switch is around 9.8%, with an increase in bandwidth of just over 10:1.

Figure 14:
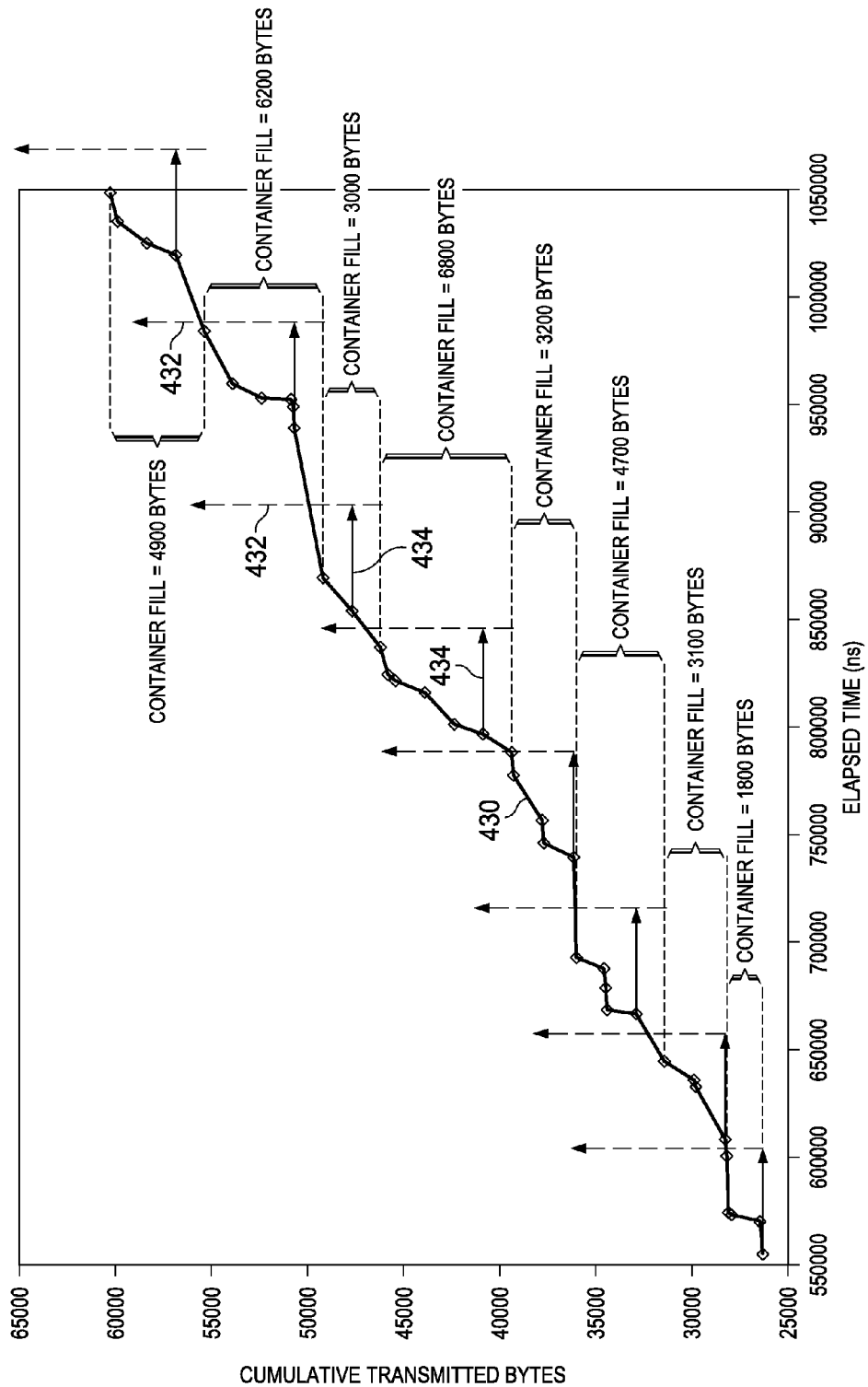

FIG. 14 illustrates a burst mode switch with a 50 µs timeout and 256 equally loaded destinations. Curve 430 shows the arrival of packets, lines 432 show the container transmittal, and lines 434 show the timeout. Increasing the timeout to a very high level facilitates better filling, with bandwidth growth of around 2.36:1. At 256 equal traffic flows per TOR, the burst mode switch, at 10,000 byte bursts, has problems efficiently packing containers. However, a 10,000 byte burst is towards the lower end for a burst mode switch, and smaller bursts are even more inefficient from packing quantization where, after a number of packets have been quantized, the next packet does not fit, despite the availability of significant burst payload capacity.

FIGS. 11-14 show the bandwidth expansion performance of a 10,000 byte container burst switch burst assembly process. This yields a bandwidth expansion of more than 4:1 across the entire bandwidth of the switch for a 64 address random address fragmentation, almost 6:1 for a 256 address random fragmentation, and greater than 10:1 for a 1024 address random fragmentation for a container time-out of 10 µs. This would result in the goodput—the usable data throughput—being reduced to <25% with 64 random destinations, approximately 17% with 256 random destinations, and approximately 10% with 1024 random destinations. Shorter time-outs lead to higher bandwidth expansion. Increasing the time-out to a 50 µs somewhat improves bandwidth expansion at the expense delay.

The trade-off of time-out ratio (the length of the time out versus the length of the container) and bandwidth efficiency is such that, with a higher time-out ratio, the container fill improves under adverse conditions, such as highly destination-fragmented traffic. However, short containers with a capacity not much above the length of individual largest packet may incur quantization problems for multi-packet payloads. For example, for a container with a 2000 byte payload capacity, when the first packet into the container is a 150 byte packet, the second packet is a 400 byte packet, and the third packet is a 1500 byte packet, that third packet overflows the payload capacity by 50 bytes, and the container will be transmitted with just 550 bytes of payload, despite having sufficient source material to fill the container.

The packet stream may be split into short and long packet streams. The long packets, which may be padded, may be carried in containers just long enough to accommodate a single longest packet. Because there is only one packet per container, time-outs are not used, as the container is filled by one packet and immediately available for transmission to the switch when the assembly and conditioning are completed. The short packets may have a length up to the threshold value, which may be 400-1200 bytes, and may represent between about 5% and about 15% of the total packet bandwidth, depending on the threshold. Multiple short packets may be mapped into a shorter container, which may be shorter than or equal to the length of one long packet. At this level of container length, the quantization concerns are less problematic, because the quantization only occurs on 5-15% of the bandwidth and the statistical probability of encountering a longest short packet is very low.

While long packets are unaffected, short packets suffer a delay/payload bus occupancy expansion. However, these affects are not too problematic, because short and medium length packets only represent about 5% to about 15% of the bandwidth, and the payload container size may be reduced from the 25,000 bytes of the 2 µs framed system down to 1500 bytes for a 120 ns framed system. This change in traffic levels and shortening of the container length reduce the severity of the impact of the bandwidth expansion.

Figure 15:
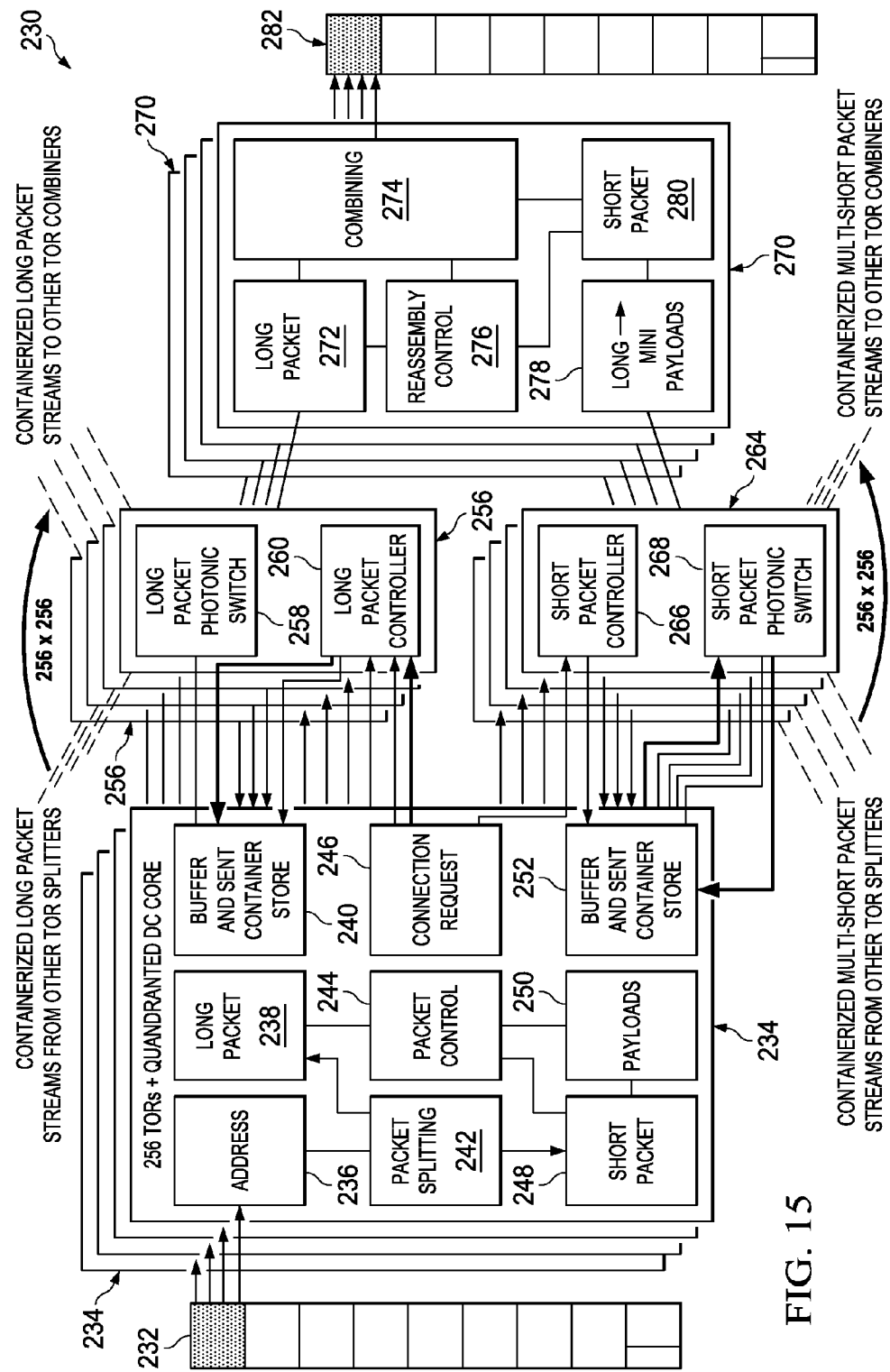
FIG. 15 illustrates another embodiment system for photonic switching with two photonic switches.

A container the size of the long packet container, or a shorter container, may be used for the short packets. When a shorter container is used, an ultrafast photonic switch switches the short packet containers. FIG. 15 illustrates system 230 for switching optical packets by separate photonic switch fabrics, where one fabric is an ultrafast switching fabric for switching shorter containers. Long packets are assembled into individual containers, while short packets are assembled into shorter containers. The size of the short packet containers may be sufficient to hold the longest short packet, which sets the container payload capacity at least as big as the long/short packet threshold length. Containers may be concatenated for the longest short packets, permitting a shorter container length of, for example, one half or one third of the longest short packet, and increasing the quantization effects that occur when dealing with the low percentage of short packets that fall outside the short packet high packet probability area. With 256 TORs, a 256×256 long packet photonic switch and a 256×256 ultrafast short packet photonic switch are used. Packets are transmitted by 256 TORs 232, with a quadranted DC core. A packet splitter is associated with each source TOR, and may be integrated into that TOR. The packet splitter generates four optical signals which are transmitted to the photonic switches, and receives two or four optical signals from the photonic switching core: the short packet containers, short packet connection requests, long packet containers, and long packet connection requests.

The destination addresses of the packets and packet length are determined in address module 236 of packet splitters 234. These may be determined based on the packet. Alternatively, if the packet splitter is integrated in a TOR, these values may already be known. The packet length, address, and packet are sent to splitter 242.

The packets are separated into a long packet stream and a short packet stream by splitter 242. Packets with a length above the threshold are determined to be long packets, while packets with a length less than or equal to the threshold are determined to be short packets. A destination-associated cyclic sequence number is assigned to the packets, so each flow can be reassembled in the correct packet order at the destination packet combiner after switching, maintaining packet sequence integrity in the source TOR-to-destination TOR flows. Short packets are directed to short packet module 248, while long packets are directed to long packet module 238.

In long packet module 238, long packets are individually containerized, and padded out to have a predetermined length, which may correspond to the maximum packet length. Because this adds to the bandwidth, the packets are also accelerated. The destination address is passed to connection request module 246 to set up the long packet switch connection.

Upon initiation of each new container for a specific destination, connection requests are sent in advance of transmitting the container. Alternatively, a connection for that container may be requested for a specific frame number, in which case the container is transmitted at that frame number. The request is transmitted by connection request module 246 to long packet photonic switch controller 260, which sets up the switch connections in long packet photonic switch 258.

After the switch has had sufficient time for set up, but without necessarily waiting to receive an acknowledgment (ACK) or negative acknowledgment (NACK) from the switch, the container is transmitted to long packet photonic switch 258 for switching. Long packet photonic switch 258 may be a three stage dilated Clos switch or another photonic switching fabric. The container is also written to the buffer and sent container store 240 for retransmission, if necessary. If an ACK is received, the stored container is deleted. If a NACK is received, the stored container is marked for retransmission.

Short containers are mapped into payloads for multi-packet containers in short packet module 248. The containers are transmitted when they are full or when the time-out timer expires. The timer is triggered by the arrival of a packet for a destination which does not already have an open container. The containers are assembled in payload module 250. At the time the container is opened, a request for a container destination connection in a future frame is sent to short packet photonic switch controller 268 from connection request module 246 to set up a connection in short packet photonic switch 266. Photonic switching module 264 contains an ultrafast short packet photonic switch 266, and short packet photonic switch controller 268, which controls short packet photonic switch 266.

When the container is full or the timer expires, the container is transmitted to short packet photonic switch 266 for switching. The container is saved in buffer and sent container store 252. The packet splitters receive connection ACKs and NACKs from the short packet photonic switch controller. If an ACK is received, the container is removed from the sent container store. If a NACK is received, a new connection request is made, followed by a retransmission of the container. A timing control feedback signal from the short packet switch is also received to maintain the packet splitter output timing and framing on the short packet container path, so the containers arrive at the switch with aligned inter-container gaps. Similarly, timing control feedback signals may be received from the short container packet switch to control timing and framing on the short packet container path. These two timing loops facilitate the elimination of variable photonic buffers at the inputs to the photonic switch, which may be problematic.

There may be four fibers per TOR to connect to the photonic switching fabric. However, in one example with wavelength division multiplexing (WDM), two fibers can be used. The first fiber carries long packet traffic to the core switch as 4×25 Gb/s optical carriers in the 1300 nm waveband length. The short packet traffic to the core switch carries 4×25 Gb/s optical carriers in the 1550 nm waveband. Connection request to both the short packet switch and the long packet switch are also transmitted in 1×25 Gb/s signal in the 1550 nm wavelength. The second fiber carries long packet traffic from the core switch at 4×25 Gb/s in the 1300 nm waveband and short packet traffic from the core switch at 4×25 Gb/s optical carriers, which may be in the 1550 nm waveband. Additionally, the second fiber carries ACKs/NACKs and timing feedback from both the long packet switch and the short packet switch, each at 1×25 Gb/s in the 1550 nm waveband. Other optical multiplexing and cabling options for these links may also be used.

Packet control module 244 coordinates the long and short packet transmissions.

The two packet streams are switched by long packet photonic switch 258 and short packet photonic switch 266. The switched containers are directed to packet combiners 270. Additional details on an ultrafast photonic switch are further discussed in U.S. patent application Ser. No. 14/710,815.

Containers with long packets are received by long packet module 272. The long packets are unpadded and de-containerized.

Containers with short packets are received by short packet module 278. The mini-container payloads are extracted from the containers.

Then, in short packet de-containerization module 280, the short packets are de-containerized from their individual mini-containers.

In combining module 274, the packet streams are combined based on the packet-associated sequence numbers applied at the source packet splitter. This is controlled by reassembly controller 276. The sequences from the source TORs are adaptively interleaved to create a continuous ascending set of packet-associated sequence numbers to restore the original ordering.

Finally, the combined packet streams are directed to destination TORs 282.

Figure 16:
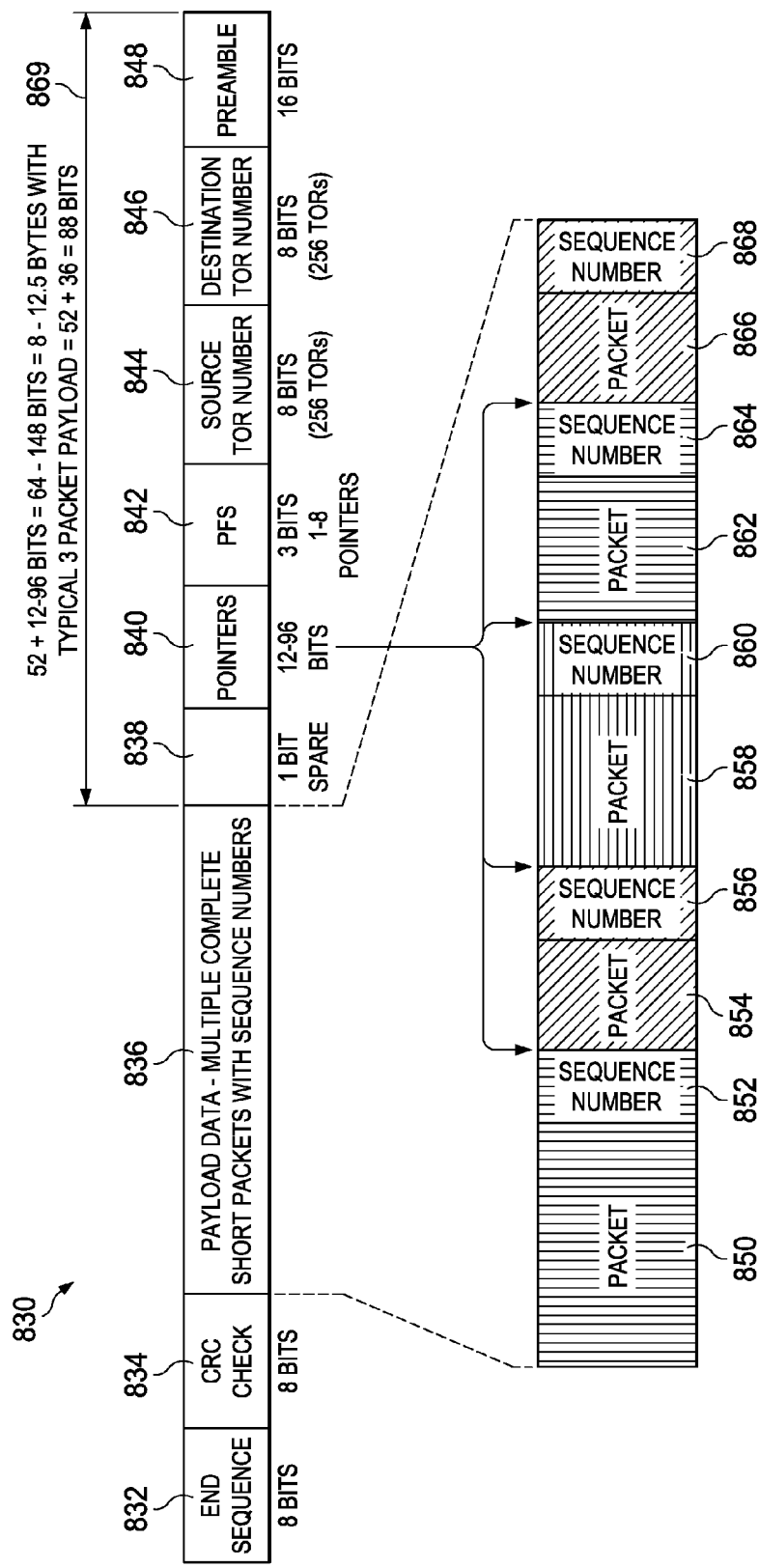
FIG. 16 illustrates another embodiment short packet container.

When an ultrafast photonic switch is used to switch short packet containers, the container length may be set to be just above the longest short packet, for a payload capacity which may be around 750 bytes, 500 bytes, or less than 500 bytes. FIG. 16 illustrates an example short packet container 830 to be switched by an ultrafast photonic switch. The short packet container contains a header, payload data, and a trailer. Payload data 836 can include multiple complete short packets, including packet headers, along with the sequence numbers corresponding to the packets. The header size may be variable, for some variation in payload size. Packets with a length between the shortest packet and the maximum short packet are mapped into the payload. The packet clock may be accelerated, for example to the same level as the long packets.

Payload data 836 may include multiple short packets, and sequence numbers corresponding to the packets. For example, packets 850, 854, 858, 862, and 866 correspond to sequence numbers 852, 856, 860, 864, and 868, respectively. The sequence numbers are used for restoring the ordering of the streams from the source TORs at the destination TOR combiner. The sequence numbers may be 8 bits for a packet offset of 0 to 255.

The header includes preamble 848, destination TOR address 846, source TOR address 844, PFS 842, pointers 840, and spare bit 838. The preamble may be a two byte distinctive pattern. Alternatively, a different length preamble, or no preamble, may be used.

The destination TOR address 846 can be 16 bits, to identify up to 65,536 TOR destinations. Similarly, the source TOR address 844 can be 16 bits to identify up to 65,536 source TORs. The source TOR address may be used in combination with the source-allocated sequence number for sequence integrity when the short packet containers and long packet containers are combined.

PFS 842 has three bits to identify the size of the pointer field. The PFS is used to allow the size of the pointer field to be dynamically changed.

Up to eight 12-bit pointers 840 delineate the packet boundaries between multiplexed short packets. The pointers define up to 8 small packet boundaries in the payloads, allowing up to 8 short packets in a short packet container.

The header may also contain 3 spare bits. Header 869 may be from about 8 bytes to about 12.5 bytes. For example, with a three packet payload, the header is 88 bits.

The trailer includes CRC check 834 and end sequence 832. CRC check 834, which may be eight bits, may be used for CRC check across the entire container. Alternatively, another method of integrity validation, or a different length of CRC check may be used.

End sequence 832 may be one or two bytes with a distinctive pattern. Alternatively, no end sequence, or another end sequence, may be used. The overall container length is around 504 bytes for a payload of up to 490 bytes.

Figure 17:
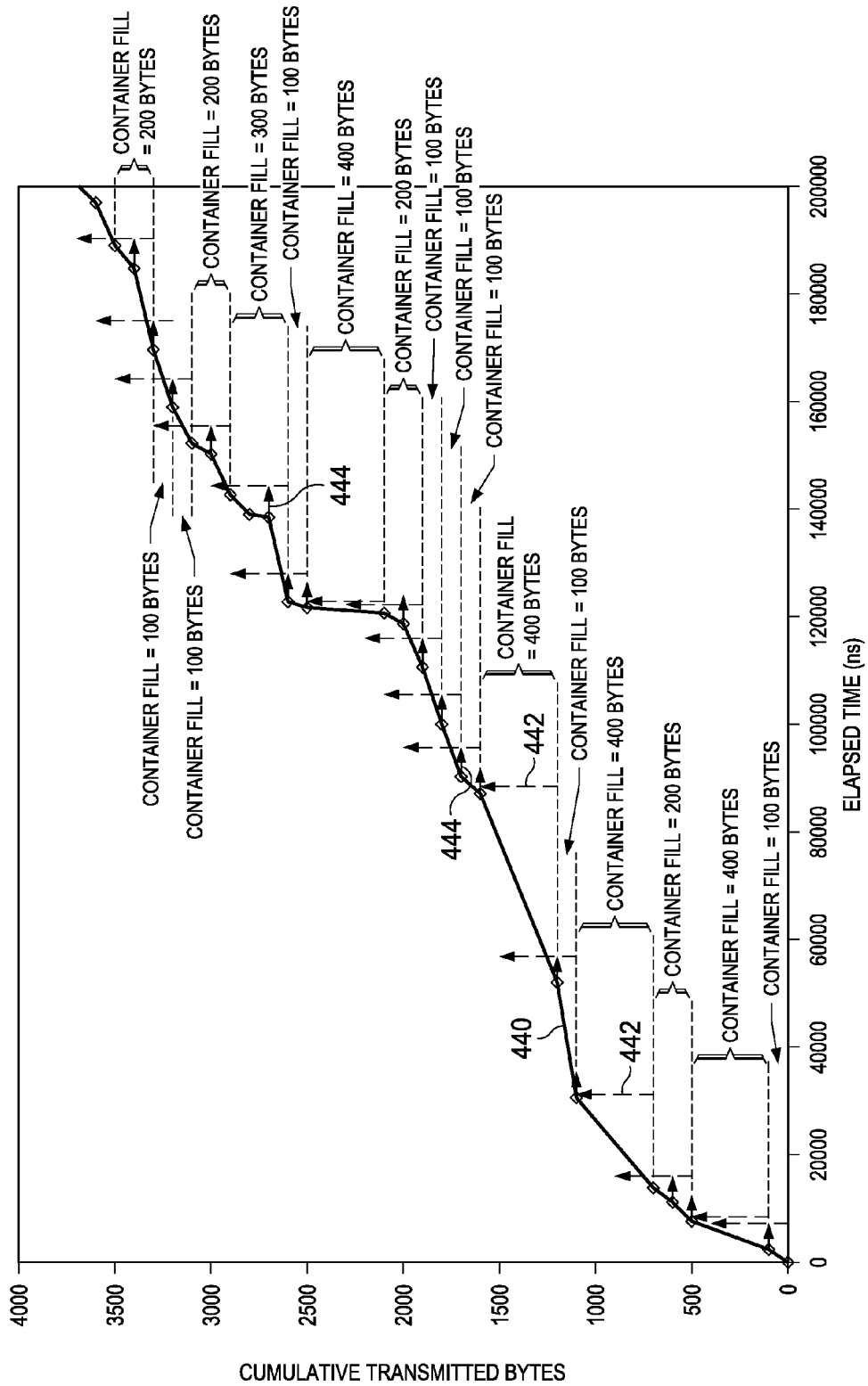
FIG. 17 illustrates an additional graph of cumulative short packet payloads for a particular TOR over time.
Figure 18:
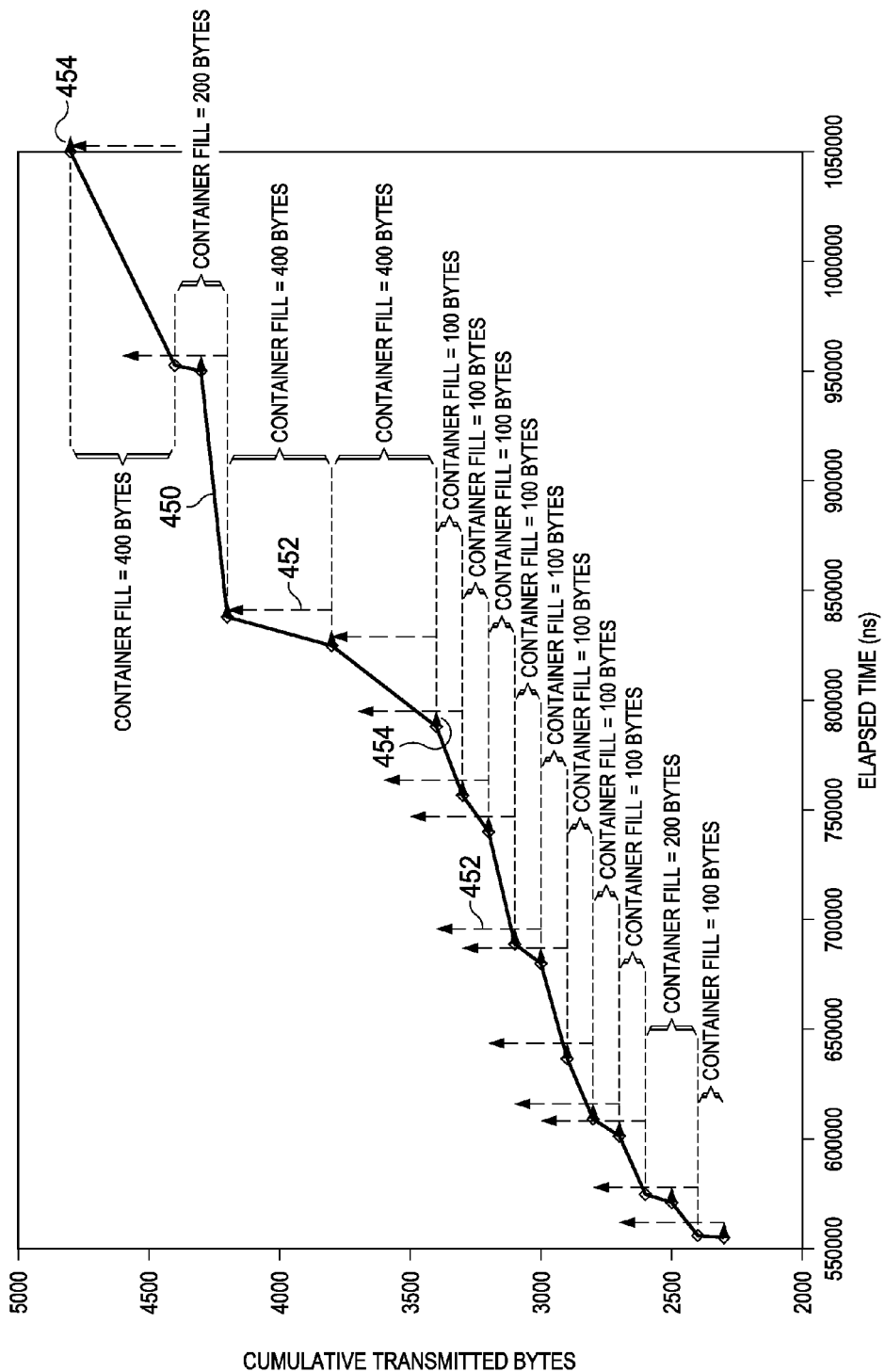
FIG. 18 illustrates another graph of cumulative short packet payloads for a particular TOR over time.
Figure 19:
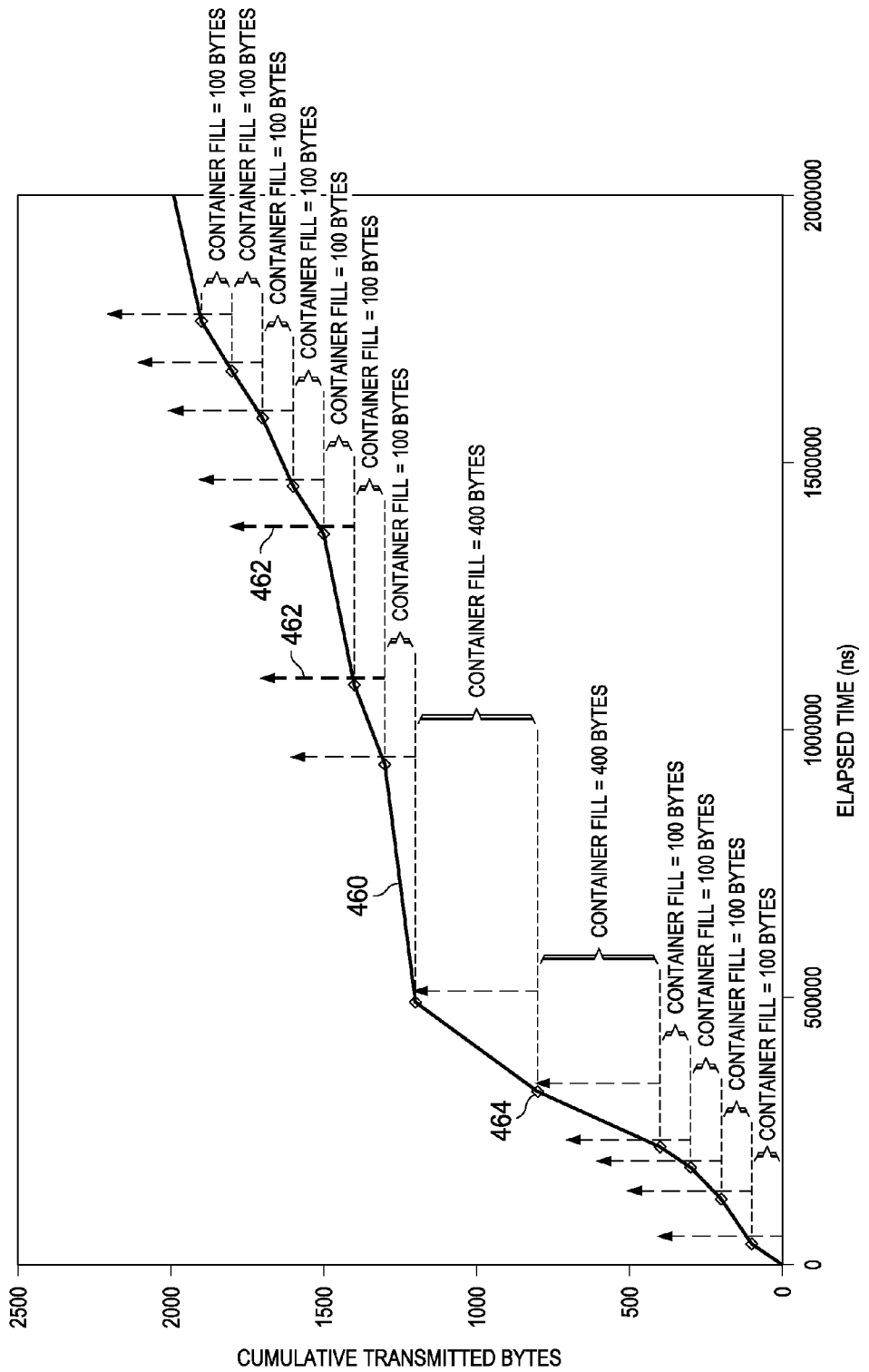
FIG. 19 illustrates an additional graph of cumulative short packet payloads for a particular TOR over time.

FIGS. 11-14 illustrate the behavior of the containerization process of a 10,000 byte containerized burst mode switch, and FIGS. 17-19 show the behavior of a short packet path of 10,000 byte containerized burst mode switch, and FIGS. 17-19 show the behavior of a short packet path of the dual path switch structure shown in FIG. 15. FIG. 17 shows results for a short packet 400 byte container for 64 addresses in a 100 Gb/s packet stream. A 5 µs timeout on 400 byte mini-containers is used, with a short packet threshold of 400 bytes when no container concatenation is used or with up to 800 bytes with a maximum and infrequent concatenation of 2. Diamonds 440 show the arrival of packets, lines 444 show the timeout period, and lines 442 show the container transmission, while diamonds 440 trace out the cumulative capacity delivered to the destination as a function of time. At 64 destinations per source and a 5 µs timeout, with a long/short packet bandwidth split of 91:9, the multi-short packet transport containers are approximately 51.5% full, resulting in a bandwidth growth of less than 2:1 on only the 9% of traffic of the short packets. The short packet container switch has approximately the same throughput capacity as the long packet switch, because it has the same number of ports and the same potential bandwidth per port. Thus, the short packet container switch may handle this bandwidth growth because, for a 9% traffic level, it can support this bandwidth expansion.

FIG. 18 shows results for a short packet 400 byte container with 256 addresses per TOR with a 100 Gb/s packet stream and 5 µs timeout, and a short packet threshold of 400 bytes without container concatenation. Curve 450 shows the packet arrivals, lines 454 show the timeout, and lines 452 show the short packet transmission times. With a long/short packet bandwidth split of 91:9, the short packet containers are approximately 44.6% full, resulting in a 2.24:1 bandwidth growth for only the 9% of traffic which are short packets. The short packet switch may readily handle this bandwidth growth since, for a 9% traffic level it can support this bandwidth expansion.

FIG. 19 shows results for a short packet 400 byte container with 1024 addresses per TOR with a 100 Gb/s packet stream and 5 µs timeout, and a short packet threshold of 400 bytes with no container concatenation. Curve 460 shows the packet arrival, lines 464 show the timeout, and lines 462 show the short packet transmission times. With a long/short packet bandwidth split of 91:9, the short packet containers are approximately 36.5% full, resulting in a 2.73:1 bandwidth growth for only the 9% of traffic which are short packets. The short packet switch may readily handle this bandwidth growth since, for a 9% traffic level it can support in excess of 10:1 bandwidth expansion. The overall bandwidth growth in the dual core switch of FIG. 15 is less than 2:1 on 9% of the traffic with no fragmentation-related growth on the other 91%, for an overall bandwidth growth of about 1.2:1 for 64 randomly assigned destinations, compared to more than 4:1 growth across the entire switch capacity for a 10,000 byte containerized burst mode switch at the same level of traffic destination fragmentation. With 256 randomly selected destinations, the overall bandwidth growth of the switch of FIG. 15 is 2.24:1 on 9% of the bandwidth with no fragmentation related growth on the other 91%, for an overall bandwidth growth of less than 1.25:1 compared to a 6:1 growth across the entire switch capacity for a 10,000 byte containerized burst mode switch at the same level of traffic fragmentation. With 1024 randomly selected destinations, the overall bandwidth growth in the switch of FIG. 15 with a port count of 1024×1024 is 2.73:1 on 9% of the bandwidth with no fragmentation related expansion for the other 91%, for an overall bandwidth growth of less than 1.3:1, compared to a 10:1 growth across the entire switch capacity for a 10,000 byte containerized burst mode switch at the same level of destination fragmentation.

Because the fragmentation-based bandwidth growth of the dual core switch only impacts the 5-15% of the traffic carried on the short packet photonic switch, and the short packet photonic switch has the same potential throughput capabilities as the long packet photonic switch, the short packet photonic switch easily handles bandwidth expansions of about 6-6.5 times when 15% traffic is short packet traffic and of about 18-20 times bandwidth expansion when 5% of traffic is short packet traffic.

The processing of the short packets depends on the form of switch. The short packets may be placed in fixed length containers of the same length and capacity as the long packet containers, or of a smaller length and/or capacity. Also, short packet containers may be concatenated to handle the longest short packets when the container length is set below the long/short threshold. The packet splitter performs a variety of functions. The source to destination TOR address is determined. Also, the packet length is determined and compared to a pre-set threshold. The packets are split into sub-streams based on the destination. Sequence numbers are assigned to each packet for each TOR-to-TOR stream flow for maintaining sequence integrity at the packet combiner. Long packets are padded to a fixed payload length, and a packet or padding boundary pointer is generated. The headers and trailers for the long packets are generated. For short packets, the container timeout is initiated and tracked, and a new short packet container is generated when there is not already a short packet container for the same flow. Packets are mapped to the appropriate container payload based on the destination address, and information is generated on the boundary between packets for short packet containers. The container headers and trailers are generated for the short packet containers. Long packets and short packets are containerized. The common channel signaling of container connections is transmitted to the photonic switches in advance of the containers. In one example, long packet containers are accelerated to maintain traffic capacity, expand the IPG/ICG, and handle bursts of shorter long packets. Further conditioning of short packet containers is performed, depending on the short container photonic switch. The containers are sent at a fixed time after the connection request or to correspond to a fixed frame number with sufficient lead time for the switch control structure to set up the connection, but not necessarily to receive an ACK or a NACK back at the source packet splitter. Copies of transmitted containers are stored for retransmission in the event of a NACK being received due to switch output contention. The containers are retransmitted upon receiving a NACK. When an ACK is received, the containers are discarded.

Figure 20A:
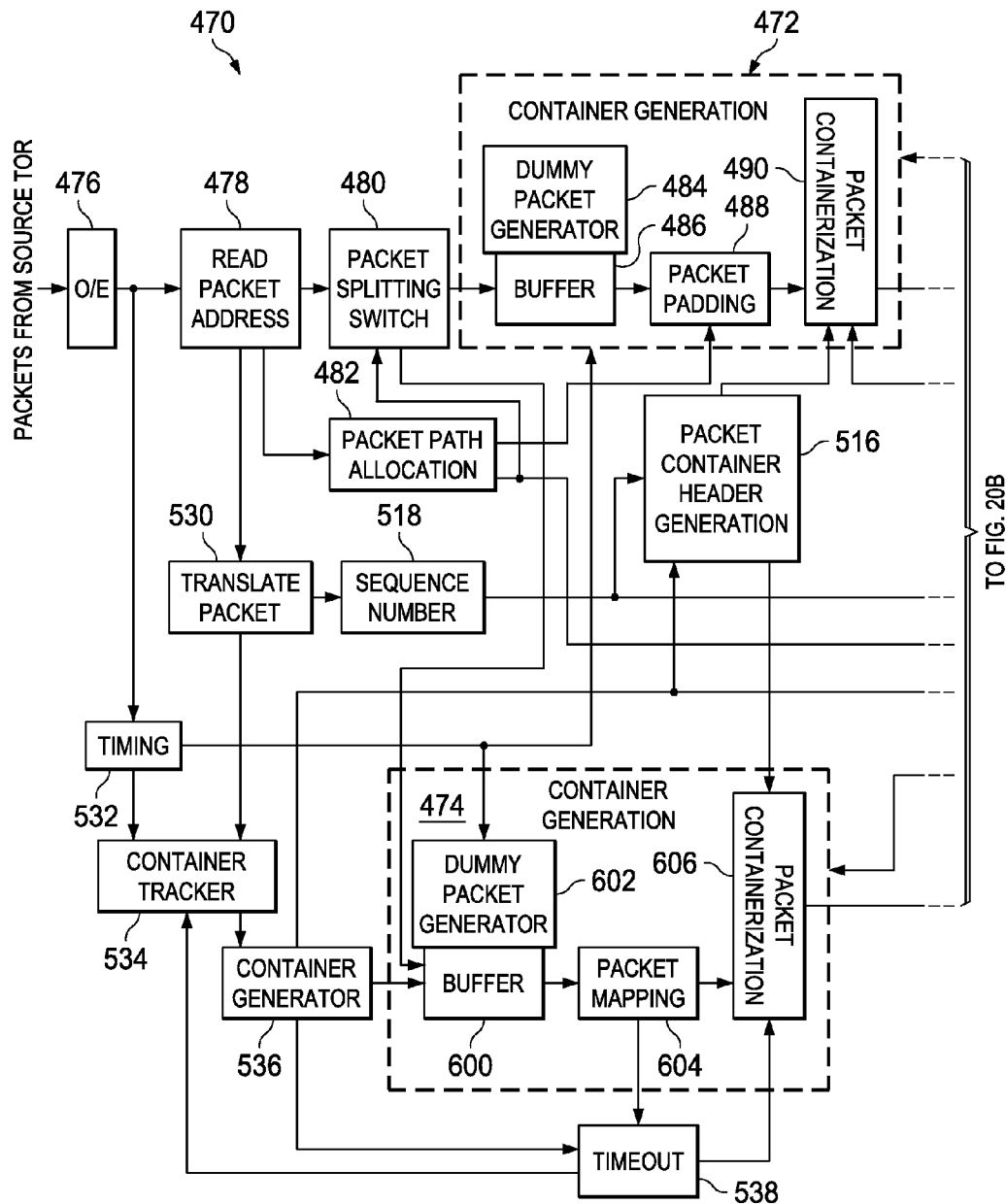
FIGS. 20A-B illustrate an embodiment packet splitter.
Figure 20B:
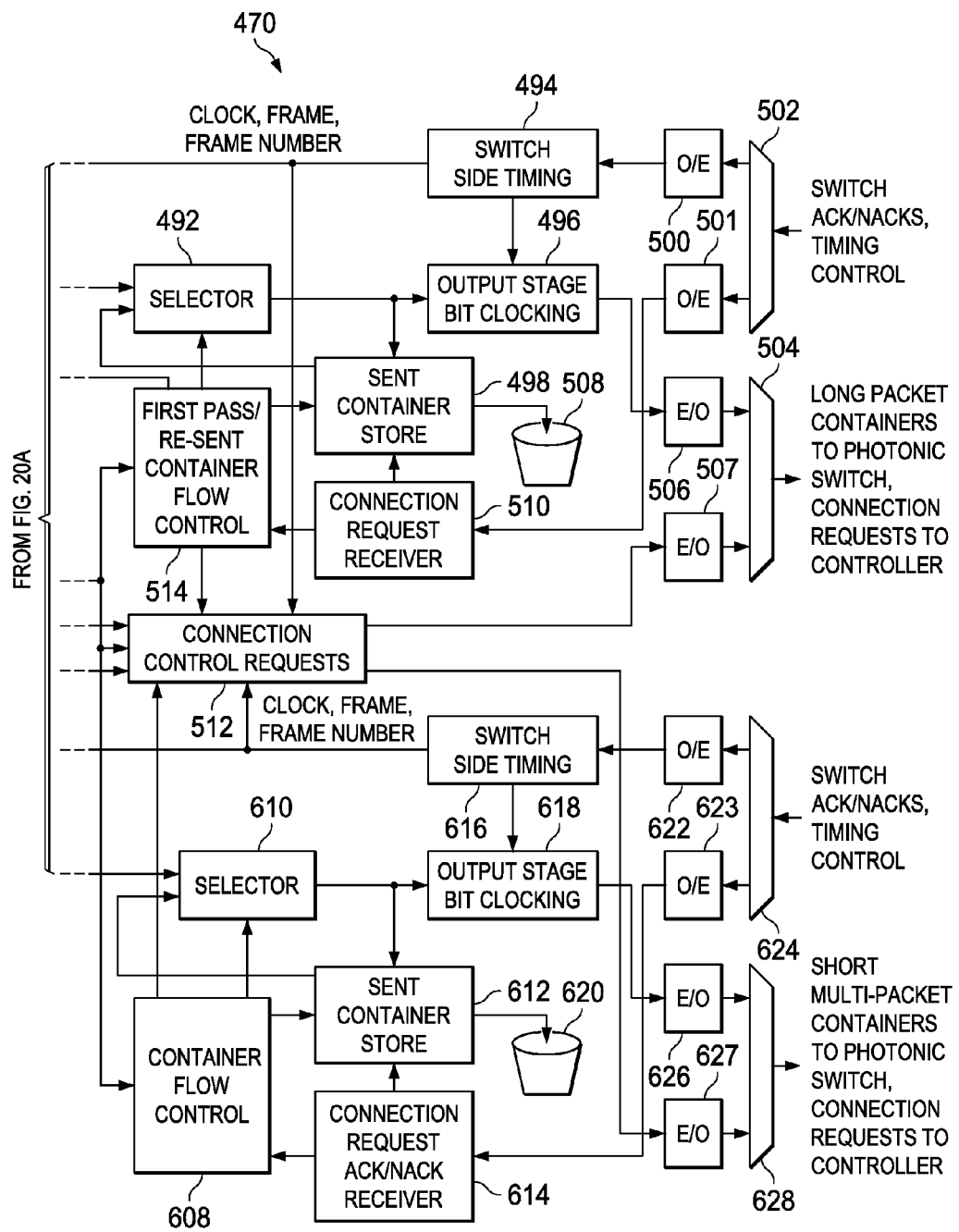

FIGS. 20A-B illustrate packet splitter 470. Packet splitter 470 is depicted as a standalone device, but it may be integrated into a TOR. A 100 Gb/s data stream of packets to be switched enters the packet splitter from the source TOR. This packet stream is converted from an optical stream to an electrical stream by optical to electrical (O/E) converter 476, a step which would not be used when the packet splitter is integrated into the TOR side interface. The optical/electrical conversion may be done using a byte wide or wider structure to match the clock speeds.

The packet addresses and packet lengths are read in packet address module 478. The packet addresses, which may be specific server/server flow granular addresses, are translated into destination TOR and TOR group address. In one example, this is generated by a process of mapping the destination server/server flow address to the destination TOR address, which is the TOR address for that TOR-dependent server. This may be done by a pre-loaded look-up table, or may be a part of the overall server or server flow address. Alternatively, when the packet address is integrated in a TOR, the destination TOR and TOR group addresses may be directly available. The length of the packet may be read from the packet header, for example from bits 16-31 of the packet header, or by directly measuring the packet length as it enters the address reader.

The packet length information is passed to packet path allocator 482, which compares the packet length to a packet length threshold. In one example, the packet length threshold is fixed. Alternatively, the packet length threshold may be adjusted dynamically, for example on a data center wide basis or a TOR specific basis, so the splitting process can dynamically adapt to the traffic. When the packet length is greater than or equal to the packet length threshold, the packet is determined to be a long packet. When the packet length is less than the packet length threshold, the packet is determined to be a short packet. Packet path allocator 482 passes the decision to packet splitting switch 480. Also, the packet path allocator provides the decision to container generator 536 and connection control request block 512.

Packet splitting switch 480 diverts the individual packets of the streams into long packet processing or short packet processing based on the packet threshold decision from packet path allocator 482.

The long packet stream is fed to container generation block 472, which conditions the long packets. Each packet is containerized, synchronized, and timed for transmission to the long photonic switch. Container generation block 472 contains buffer 486 with dummy container generator 484, packet padding module 488, and packet containerization module 490. There may be separate input and output buffers. As pictured, buffer 486 provides both delay and acceleration based on timing information from timing block 532 to the clock rate, framing, and frame timing of the photonic switch. Thus, the photonic switch side of the long packet container generator is synchronously locked to the photonic switch timing, for the containers from the packet splitters and combiners to arrive aligned and at the same rate at the photonic long packet switch.

The packet stream exiting the buffer is at the photonic switch clock rate, which is faster than the input clock rate. The buffer fill is constantly being depleted. When a packet is read out of the buffer, the buffer output halts while the packet is padded with a padding sequence in packet padding module 488. The padding leads to the packet having a fixed payload length. For example, the packets may be padded to a standard length, such as 1500 bytes. A variable amount of padding may be added based on the actual packet length, which may be between the full packet length and the packet length threshold, which may be in the range of 500 bytes to 1200 bytes. Padding up to 300 to 1000 bytes for the shortest long packets may be added, in these cases increasing their size substantially for the low percentage of packets away from the maximum length.

Because most long packets are close to or at the maximum packet length, padding only introduces a modest bandwidth increase. However, it does introduce a large transient increase in the clock rate during the shorter long packets, especially when a sequence of short long packets occurs. However, these tend to be limited in length. The buffer length, and/or placing some of the buffering at the output of the container generator, leads to the clock rate increase being contained and converted into a small static clock rate increase. An example buffer length for a packet overflow rate of 1 in 10,000 and 1 in 1 million at peak load is shown as a function of resultant clock rate acceleration and long/short packet threshold in FIGS. 4 and 3, respectively.

While the container generation is occurring for one packet, the next packet can be read out of the buffer in the same process. The output clock rate may be a higher multiple above the input clock rate than the average increase in size of the switched entity from the packet padding and containerization process, so the buffer tends towards underflow. Underflow may be avoided by adding dummy traffic by dummy container generator 484. Dummy containers may be used to maintain signals during periods of low packet traffic, for maintenance or test purposes, and/or as very low priority packets or containers which may be preempted, for example for contending traffic containers to be retransmitted. Dummy containers and containers may be generated when no line traffic packet is in the packet splitter, and may be generated on the long packet path, the short packet path or both paths. The dummy containers serve several potential functions, for example as pre-emptable lowest priority containers providing space in the packet splitter processes for stored containers for retransmission to overwrite the dummy containers. They may also be addressed to the destination TOR which has not been addressed in the longest period so as to send an occasional keep alive container for calibration of the optical path to reduce preamble on live traffic containers, or for other maintenance purposes.

Packet container header information is generated in packet container header generator 516 based on the sequence numbers from sequence number block 518, and the source and destination TOR address contents and values of other container parameters.

Packet containerization module 490 adds the header and footer to the padded long packet to produce a long packet container. While this is occurring, the buffer begins to fill again. Buffer output gapping may also be used both to facilitate the IPG/ICG at the destination TOR packet combiner and to provide skew plus physical set up time on the photonic switch matrix. Alternatively, a buffer is placed at the output of the container generation block to increase the ICG to relax the switch set-up time between switching frames by time compressing the container. The packet containerization module also performs a CRC calculation over the assembled containerized padded packet and writes the computed CRC checksum data in the container. The container then exits container generation block 472 for selector block 492.

Selector block 492 may interrupt the flow of containers out of container generation block 472, for example for transmission or retransmission of a container which has not been delivered. The selector is controlled by a control algorithm, which may, for example, transmit valid new traffic first. In this example, the selector causes the newly formatted containers from the container generation module to flow through to the output stage bit clocking block 496 for a steady stream of new traffic, minimizing delay on new traffic until a dummy container is generated. However, this may result in significant delay for traffic containers to be retransmitted, which may build up a backlog of traffic to be retransmitted in heavy traffic. This may lead to incorrect sequencing of the containers in the output flow or saturating the sent container store 498. Incorrect sequencing may be prevented by using packet-associated sequential per-packet stream number sequences, which facilitates the detection of incorrect sequencing at the packet combiner, and correcting the sequence before the streams exit the packet combiner. However, other retransmission approaches may be used, including retransmitting the packets first, which minimizes the delay of retransmitted containers, but results in a short hold time for the incoming traffic while the container is inserted. This does not disrupt the relationship between connection requests and transmitting new containers when the retransmission decision is at least one container signaling delay ahead of the actual retransmission of a stored container. In an additional example, instead of receiving a NACK, the packet splitter receives a frame number that the switch controller has reserved for retransmitting the rejected payload. Then, the frame numbers for the new containers already signaled but not yet transmitted may be shifted one frame under coordination between the switch controller and the packet splitter.

Packets passed to output stage bit clocking block 496 are also written into sent container store 498, where they are stored until an ACK or a NACK is received from the long packet photonic switch. The ACK or NACK may arrive before or after the container is written to the sent container store. The ACK or NACK may arrive with a time lag of the switch processing delay plus about twice the propagation time to the long packet photonic switch from the time of flight of the optical signal over fiber between the packet splitter and the core switch. If an ACK is received, the container is deleted from the sent container store into trash 508. If a NACK is received, the container is marked for retransmission.

ACKs, NACKs, and timing control information are received in wavelength division demultiplexer 502 from the long packet container switch. The ACKs/NACKs are on one wavelength, and the timing control information is on another wavelength.

The ACKs/NACKs are routed to O/E converter 501, to be converted from optical signals to electrical signals.

The electrical signals are routed to connection request receiver 510. Connection request receiver 510 requests that sent container store 498 deletes a container when an ACK is received, and requests a retransmission in container flow module 514 when a NACK is received.

When the sent container store has a container for retransmission and a dummy container has been created in the initial buffer, the packet container slot is usurped by selector block 492 when the dummy container emerges. In the meantime, connection control request block 512 requests a connection for the container to be retransmitted from the long packet photonic switch. When the dummy container reaches the selector switch, it is discarded, and the selector connects the sent container store to output stage bit clocking block 496 to retransmit the stored container.

The sent container store 498 may store 100 Gb/s packets for up to about 5-10 µs, at which time an ACK or NACK may be received. For a 500 m connection, the time of flight is around 2.5 µs, or 5 µs for a round trip, to which the switch control and connection processing time of up to 5 µs is added. This may require a storage capacity of about 500 kbits or 64 kB.

Output stage bit clocking block 496 provides fine tuning of the data timing into electro-optic conversion so the arrival time of the start of the container is precisely aligned in time with the start of the switch frame at the input to the long packet switch. Additional details on the timing are included in U.S. patent application Ser. No. 14/508,676.

The containers are transmitted to electrical-to-optical (E/O) converters 506 to convert the optical signals from the electrical domain to the optical domain. The connection request is multiplexed with the connection request by WDM 504, for transmission of the long packet containers to the long packet container photonic switch.

Read container address module 478 passes the container address to translate container block 530, where the container address is converted into a destination TOR address, which is passed to connection control request block 512 via sequence number block 518.

Connection control request block 512 associates the address with a particular frame number indicating the timeslot for which a connection will be requested, for either the long or short packet, depending on the packet size. The address is then mapped into a messaging format for propagation to E/O 507 for a long packet container, where it is converted from an electrical signal to an optical signal. It is then wavelength division multiplexed by WDM 504 with the long packet traffic. The use of WDM allows the use of a single fiber for the long packet container path, reducing the number of optical fibers and ensuring a similar delay in time of flight. Connection control request block 512 also transmits retransmission requests for packets from sent container store 498.

Timing control information is converted from an optical signal to an electrical signal in O/E converter 500.

Then, switch side timing module 494 adjusts the timing based on this received signal.

Short packets are routed by packet splitting switch 480 into the short packet path, where the short packet stream is fed into the short container generator 474. Short container generation block contains buffer 600 coupled to dummy container generator 602, packet mapping module 604, and packet containerization module 606. Container generator 536 feeds a delineation marker to define the start and end of a new container payload.

Buffer 600 accumulates short packets, and may be loaded with dummy containers from dummy container generator 602 when there are no short traffic packets to create a short dummy container. Buffer 600 provides a controlled delay for timing the containers. Rate conversion from the clock rate extracted from the input data by timing block 532 to the output clock rate is performed. Switch reference timing information is provided from the short packet photonic switch. Thus, the multiplexed short packet container side of the splitter is synchronously locked to the photonic switch timing. The packet stream exiting the buffer in the form of concatenated containers is at the photonic switch clock rate, which is faster than the input clock rate. Thus the buffer fill is constantly being depleted. Because the buffer output clock rate is greater than the input clock rate, the buffer tends towards underflow. Dummy containers can be inserted as needed to prevent underflow, to keep the signals alive during periods of low packet traffic, for maintenance and/or testing, and/or as low priority packets/containers.

The packets are mapped to containers in packet mapping module 604. The generation of a new container is controlled by timeout block 538, which sets the accumulation delay. When the container payload fills, the container can be sent.

The container header and trailer are added to the short packet container by packet containerization module 606. Some of this information is received from packet container header generator 516, which uses the sequence number from sequence number block 518 and container information from container generator 536.

Containers exiting short container generator 474 have been containerized, synchronized, and timed to arrive at the short packet photonic switch at the correct phase. After sufficient time for the switch control to either complete a connection map or for the switch control to directly address the switch, the next container is read out from the buffer.

Selector 610 may interrupt the flow of containers from short container generator 474, for example for retransmission of a container which has not been successfully delivered. The selector is controlled by a control algorithm. For example, newly formatted containers from short container generator 474 may have priority over retransmitted containers for a steady stream of new traffic to output stage bit clocking block 618, and to reduce the delay for new traffic. However, this may significantly delay containers for retransmission, leading to a backlog of containers in heavy traffic conditions, which may lead to problems in container sequencing or the saturation of sent container store 612. Sequencing problems may be corrected for by using a packet-associated sequential per-packet stream numbering sequence for detection and correction of sequence problems at the packet combiner. In other examples, retransmitted containers may be prioritized over new containers. In an alternative example, the connection control request module transmits a frame number reserved for retransmitting the rejected container, and the frame numbers for the new containers which have not yet been transmitted are shifted by one frame.

Packets passed to output stage bit clocking block 618 are sent to the core switch and are also stored as copies in sent container store 612, where they are stored until receiving an ACK or a NACK. If an ACK is received, the stored container copy is discarded in trash 620, because the ACK signifies that the transmitted container would have been switched. The stored container is marked for retransmission if a NACK is received. The ACK or NACK may arrive before or after the container is initially transmitted.

Incoming ACKs, NACKs, and timing control from the core switch are received by wavelength division demultiplexer 624, which separates the ACKs/NACKs from the timing control information. Timing control information is converted from an optical signal to an electrical signal by O/E converter 622. Then, switch side timing block 616 adjusts the timing in output stage bit clocking block 618 based on the timing control information.

The ACKs and NACKs are also converted to electrical signals by O/E converter 623. Then, they are received by connection request ACK/NACK receiver 614. When an ACK is received, connection request ACK/NACK receiver 614 causes the container to be discarded from sent container store 612. When a NACK is received, connection request ACK/NACK receiver notifies container flow control module 608.

Container flow control module 608 retransmits the container based on the selection algorithm.

When sent container store 612 has a container marked for retransmission, and a dummy container is being created in buffer 600, the packet container slot is usurped by selector 610. In the meantime, connection control request block 512 requests a connection for the container to be retransmitted. When the dummy container reaches the selector, it is discarded, and the selector connects sent container store 612 to output stage bit clocking block 618 for retransmission.

The sent container store may have capacity to store containers for about 5-10 μs, which may be approximately the round trip time to the short packet photonic switch. This may require about 64 kB of storage.

Output stage bit clocking block 618 provides final fine tuning of the data timing so the container arrives at the short packet switch precisely aligned to the start of the switch frame.

After retiming, the containers are passed to E/O converter 626 to be converted from the electrical domain to the optical domain.

The optical signals are multiplexed by WDM 628 for transmission to the short packet photonic switch. The containers are WDM multiplexed with the connection request optical carrier and sent to the core photonic switch.

Read packet address module 478 determines the address of the container, and passes the packet address to translate container address block 530, where the packet address is converted into a destination TOR group TOR address. In some examples, translate packet block 530 is not used. This address is passed to container tracker 534.

Container tracker 534 determines whether a container to that destination is already open and accepting additional payload packets, i.e., a container to that address was opened less than a timeout period previously, and it still has remaining payload capacity. When a container is available, the new packet is added to the payload of that container. When there is not an open container for the destination, the container tracker notifies container generator 536.

Container generator 536 then generates a new container to that destination, and the packet becomes the first packet in the new container. Also, container generator 536 passes a connection request to connection control request block 512 to request a connection for the new container. A container is completed either at the expiration of the timeout or when the container is full. Short container generator 474 generates a full signal to clear the residual time in the timeout block 538 when the container approaches being full, when the remaining space is less than the length of the next packet. Then, the new packet becomes the first packet of the next container.

Connection control request block 512 associates a requested container destination address with a particular future frame number for either a long packet container or a short packet container, depending on whether the container is to be switched by the long packet photonic switch or the short packet photonic switch. This is gated by the mapping of packets to containers. The address is mapped into a messaging format for propagation to the long or short packet photonic switch control system. For a short packet, the request is converted to an optical signal by E/O converter 627, and multiplexed by WDM 628 with the short packet traffic to the short packet core switch. Similarly, for a long packet, the request is converted to an optical signal by E/O converter 501 and multiplexed by wavelength division demultiplexer 502 to the long packet photonic switching fabric. This facilitates the use of one optical fiber between the packet splitter and the long packet photonic switching fabric and one optical fiber between the packet splitter and the short packet photonic switching fabric. Also, the time of flight is similar between the traffic and the connection requests.

Figure 21:
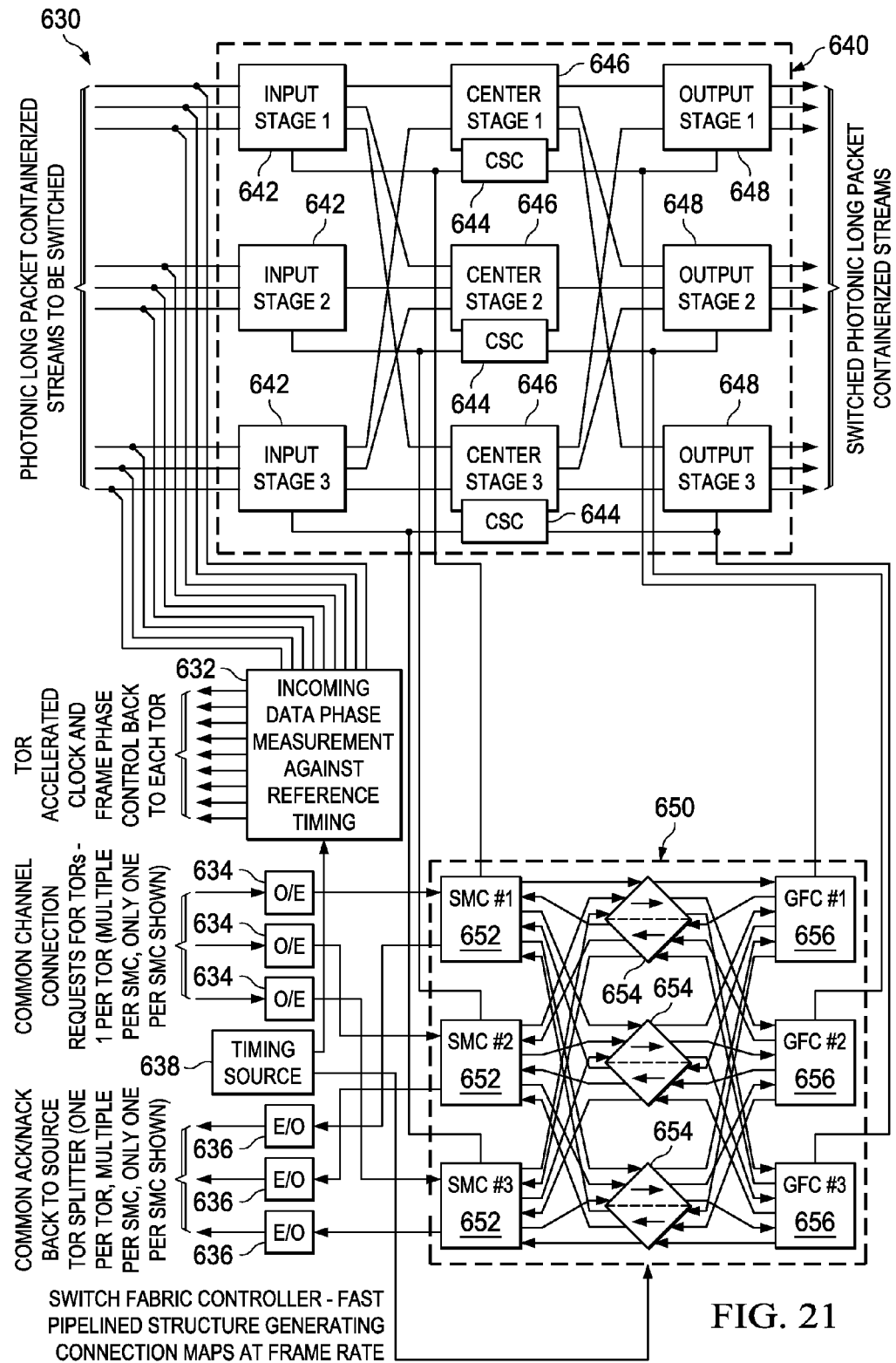
FIG. 21 illustrates an embodiment photonic switch.

FIG. 21 illustrates photonic switch 630, which may be used as a long packet photonic switch. Photonic switch 630 shows photonic switch fabric 640, a three stage Clos structure, but a variety of structures, for example matrixed switching fabrics, may be used. Input stage modules 642 and output stage modules 648 are optical space switches. Center stage modules 646 may be optical space switches with fixed wavelength sources within the packet splitters, as detailed earlier, or arrayed waveguide grating routers (AWG-Rs), and the packet splitter uses a fast wavelength agile optical source which sets the wavelength path through the AWG-R. In one example, center stage modules 646 include CSCs 644. The optical space switches may be electro-optic silicon switches or GaAsInP/InP active amplifying crosspoint switches. The photonic long packet container streams are received and switched by photonic switch fabric 640. Additional details on example photonic switching fabrics are discussed in U.S. patent application Ser. No. 14/455,034 and U.S. patent application Ser. No. 14/710,815.

In advance of the photonic switching, the connection requests are received by OLE converters 634 from the TORs. There is one input connection request per input TOR per switch frame period. The connection requests are directed towards switch fabric controller 650.

Switch fabric controller 650 contains a parallel array of SMCs, where each SMC is associated with an input stage module, and GFCs, where each GFC is associated with an output stage switch module. The switch fabric controller may optionally include an array of CSCs, each associated with a center stage module. The processors contain of a pipeline of series processors which are interconnected with other processors at specific points in the pipeline by a series of orthogonal mappers. Each stage of each processor performs a specific sub-task or set of sub-tasks of the overall process of generating a connection map before handing over the results of its sub-task to the next processor in the pipeline, either directly or via the orthogonal mapper. This facilitates the generation of a very fast delivery rate of connection maps to match the switch frame time, although these maps may individually be delivered after multiple frame times have elapsed, with a connection request about 2-5 µs before the active switching frame is reached. This overall structure performs fast pipelined control to generate connection maps at the frame rates. Switch fabric controller 650 includes SMCs 652, orthogonal mappers 654, and GFCs 656. The switch fabric controller creates an ACK when a connection is achieved, and a NACK when a connection is not achieved. Additional details on a switching structure are included in U.S. patent application Ser. No. 14/455,034 filed on Aug. 8, 2014, and entitled "System and Method for Photonic Networks," which this application incorporates hereby by reference.

Some requested connections through the switch cannot be completed, for example because more than one input requests a given output in a given timeslot. Also, the computations may not set up every connection path every time by the end of the control process. When a connection request is not completed, a NACK is generated and returned to the appropriate packet splitter. The packet splitter then attempts to retransmit the copy of the container, which has been stored. When the container path is successfully established, the switch transmits an ACK to the packet splitter, which discards the stored copy of the container. A large majority of containers are successfully connected on a first attempt when there is not heavy overloading of a specific destination TOR, for example from too many other TORs attempting to communicate high bandwidths to that TOR. The ACKs and NACKs are transmitted to the source TORs after being converted to optical signals by E/O converters 636.

The photonic long packet container optical signal is asymmetrically power split, and a small amount of the optical power is routed to data phase measurement module 632, which compares the phase against reference timing from timing source 638, and provides feedback to the TORs on the frame timing. The data phase measurement module detects the received container start point phase, which is the location of the ICG, compares this with the switch clock phase, and feeds back a phase correction signal to the packet splitter, so the containers may be correctly phase aligned with the switch clock and frame switching phase when they reach the switch inputs after transiting on the intervening fiber cabling.

Figure 22:
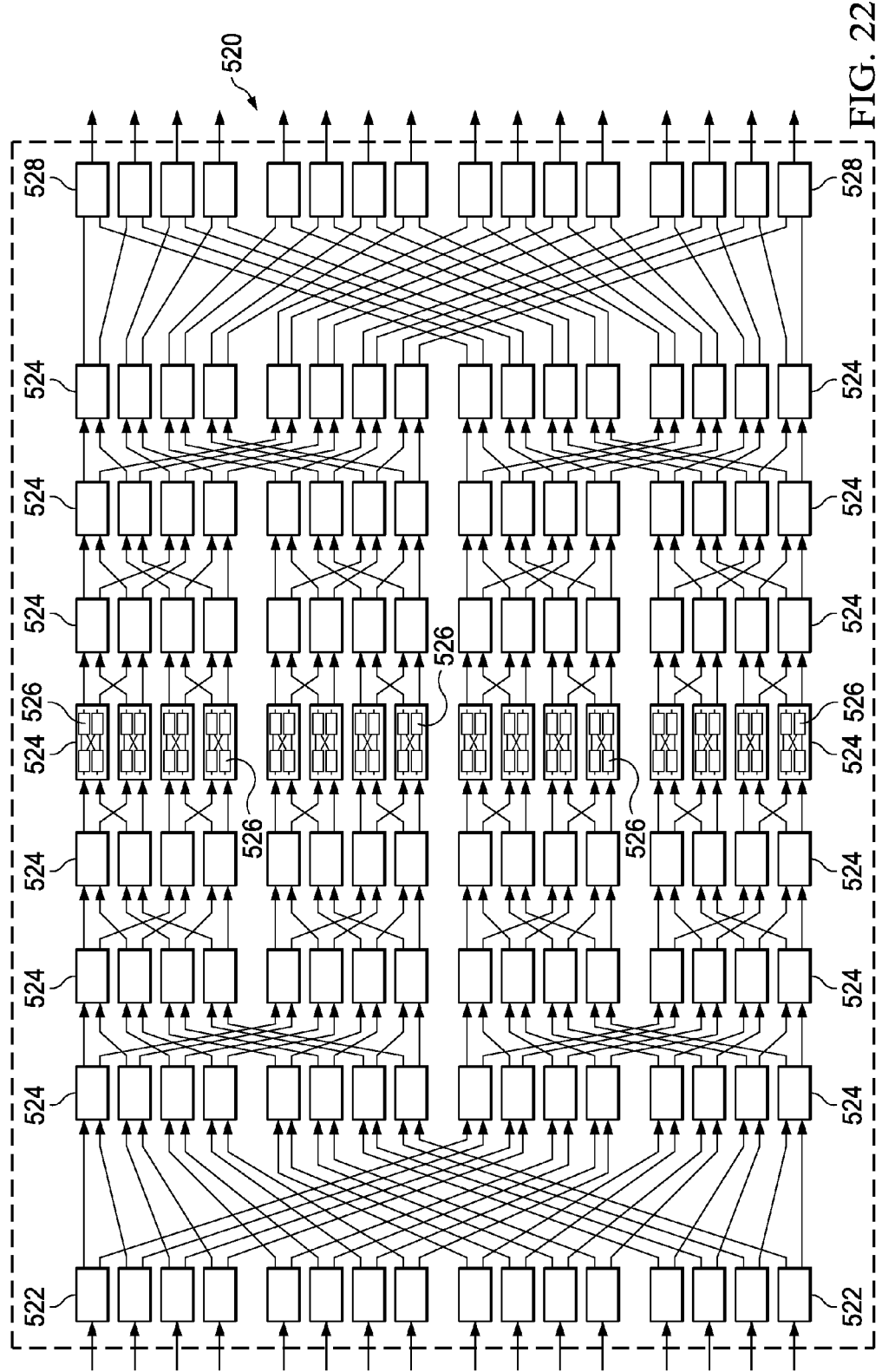
FIG. 22 illustrates an embodiment hybrid dilated Benes (HDBE) photonic integrated circuit (PIC)

The switching stage modules may contain photonic crosspoint switches. One example photonic crosspoint switch is a hybrid dilated Benes (HDBE) photonic integrated circuit (PIC) implemented with 2×2 electro-optic silicon Mach Zehnder switches. FIG. 22 illustrates a 192 cell indirectly addressable HDBE 16×16 switching matrix 520. Input cells 522 receive the inputs, which are switched by switches 524. The central stage of the array of switches 524 contains four switches 526 per switch cell. The outputs are organized by output cells 528. The HDBE switch has path-to-path connection interactions which involve the planning of a given input-output connection in the context of the other input-output connections. In a synchronous application without random pre-existing paths, a set-up algorithm is applied.

Figure 23:
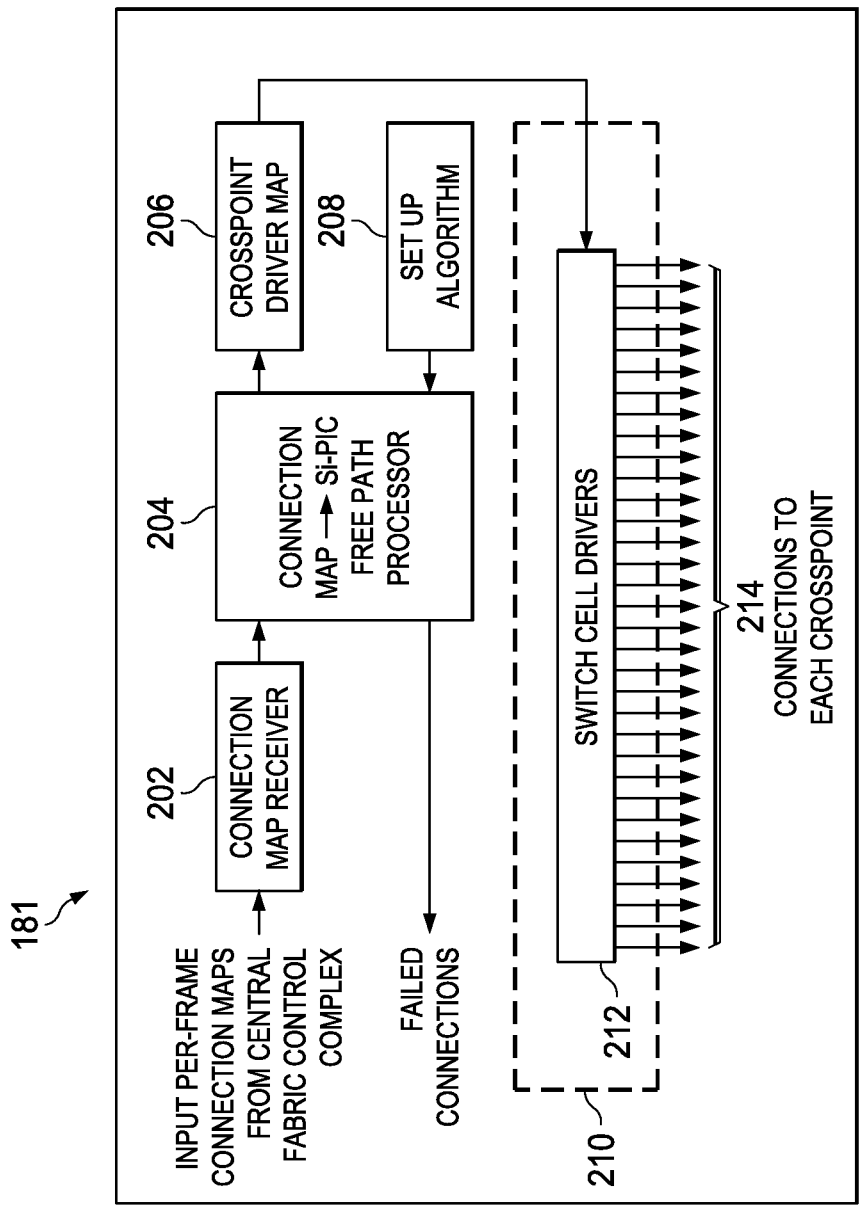
FIG. 23 illustrates an embodiment HDBE PIC controller.

FIG. 23 illustrates control module 181, which may be used to control switching matrix 520. Control module 181 includes connection map receiver 202, which receives an input per-frame connection map from a central control complex. Connection block 204, which converts the received connection map to a PIC free path processor, uses set-up algorithm 208. When there is a failed connection, connection block 204 outputs the failed connection. The connections are output to crosspoint drive map module 206, which determines the crosspoint driver map. Switch cell drivers 212, in block 210, may be intimately associated with the PIC. For example, each switch cell driver 212 may be mounted directly over the PIC it controls, with mechanical and electrical coupling. The switch cell drivers drive the crosspoints using connections 214.

Figure 24:
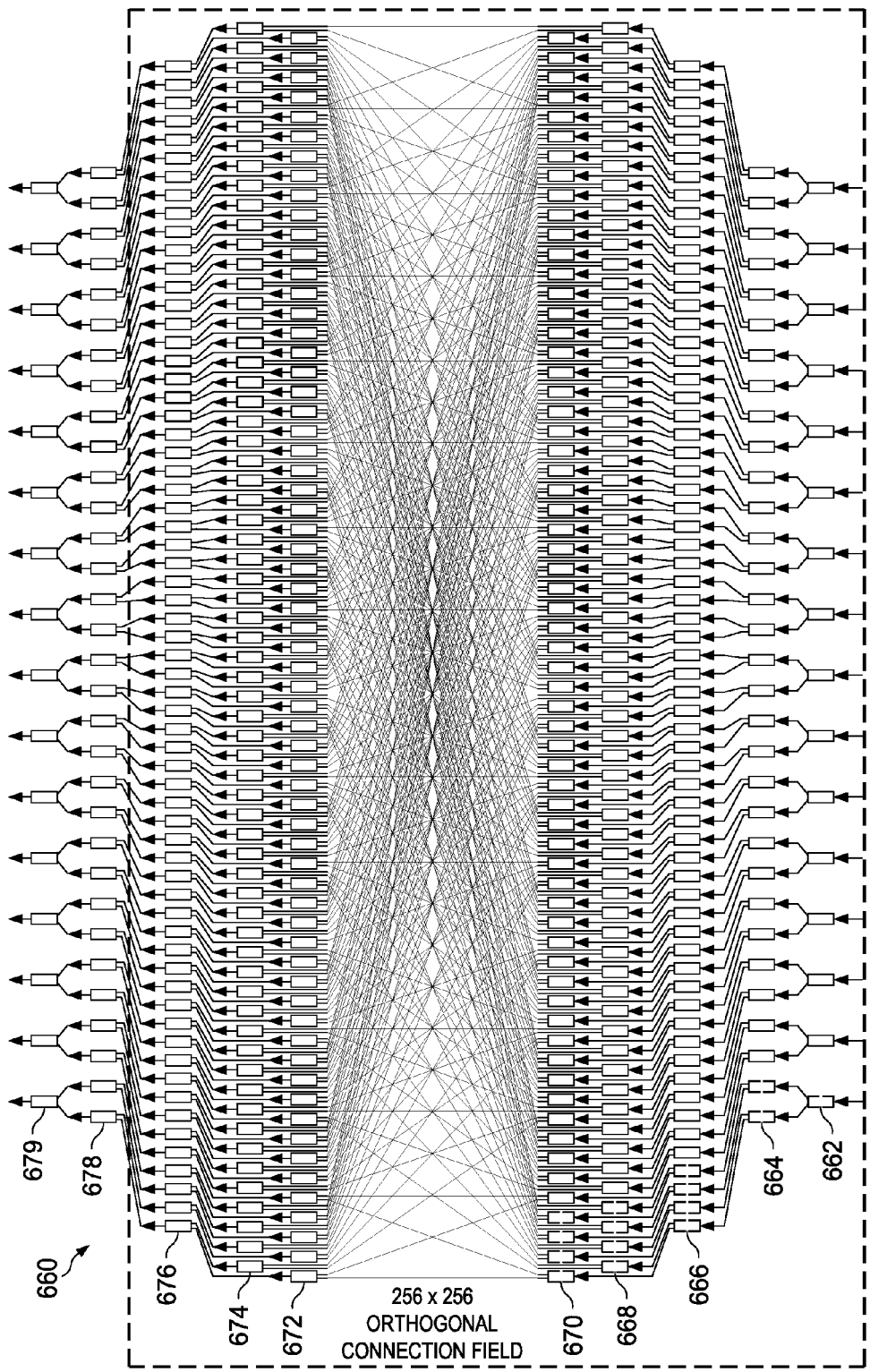
FIG. 24 illustrates an embodiment expand-and-select (EAS) PIC.

In an alternative PIC, an expand-and-select (EAS) PIC is used. FIG. 24 illustrates photonic switch 660, an EAS PIC topology which uses a larger amount of silicon and a higher crosspoint cell count, but which is strictly non-blocking, has good crosstalk properties, and is directly addressable without a free path search. There are multiple layers of coupled 1×2 switches, switches 662, 664, 666, 668, and 670 which form a binary controlled expansion tree. Switches 668 and 670 are coupled to each of switches 672 and 674 by an intermediate 256×256 orthogonal connection field. Alternatively, more complex interconnect patterns may be used in the switch stages, and the central connection field could use sixteen 16×16 interconnect fields. Switches 672 and 674 are coupled to switches 676, which are also coupled to switches 678. Additionally, switches 678 are coupled to switches 679, creating a select tree with one branch of each select being connected to one branch of each expansion tree. Because each switch is a binary 1×2 or 2×1 switch, it may be driven by a single bit of the address, the expansion tree being driven by the output address and the select tree by the input or source address.

Figure 25:
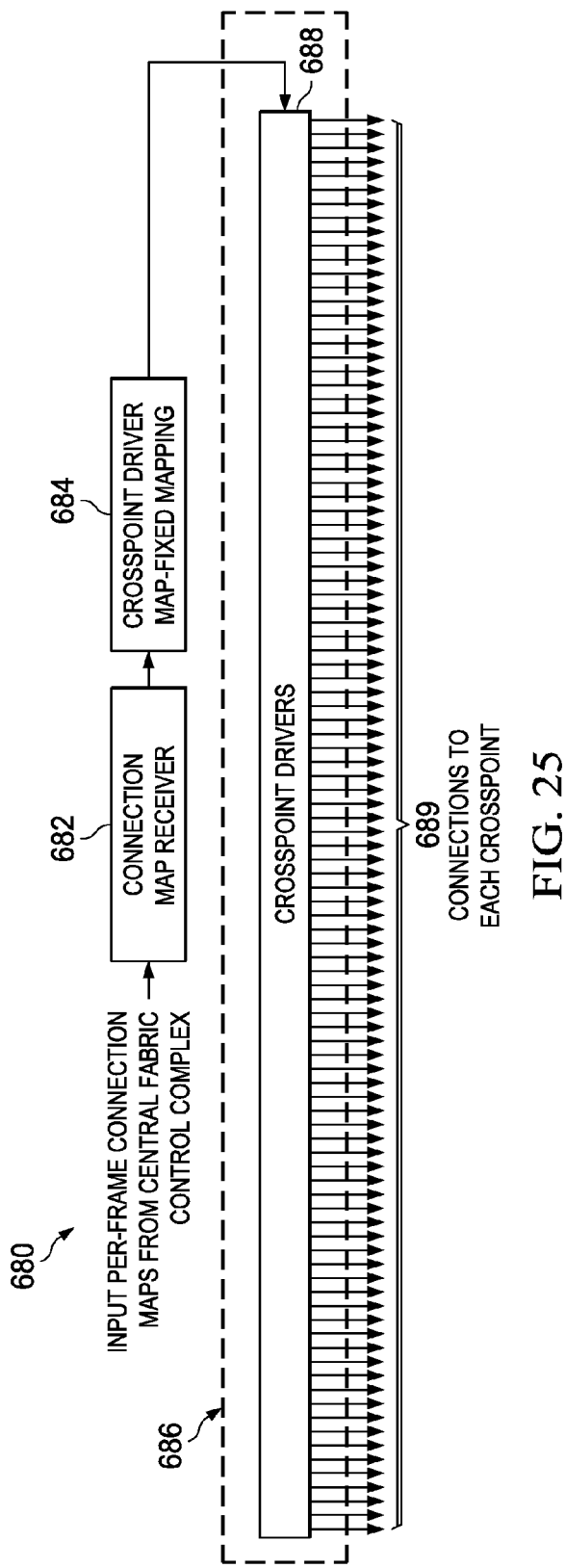
FIG. 25 illustrates an embodiment EAS PIC controller.

FIG. 25 illustrates control system 680, which may be used, for example, to control photonic switch 660. The input per frame connection maps are received from a central control complex by connection map receiver 682. The connections are mapped by crosspoint driver map 684, a fixed mapping. Crosspoint drivers 688 control the connections to the crosspoints with connections 689. Also, crosspoint drivers 688 are in block 686, which is intimately associated with the PIC, for example mounted over the PIC.

The EAS structure is non-blocking and directly addressable, while the HDBE structure is virtually non-blocking and indirectly addressed. A photonic Clos switch fabric based on either the EAS structure or the HDBE structure may be highly dilated for non-blocking capacity at the fabric level and for simplicity in the implementation of the free path search aspects of control. A free path search or free path planning algorithm involves complexity in the control system, because the overall Clos switch fabric would not be directly addressable. In a directly addressable switch, the input to output addressing is constant and known, and is not dependent on other connections. In a highly dilated Clos switch, while a path exits, the intermediate stage-by-stage routing though the switch depends on other connections.

Table 1 shows a comparison between a Clos fabric and a matrix fabric. As the switch size grows, the reduced number of modules of a Clos fabric becomes more significant. However, the Clos input and output modules are rectangular, and have twice the outputs and twice the inputs, respectively, and the center stage modules have twice the inputs and twice the outputs of a matrix module.

TABLE 1

| Number of Input Stages In Parallel | Number of Modules for Clos Switch | Number of Modules for Matrixed Switch | Ratio of Number Matrix Modules to Number of Clos Modules | Ratio of Number of Crosspoints in Non-blocking Matrix Switch to Non-blocking Clos Switch |
|---|---|---|---|---|
| 2 | 6 | 4 | 0.667:1 | 0.25:1 |
| 3 | 9 | 9 | 1:1 | 0.375:1 |
| 4 | 12 | 16 | 1.333:1 | 0.5:1 |
| 6 | 18 | 36 | 2:1 | 0.667:1 |
| 8 | 24 | 64 | 2.667:1 | 1:1 |
| 12 | 36 | 144 | 4:1 | 1.333:1 |
| 16 | 48 | 256 | 5.333:1 | 2:1 |
| 24 | 72 | 576 | 8:1 | 2.667:1 |
| 32 | 96 | 1024 | 10.667:1 | 4:1 |
| 64 | 192 | 4096 | 21.333:1 | 8:1 |

Indirect control, with free path search based addressing of the Clos stages, involves a fast complex control system, where the control process is partitioned into many steps in a pipelined process. Some processing steps are related to the inputs and are performed by an SMC, and some of the steps are based on processing data for the outputs in a GFC. An orthogonal mapper is a fast, hardware based, directed router of information between the SMCs and the GFCs. A pipelined process may take multiple data frames to complete, but may deliver one complete connection map every frame from pipelining. Additional details on pipelined control are included in U.S. patent application Ser. No. 14/455,034.

Figure 26:
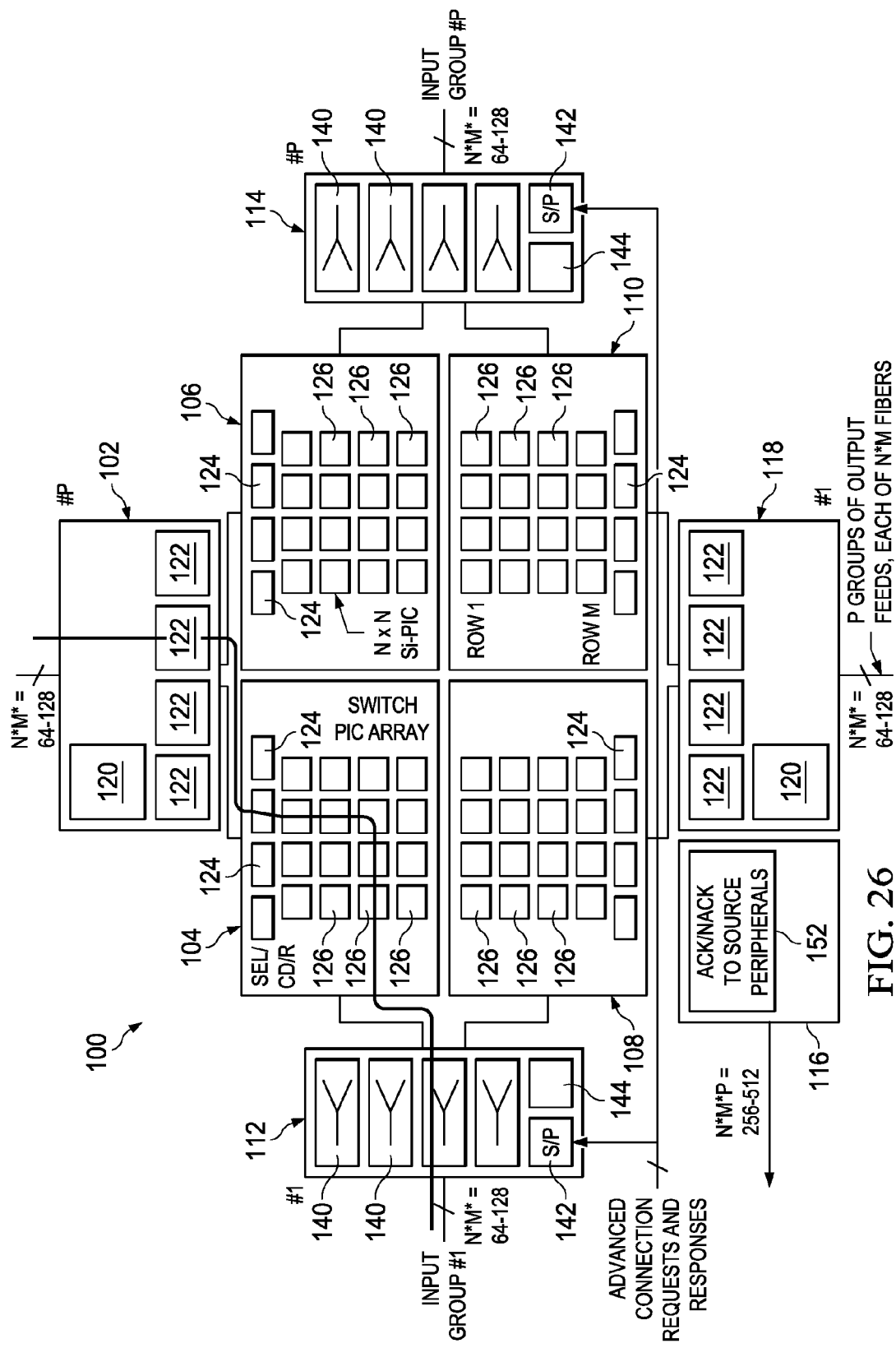
FIG. 26 illustrates another embodiment photonic switch.
Figure 27A:
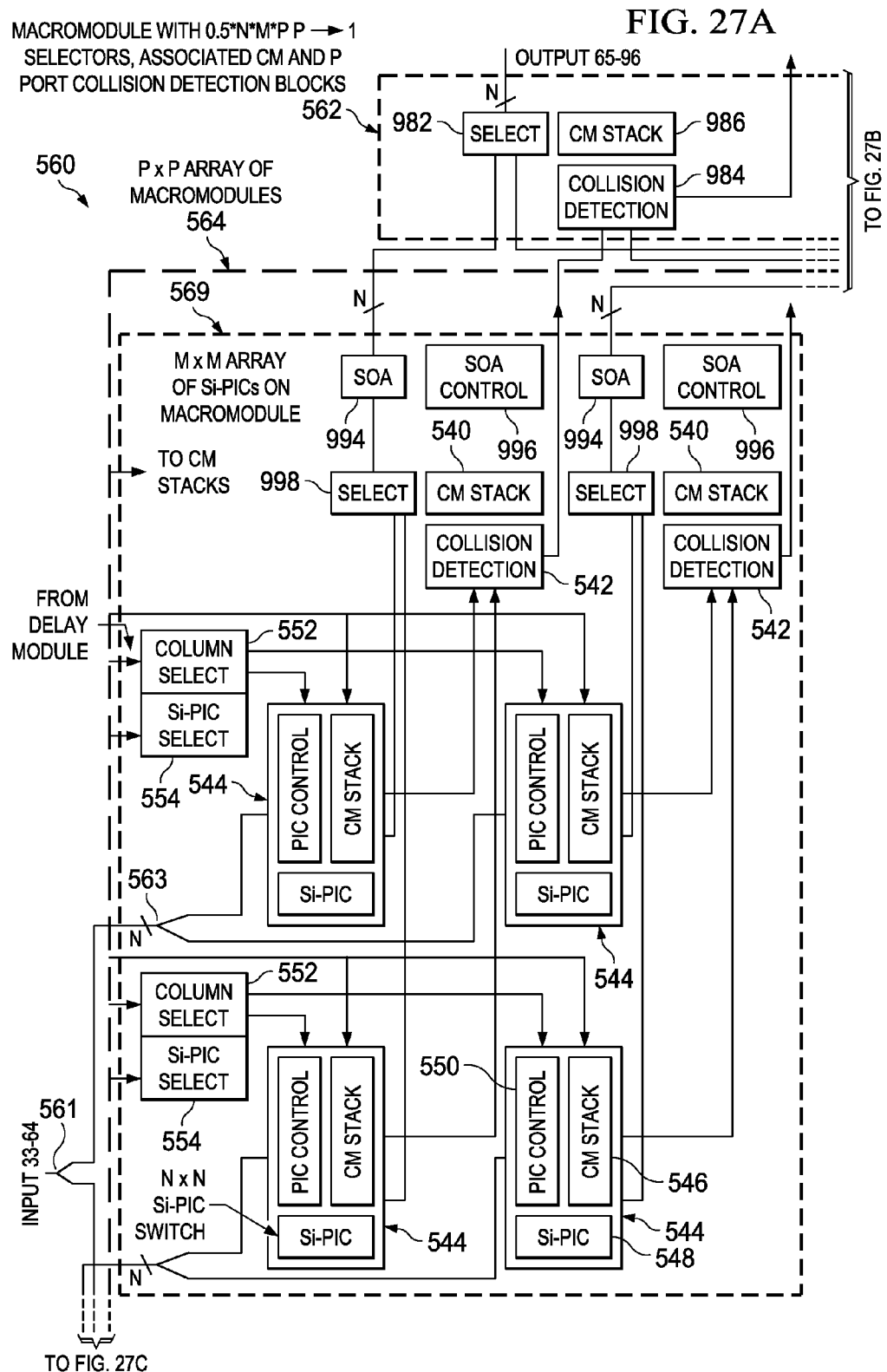
FIGS. 27A-D illustrates an additional embodiment photonic switch.
Figure 27B:
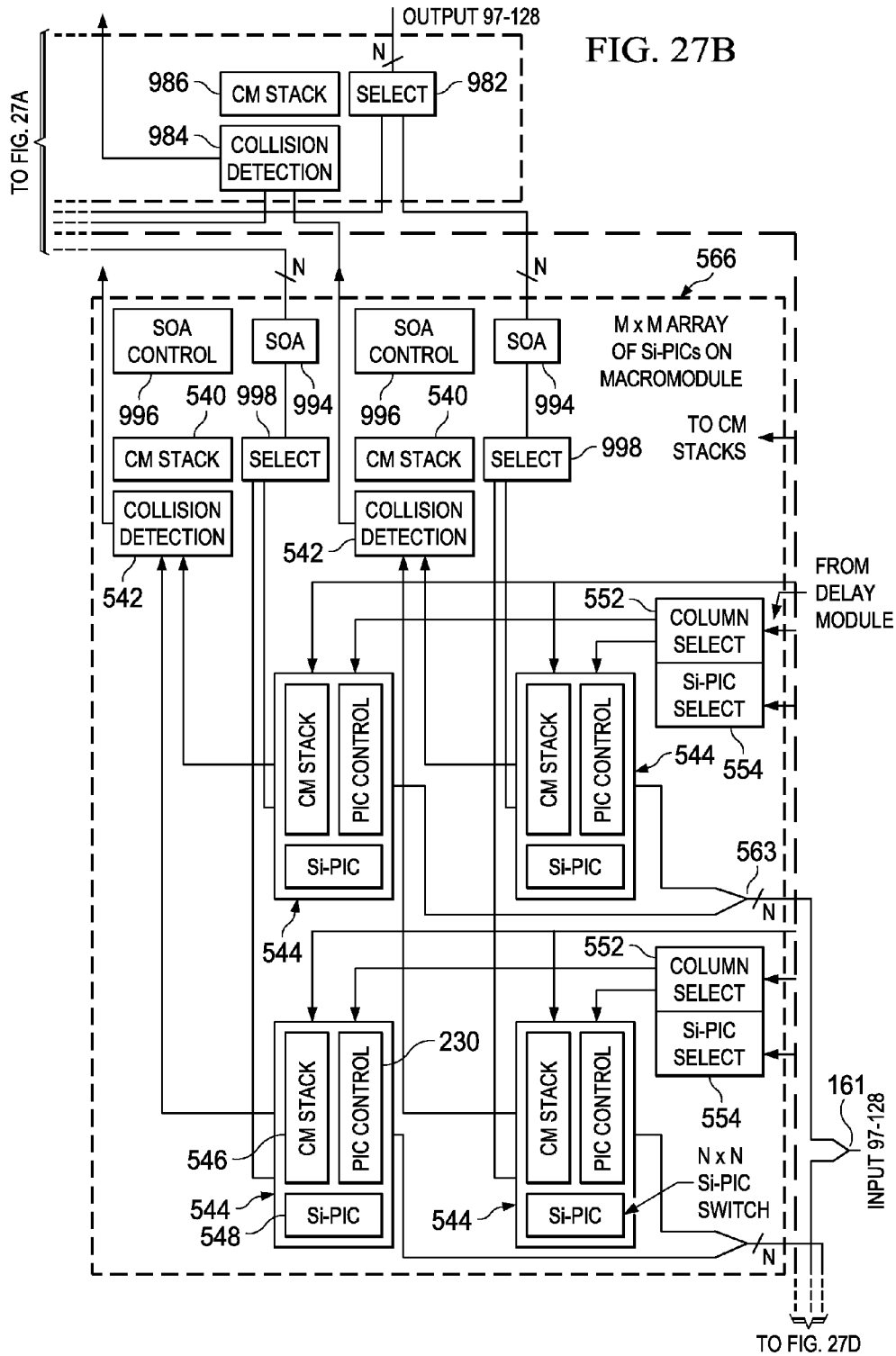
Figure 27C:
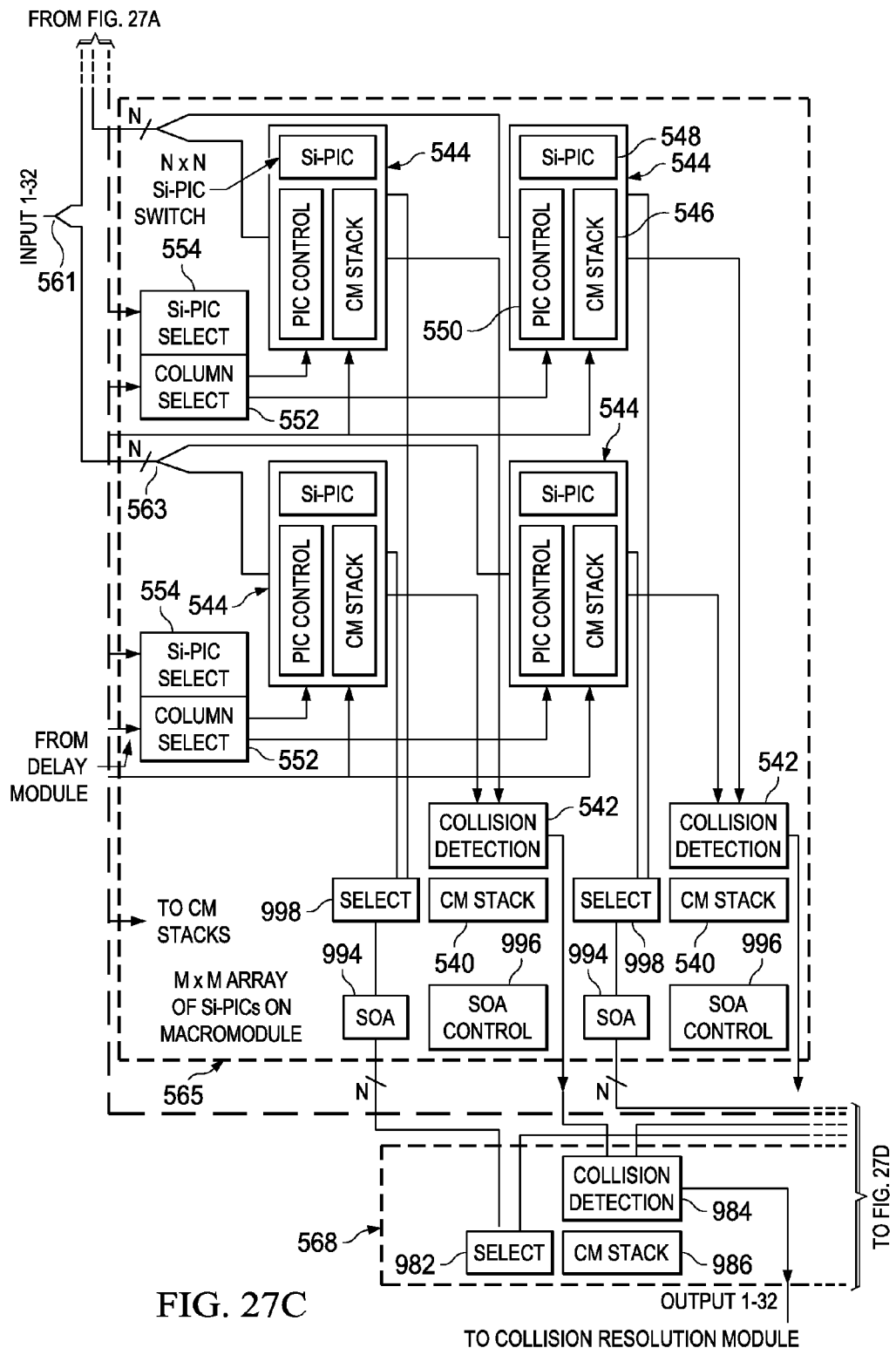
Figure 27D:
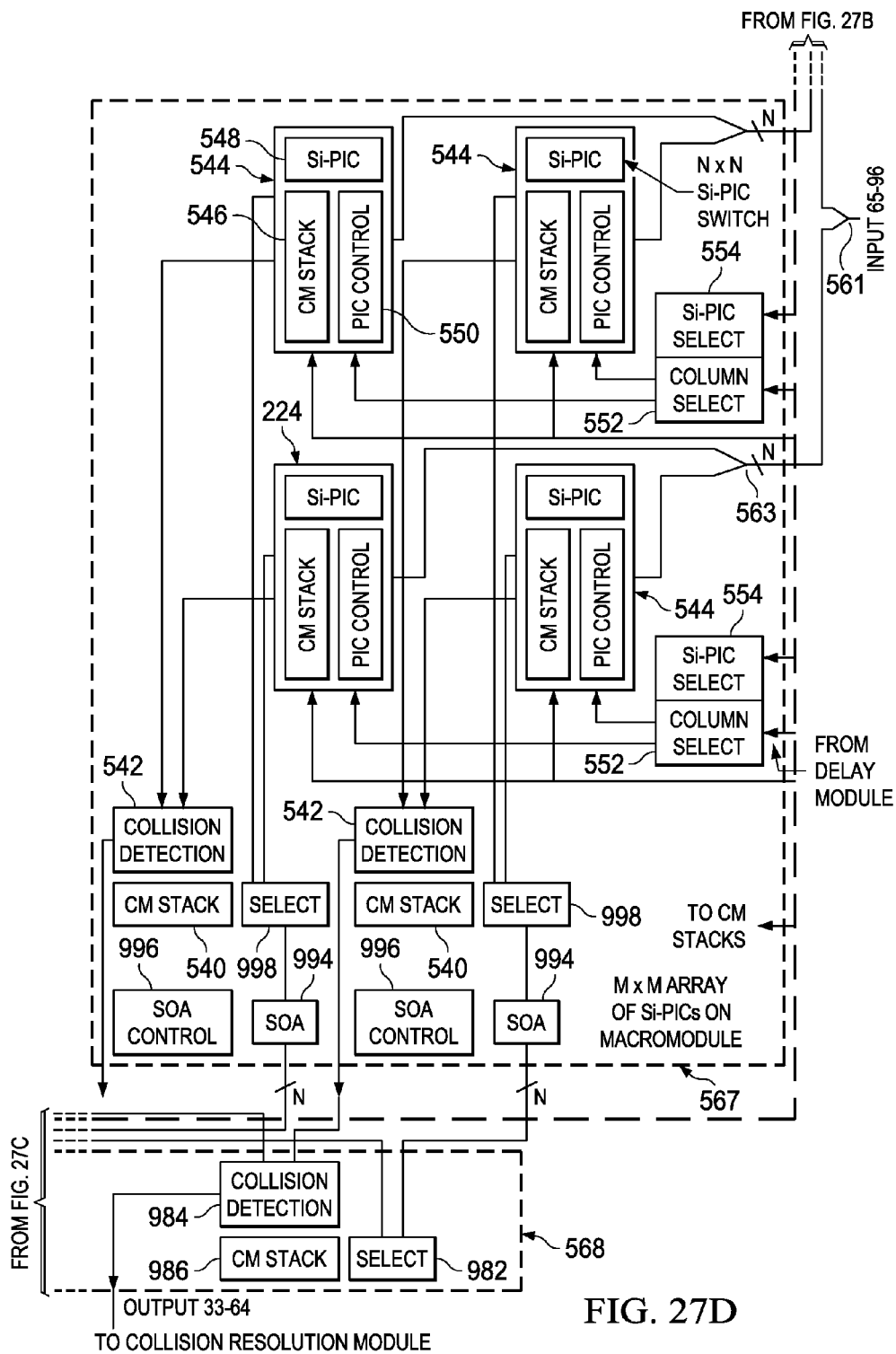

FIG. 26 shows a matrix-based directly addressable photonic switching fabric 100 with integral output port contention resolution, which may be used as a short packet container photonic switch. Matrix switches have a capacity-squared complexity growth with increased matrixing, which may be managed by using macromodules.

A macromodule is a large area, relatively low resolution, passive photonic integrated substrate, formed by lithographic means and containing optical tracking and passive optical components which can carry and interconnect multiple PICs, for example multiple N×N silicon electro-optic switch PICs. Macromodules also provide a base for hybridizing other required components, such as semiconductor optical amplifiers (SOA), to offset the optical losses incurred by the complex optical functionality of the PICs and the losses due to power splitting the optical signal.

FIG. 26 illustrates an ultrafast photonic switching fabric 100. The speed (fast or ultra-fast) is determined by several factors, including the actual switching speed of the physical photonic cells once they are commanded to change state, and the speed at which new connection maps are generated and supplied to the switch in a synchronous space switching application. The switching speed is determined by the time it takes the photonic crosspoints to change state, which, for electro-optic Mach Zehnder based 2×2 or 1×2 crosspoints, is typically less than about 3 ns. The speed of supplying the connection maps (and hence the frame time) depends on the switching efficiency, and the complexity of generating large contention free connection maps across the ports, especially when the connection paths of the different inputs to the different outputs are interactive throughout the switch. For a large dilated Clos switch, the frame period is between about 100 ns and about 150 ns, which may result in under-filled containers at 100 Gb/s when those containers are carrying just a few short packets between a particular source and destination. This long frame time is related to the complexity of the connection processing even when using a series/parallel pipelined processing array.

Shorter frame times may be achieved by using the container destination addressing directly in a switch structure which has no path-to-path interactions besides output port blocking (because only one input can connect to any one output at any given time). Thus, it is desirable that each part of the switch topology is directly controlled by bits within the incoming destination binary address (and optionally the source address) without a complex address mapping computation. Such a switch may be controlled with short frame times, based on the data-link speed of the link providing the addresses and by the bandwidth efficiency. For a bandwidth efficiency of 90% and a physical cell switching time of about 1-3 ns, the frame time is 10 times the ICG, or about 10-30 ns. An example ultrafast switch switches at frame rates substantially faster than 100 ns. In some examples, a fast switch switches in the 100 ns to 1000 ns range.

Photonic switching fabric 100, shown in FIG. 26, has a photonic traffic switching plane, which switches short duration fixed length containers within input very high capacity (for example 40 Gb/s, 100 Gb/s, or higher) optical streams, and a connection request signaling reception and processing system, which contains a two stage contention detection and resolution system, with direct addressing of each section of the switching paths and a lack of internal interaction between the routing of each switch path.

Photonic traffic input data streams are applied to input groups 1 to P, where P=2 in FIG. 26. Each input group has N inputs from different sources, such as different TORs, with streams destined for different combinations of destinations. There are instances within each group of requests being made for the same destination, causing output contention within the group, and instances of different groups having simultaneous requests for the same output port, causing output contention.

These inputs are optically power-split by arrays of splitters 140 on input blocks 112 and 114, so copies of the inputs are fed to P macromodules 104, 106, 108, and 110, which are hybridized large area precision optical substrates with integrated monolithic optical passive components, optical tracking, and arrays of hybridized photonic and electronic components, including arrays of switch PIC matrices 126 and their corresponding controllers. The macromodules perform optical switching. The macromodules also include selector/output row collision detectors on combiners 124. On macromodules 104, the optical inputs are further optically power-split and fed in parallel into the inputs of a row of M switch matrix PICs, each of which has N inputs and N outputs, and receives optical feeds from N input optical data streams. The optical signal to be switched is then only switched by one of the M PICs.

The M×M PICs of the array of PICs on the macromodule also form columns, which may be associated with sub-groups of outputs. The N×N PIC in each row which interfaces into each output column has outputs delivered to an on-macromodule combiner 124, which selects one of the columns to connect to the macromodule optical output for each port of that sub-group, so a PIC will not over-write the output data of another PIC. The output of the on-macromodule output combiner 124 is combined with the outputs of the other P-1 macromodules feeding that output group by combiner 122, which is a port-by-port optical selector switch located on macromodule 118 and macromodule 102. By splitting the inputs over a P×P array of macromodules, each of which carries an M×M array of N×N PIC matrices an (N*M*P)×(N*M*P) ultra-fast directly addressable photonic switch fabric switching path.

The signaling request inputs from the sub-groups of sources, for example TORs, are converted from serial to parallel by serial-to-parallel (S/P) converter 142.

During this conversion process, a collision detection module 144 detects the presence within each sub-group of contending requests for the same output port in the same frame period, which would cause an output collision. The contention resolution algorithm associated with the contention detection block causes all but one of the contending requests to be blocked, and only one selected request is gated out of the address bus. Blocked connection requests are notified to the collision detection/resolution messaging block 152 in module 116.

The address sub-groups, each of which is now a contention resolved address bus carrying the N addresses of one row of PICs on the macromodule, are fed to the macromodule and the PICs on that macromodule. Part of the destination address is used to enable one of the P macromodules, part of the destination address is used to enable one of the M PICs in the associated row on that macromodule, and part of the destination address is used to address the connection in the PICs. For example, when P=2, M=4, and N=32, one bit is used to address the macromodule to be enabled, 2 bits are used to address the PIC to be enabled, and 5 bits are used to select the PIC output port to connect to a given input port, where there are N=32 instantiations of this address word per frame per PIC-row. The PIC address information is passed to the combiner 124, an on-macromodule combiner, which uses this information to select the PIC row to connect to the associated column outputs. Contention detection and resolution module 120 is associated with combiner 124 to resolve contention when two PIC rows request an output on the same output port in the same frame. Contention detection and resolution module 120 operates similarly to collision detection module 144.

Thus, the selected switched photonic output is passed via combiner 124 to combiner 122, while connection request(s) are sent to the collision detection/resolution messaging block 152 in module 116. The inter-macromodule combiner uses the macromodule enable address portion of the address to detect when two or more incoming optical feeds from the macromodules within the group contain contending output port requests. All but one of the requests are rejected, and a message is passed to the collision detection/resolution messaging block 152 in module 116. At the end of the switching cycle for a frame, the collision detection/resolution messaging block 152 in module 116 signals an ACK to each source which has been successfully switched and a NACK to each source which has been blocked. This leads to a fully contention resolved switch with retransmission of colliding packets.

FIGS. 27A-D illustrates an example photonic switching module using a similar multi-macromodule structure with a macromodule capacity gain of 2, active switched output selection, and output contention resolution. Photonic switch fabric 560 provides a scalable, fast, and directly controlled photonic switching structure which may be controlled by direct addressing and distributed contention resolution. In photonic switch fabric 560, an array of four macromodules 565, 566, 567, and 569 is shown. However, a P×P array of any size can be used. The inputs are split by power splitters 561 before reaching the macromodule, and again by power splitters 563 on the macromodules. Each macromodule includes four PIC nodes 544, where a PIC node contains PIC 548, CM stack 546, and PIC controller 550. Each macromodule also contains a set of selectors in the rows, with PIC selector 554 and column selector 552. Also, each macromodule contains a set of column collision detectors for each row, for example output block contention detection and resolution 995, containing collision detector 542, CM stack 540, and output selector 998. Also on the macromodules, for each output of each column, there is an SOA 994, which is part of an SOA array, and is controlled by an SOA controller 996.

The CM stack then immediately writes an in-sequence list of the output port addresses to be used in a particular frame to the column collision detectors 984, which identify when more than one PIC attempts to select the same output port in the same frame. The collision information is sent to the contention resolution block, which gates the rejected connections and generates rejection information for the collision detection resolution messaging block. Output block 568 and output block 562 each contain half of the N*M*P selectors 982, along with associated CM stack 986 and P port collision detection blocks 984. The NACKs and source addresses from both levels of collision detection are consolidated to override provisional ACKs. Contention is resolved between outputs of contending macromodules. Once the contention is resolved, the surviving addresses are written to the CM stack 540 associated with the appropriate output selectors 998.

Additional details an ultrafast photonic switch are further discussed in U.S. patent application Ser. No. 14/710,815.

Figure 28:
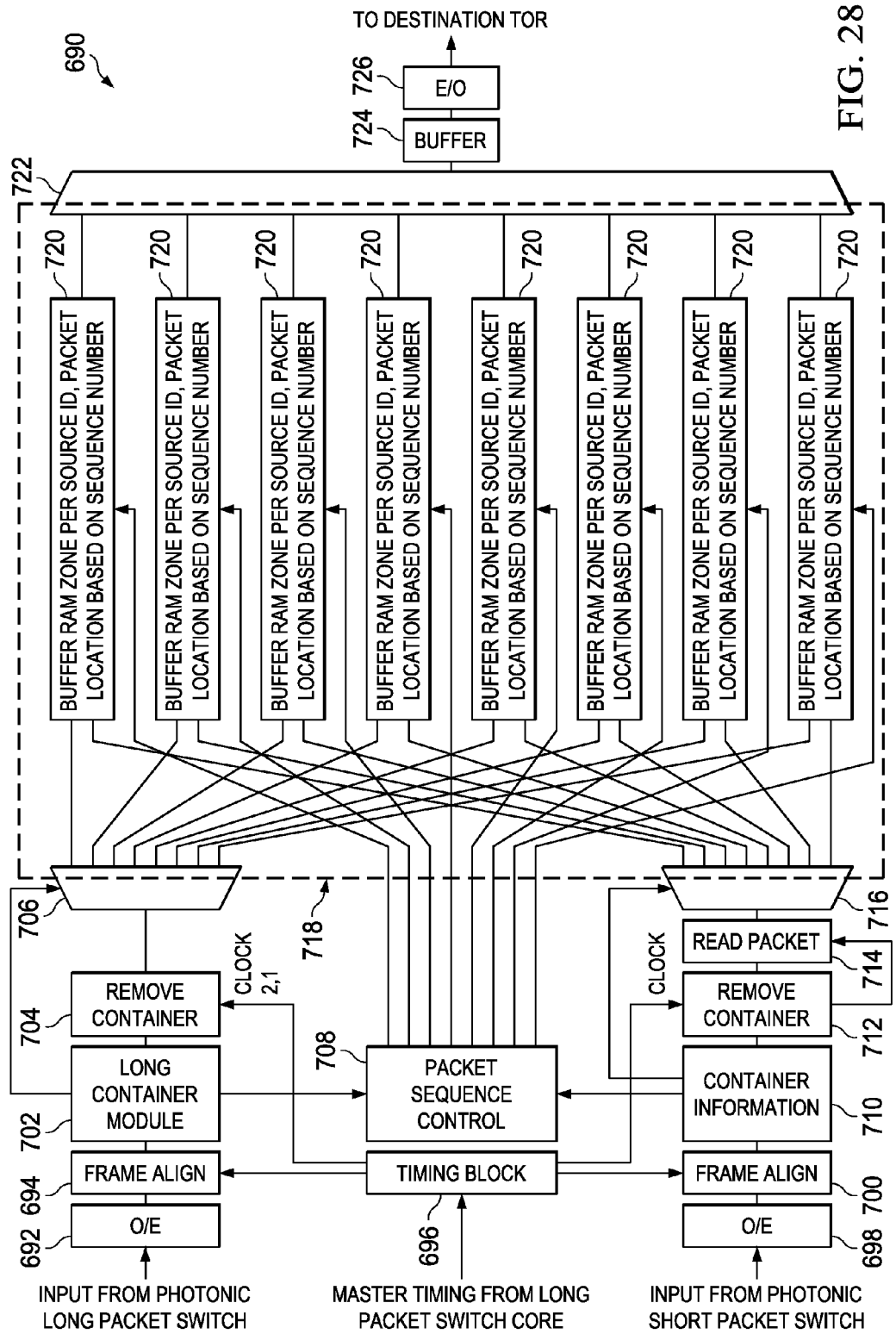
FIG. 28 illustrates an embodiment packet combiner.

FIG. 28 illustrates packet combiner 690. The packet combiner reintegrates the long and short packets of each source TOR's packet flow to the specific destination TOR into a packet sequence integral stream, where the sequence of each packet in each flow of the packets in an output packet stream is the same as the packet sequence of each of the flows at the packet splitter inputs. Thus, the packet flow between TORs has the same packet sequence at the destination TOR and the source TOR. The packet combiner also de-containerizes the packets and returns them to the base TOR clock rate by decelerating the packets. The functionality of the packet combiner may be implemented in hardware, software, or a combination of hardware and software, for example with software and a large fast memory. The packet combiner may be integrated into a TOR or may be a standalone device.

The switched long packet photonic stream is received and converted from an optical stream to an electrical stream by O/E converter 692.

The long packet stream is fed into frame aligner 694. In the frame aligner, the incoming container frame start is detected, and its timing is adjusted to be aligned with the internal timing of the packet combiner. The timing is obtained in timing block 696 from the master timing from the long packet switch core.

Information is extracted from the long container in long container module 702. The container CRC is checked for correct reception. The source TOR address and the sequence number of the packet payload are read and passed to demultiplexer/routing switch 706. Also, the sequence number and source TOR number are passed to packet sequence controller 708.

Demultiplexer/routing switch 706 establishes a connection to a memory zone specific to that source address and a routing to a specific location in that memory zone.

Meanwhile, the container is stripped by remove container module 704. The packet is also decelerated to the destination TOR clock rate, which is derived from timing block 696. The packet is then written into the selected location in memory 718 by demultiplexer/routing switch 706. When a new source address starts streaming, a new zone is created.

A short packet container stream is received, and converted from an optical stream to an electrical stream by O/E converter 698.

The short packet containers are frame aligned in frame aligner 700 based on timing information from timing block 696 based on master timing from the long packet switch core.

The container information is extracted by container information block 710. The source TOR and destination TOR addresses are read, and passed to demultiplexer/routing switch 706 and to packet sequence controller 708.

The container is then removed by remove container module 712. The small packets are extracted from the container. The packets are read, using the pointers to fragment the payload into individual short packets with packet-specific sequence numbers and source addresses, in read packet module 714. The packets are passed to demultiplexer/routing switch 716.

A connection is set up to route the packet to the specific memory zone 720 in memory 718 for its sequence number and source TOR. The routing is performed by packet sequence controller 708, which also creates new zones in the memory as needed, and may remove dormant zones.

Packet sequence controller 708 builds up a table or list of the sequences in the source packet streams. Then, it causes the packets associated with completed sequences of sequence numbers to be read out in order of the sequence number, resulting in them being read out in the same order as they were originally received in the source TORs.

The packet streams are statistically multiplexed by statistical multiplexer 722.

Then the packet streams are stored in buffer 724, which performs rate smoothing.

Finally, the packet streams are read out from buffer 724, and converted from electrical streams to optical streams by E/O converter 726. The optical streams are directed to the destination TOR.

Figure 29:
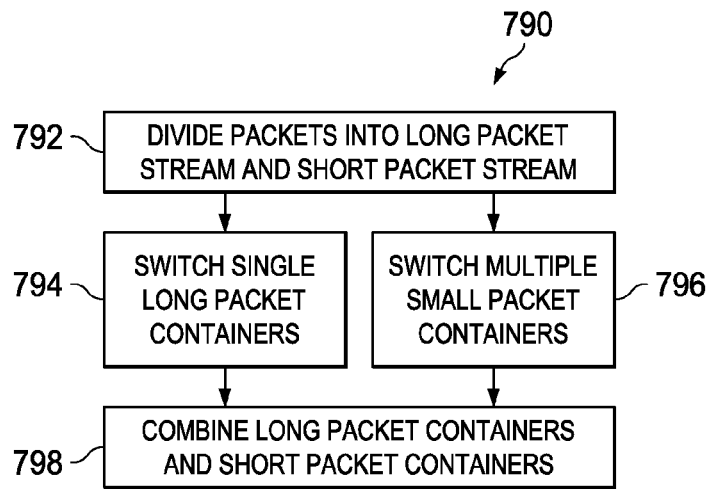
FIG. 29 illustrates a flowchart of an embodiment method of photonic packet switching.

FIG. 29 illustrates flowchart 790 for a method of switching single long-packet containers by one photonic switch and multiple short-packet containers by another photonic switch. Initially, in step 792, the incoming packet stream is separated into a long packet container stream and a short packet container stream. The long packet containers have a single long packet as a payload, and include information for reassembling the packet streams at the destination. The short packet containers may have multiple packets in the payload. The short packet containers also contain information for reassembling the packet streams at the destination. In one example, the short packet containers are shorter than the long packet containers. Alternatively, the short packet containers may be the same size as the long packet containers, or longer.

In step 794, the long packet containers are switched by a photonic switch. The long packet containers are directed to the appropriate destination TOR. The long packet photonic switch may be a three stage Clos switch, a matrixed switch, or another large photonic switch.

In step 796, the short packet containers are switched by another photonic switch to the destination TOR. In one example, the short packet photonic switch is similar to the long packet photonic switch. Alternatively, the short packet photonic switch may be an ultra-fast photonic switch which switches shorter containers.

Finally, in step 798, the long packet container stream is combined with the short packet container stream. The packets are removed from the containers, and reassembled in the same sequence as they entered the packet splitter.

Figure 30:
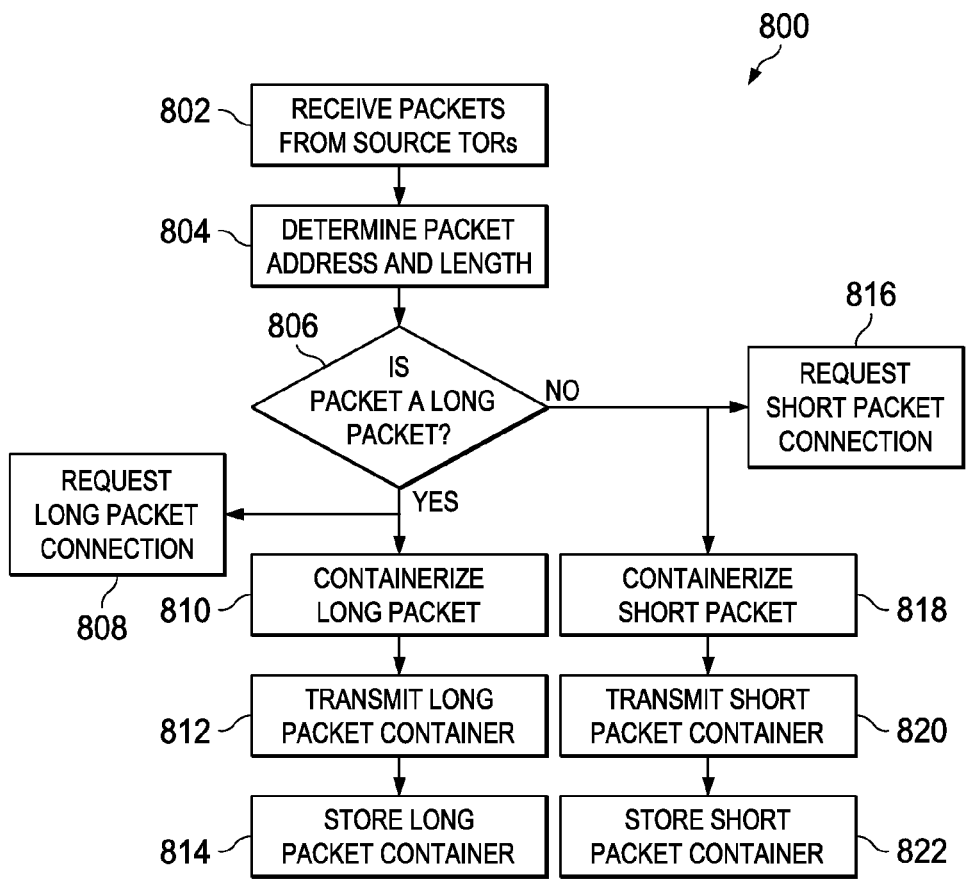
FIG. 30 illustrates a flowchart of an embodiment method of splitting long packets and short packets.

FIG. 30 illustrates flowchart 800 for a method of separating long packets and short packets into separate containers. Initially, in step 802, packets are received. In one example, the packet splitter is a part of the source TOR, and the packets are received from other portions of the source TOR. Alternatively, the packet splitter may be a separate device that receives the packets from the source TOR.

Next, in step 804 the source TOR address, destination TOR address, and packet length are determined. The packet length may be determined by measuring the packet. The packet address and length may be known, for example when the packet splitter is integrated in a source TOR. In other examples, the source TOR address and/or destination TOR address can be extracted from the packet.

Then, in step 806, the packet splitter determines whether the packet is a long packet or a short packet. The packet length is compared to a threshold, which may be static or dynamic. For packets with a maximum length of 1500 bytes, the threshold may be between about 400 bytes and about 1000 bytes. When the packet is shorter than or equal to the threshold it is determined to be a short packet, and when it is longer than the threshold it is determined to be a long packet. When the packet is a long packet, the packet splitter proceeds to steps 808 and 810. When the packet is a short packet, the packet splitter proceeds to steps 816 and 818.

In step 808, the packet splitter requests a long packet connection from a long packet photonic switch controller in the long packet photonic switch for a future timeslot. The connection request may be an optical signal to the long packet photonic switch controller.

Meanwhile, in step 810, the packet is placed in a long packet container. The packet is padded to a predetermined size, for example 1500 bytes. A header and footer are added to the container. The header and/or footer contain the source TOR address, destination TOR address, and sequence number for reassembly of the packet stream at the destination TOR. The header and/or footer may include other information, such as a CRC check and an indicator of the amount of padding added. Also, the clock rate of the container is accelerated.

Then, in step 812, the long packet container is transmitted to the long packet photonic switch for switching to the destination TOR. The packet splitter waits sufficient time for the connection to be set up in the long packet splitter, but does not necessarily wait for a NACK or ACK, before transmitting the long packet container.

Also, in step 814, the packet splitter stores the long packet container. The stored long packet container may later be used for retransmission.

In step 816, the packet splitter requests a connection in the short packet photonic switch. An optical connection request may be transmitted to the short packet photonic switch controller. A connection is requested when the first small packet is added to a container. For subsequent small packets to the same destination in the same container, it is not necessary to request another connection, because the connection for the container has already been requested.

Meanwhile, in step 818, the short packet is placed in a short packet container. The short packet container may or may not be the same size as the long packet container. In one example, the short packet container may be the maximum length for a short packet. Multiple short packets may be placed in a container. The packet splitter determines whether there is already an open container for the destination TOR. When there is already an open container for the destination TOR, the packet is added to that container. When there is not an open container, a new container is created, and the packet is placed in the container. Headers and/or footers are added to the container. The payload data may include the sequence number for the packets in the container. The container header and/or footer may include the source TOR address, the destination TOR address, a CRC check, indicators of the demarcation between packets in the container, and pointers to the packet boundaries. Also, the clock rate of the container may be accelerated.

In step 820, the short packet container is transmitted to the short packet photonic switch. When the timeout period expires, or when the container is full, the container is closed and transmitted. The container may be determined to be full when the next packet to the same destination TOR does not have sufficient room in the container payload. Before transmission of the short packet, there is sufficient time for the connection to be set up, but not necessarily sufficient time for an ACK or a NACK to be received.

In step 822, the short packet container is stored, so it can be retransmitted if a NACK is received.

FIG. 31 illustrates flowchart 870 for a method of containerizing long packets. Initially, in step 872, the long packets are padded out to a fixed length. When the packet is already at the maximum packet length, it may not receive additional padding. Alternatively, all packets may receive padding. In one example, the packets are padded to a maximum packet size, for example to 1500 bytes.

In step 874, the padded packet is containerized. A header and/or footer are added to a container, and the padded packet is added as the payload of the container. The header and/or footer may include a sequence number for the packet, the address of the source TOR, the address of the destination TOR, an indicator of the amount of padding, or other information, such as a CRC check, preamble, or end sequence.

In step 876, the clock rate of the container is accelerated. This may be achieved by writing the container into a buffer at an input clock rate, and reading it out at an output clock rate, where the output clock rate is higher than the input clock rate. The buffer may tend towards underflow. When underflow occurs, a dummy container may be written to the buffer, and read out. There may be one buffering step, or two separate buffering steps, one performing the acceleration, and the other controlling delay.

Then, in step 880, the container is transmitted to the long packet photonic switch. The clock rate timing of the container transmission is controlled so it arrives at the long packet photonic switch at the appropriate time. Output clocking may be used to control the timing. Also, timing control information received from the long packet photonic switch controller may be used to control the timing further.

FIG. 32 illustrates flowchart 890 for a method of containerizing small packets.

Initially, in step 912, the containerizer determines whether there is a new short packet. When there is not a new short packet, the system proceeds to step 910. When there is a new short packet, the containerizer proceeds to step 896.

In step 896, the containerizer determines whether there is an open container for the same destination TOR as the new packet. When there is not an open container, the containerizer proceeds to step 902. When there is an open container, the containerizer proceeds to step 904.

In step 902, the containerizer opens a new container. Also, the containerizer may start a timer. If the timer expires before the container is full, the container will be transmitted irrespective of fill.

In step 904, the packet splitter determines whether there the open container is full. The open container is full when there is not sufficient room in the container payload for the new packet. When the container is not full, the packet is added to the container in step 908, and the containerizer proceeds to step 912 to wait for new packets. When the container is full, the containerizer opens a new container in step 902. Also, when the container is full, the containerizer proceeds to step 892.

In step 910, the containerizer determines whether a timeout has occurred. For example, a timeout occurs a fixed period of time after a new container has been opened. The fixed period may be 5 µs, 1 µs, or another value. When the timeout has not occurred, the containerizer returns to step 912 to wait for a new packet. When a timeout has occurred, the containerizer proceeds to step 892.

In step 892, the containerizer containerizes the packets. The packets are loaded into the payload, along with their sequence number. A header and/or footer are added to the container. The header and/or footer may include pointers to the packet boundaries in the payload, an indicator of the size of the pointer field, the source TOR address, and the destination TOR address. The header and/or footer may also include a CRC check, a preamble, and/or an end sequence.

In step 894, the clock rate of the container is accelerated. This may be done, for example, by writing the container into a buffer at an input clock rate, and reading the container out of the buffer at an output clock rate, where the output clock rate is greater than the input clock rate. The buffer may tend towards underflow. When underflow occurs, a dummy container may be written to the buffer, and read out.

Finally, in step 898, the container is transmitted to the short packet photonic switch. The clock rate timing of the container transmission is controlled so it arrives at the short packet photonic switch at the correct time. Output clocking may be used to control the timing. Also, timing control information received from the long packet photonic switch controller may be used to control the timing further.

Figure 33:
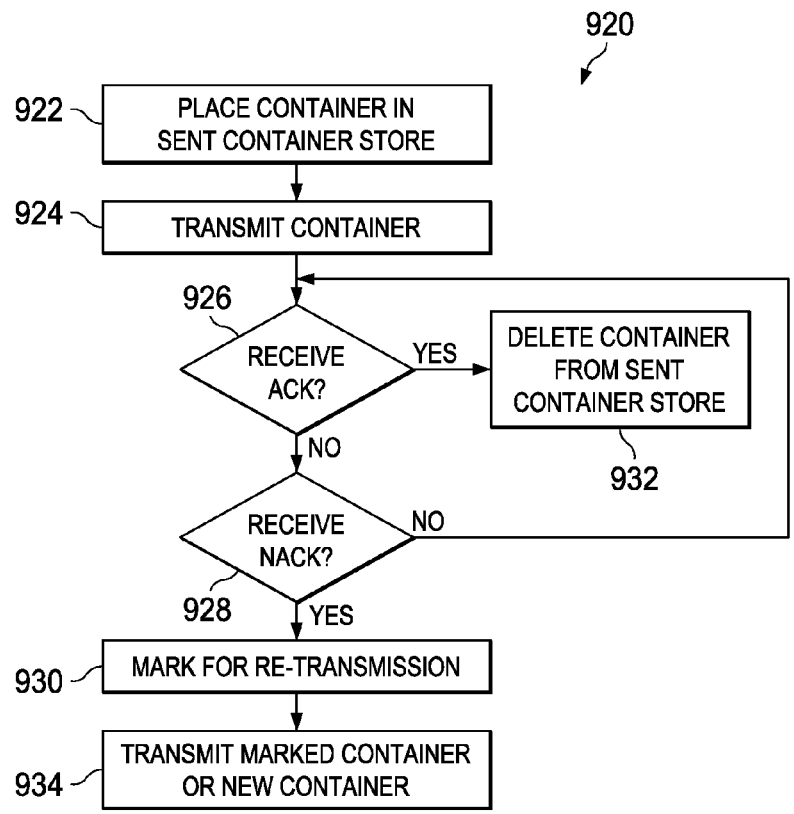
FIG. 33 illustrates a flowchart of an embodiment method of contention control.

FIG. 33 illustrates flowchart 920 for a method of contention resolution performed by a packet splitter. The method may be used for long packet containers, short packet containers, and/or for a single container type. Initially, in step 922, a container is stored in a sent container store.

In step 924, the container is transmitted to a photonic switch for switching. The container may be transmitted to a long packet photonic switch, a short packet photonic switch, or another photonic switch. The system may receive an ACK and/or NACK before or after transmitting the container.

In step 926, the system determines whether it has received an ACK from the photonic switch. When the system receives an ACK, it proceeds to step 932 to delete the container from the sent container store or mark it for deletion. When the system does not receive an ACK, it proceeds to step 928.

In step 928, the system determines whether it has received a NACK. When the system has not received a NACK, it proceeds to step 926 to continue waiting to receive an ACK or a NACK. When the peripheral receives a NACK, it proceeds to step 930 to mark the container for retransmission.

Finally, in step 934, the system retransmits the container. In one example, new containers have priority over retransmitted containers. Alternatively, retransmitted containers may have priority over new containers. In an example, new containers generally have priority over retransmitted containers, but retransmitted containers have priority over new containers when a retransmitted container has been waiting for a predetermined period of time. Retransmitted containers may have priority over new dummy containers.

Figure 34:
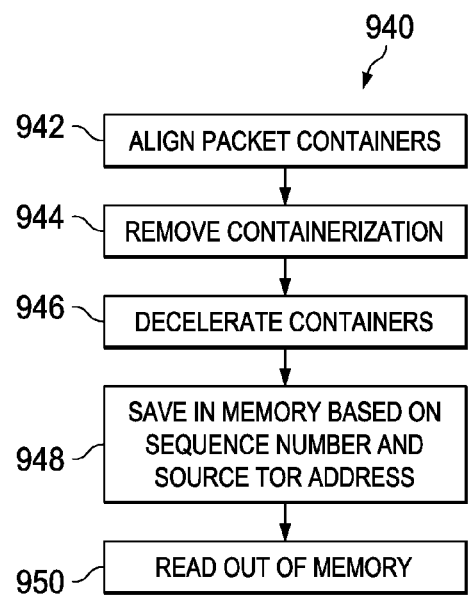
FIG. 34 illustrates a flowchart of an embodiment method of combining short and long packets.

FIG. 34 illustrates flowchart 940 for a method of combining packet streams, for example a short packet stream and a long packet stream. Packets of a stream of long packets may be combined with packets of a stream of short packets in a packet combiner. In one example, the packet combiner is integrated in a destination TOR. Alternatively, the packet combiner may be a standalone device. The packets may be combined to re-establish the original packet order from the source TOR.

Initially, in step 942, the packet containers are aligned. The short packet containers and long packet containers may both be aligned. Master timing from the long packet photonic switch, or from another source, such as the short packet photonic switch, may be used to align the packet containers.

Next, in step 944, the containerization is removed. For long packet containers, the header and/or footer are removed. For short packet containers, the header and/or footer are removed, and the short packets are unpacked from the payload. In one example, for a short packet container, pointers to the packet boundaries are used to read out the packets, along with their corresponding sequence number.

In step 946, the containers are decelerated. The containers may be read into a buffer at a first clock rate, and read out at a second clock rate, where the second clock rate is lower than the first clock rate. The decelerated packets may have the same clock rate that they originally had before acceleration in the packet splitter.

Then, in step 948, the packets are stored in memory. The stored packets are organized by source TOR and sequence number. For example, for each source TOR, the packets are stored in the order of their source number.

Finally, in step 950, the packets are read out of the memory in source number order. Thus, the packets are restored to their original order. Also, missing packets may be detected, when there is no packet in the memory for a given sequence number. When a packet is missing, the packet combiner may request that the missing packet be retransmitted by the packet combiner.

An embodiment method includes obtaining a first packet, where the first packet has a length and comparing the length of the first packet to a length threshold. The method also includes when the length of the first packet is greater than or equal to the length threshold, placing the first packet in a long packet container and transmitting the long packet container to a first photonic switch and when the length of the first packet is less than the length threshold, placing the first packet in a first short packet container and transmitting the first short packet container to a second photonic switch.

In one embodiment the first short packet container further contains a second packet. In another embodiment, the method includes receiving an input and adjusting the length threshold in accordance with the input. In an additional embodiment, the first short packet container has a first container length, where the long packet container has a second container length, and where the first container length is less than the second container length. In one embodiment, the first container length is less than 500 bytes. Another embodiment also includes receiving a timing control message from the second photonic switch and adjusting timing for transmitting the long packet container in accordance with the timing control message. An embodiment also includes receiving a timing control message from the first photonic switch and adjusting timing for transmitting the first short packet container in accordance with the timing control message. An additional embodiment includes assigning a first sequence number to the first packet in accordance with a first destination of the first packet, obtaining a second packet after obtaining the first packet, assigning a second sequence number to the second packet in accordance with a second destination of the second packet and not based on the first sequence number, obtaining a third packet after obtaining the second packet, where the third packet is destined for the first destination, and assigning a third sequence number to the third packet in accordance with the first sequence number. An additional embodiment includes adding a header to the long packet container. The method may also include a source top-of-rack switch (TOR) address of the first packet, a destination TOR address of the first packet, a padding length indicator, and a sequence number. Another embodiment method also includes adding a header to the first short packet container. In this embodiment method, a container includes a header including a source TOR address of the first packet, a destination TOR address of the first packet, and a pointer corresponding to a boundary of the first packet, and a payload including the first packet and a sequence number for the first packet. In an embodiment method, transmitting the first short packet container includes transmitting the first short packet container in accordance with a timer. In an additional embodiment, transmitting the first short packet container includes obtaining a second packet and determining whether the first short packet container has sufficient room for the second packet, where transmitting the first short packet container includes transmitting the short packet container when determining that the first short packet container does not have sufficient room for the second packet. Another embodiment method includes obtaining a second packet, determining whether a payload of the first short packet container has sufficient available space for the second packet, adding the second packet to the first short packet container when the payload of the first short packet container has sufficient available space for the second packet, and creating a second short packet container including placing the second packet in the second short packet container when the payload of the first short packet container does not have sufficient available space for the second packet. An embodiment method also includes storing the first short packet container to produce a stored short packet container, receiving a negative acknowledgment message corresponding to the first short packet container, and transmitting the stored short packet container to the first photonic switch in response to receiving the negative acknowledgment message.

An embodiment method includes receiving, from a first photonic switch, a short packet container and extracting a first packet from the short packet container. The method also includes receiving, from a second photonic switch, a long packet container and extracting a second packet from the long packet container. Additionally, the method includes combining the first packet and the second packet to produce a packet stream.

In an embodiment method, the short packet container originates from a top-of-rack switch (TOR), and where the long packet container originates from the same TOR switch. This method may also include storing the first packet in a first region of a memory in accordance with the TOR and a first sequence number of the first packet, storing the second packet in a second region of the memory in accordance with the TOR and a second sequence number of the second packet, and reading from the memory in sequence number order for the TOR. An embodiment method also includes receiving a timing signal from the second photonic switch and aligning the short packet container in accordance with the timing signal. In another embodiment method, combining the first packet and the second packet includes determining a first sequence number of the first packet, determining a second sequence number of the second packet, and placing the first packet in the packet stream immediately before the second packet when the first sequence number is immediately before the second sequence number. An embodiment method also includes reading a header of the long packet container, where the header includes a destination address, a source address, and a padding length indicator and removing padding from the first packet in accordance with the padding length indicator. In another embodiment method, the short packet container includes a first pointer corresponding to the first packet, where extracting the first packet from the short packet container includes extracting the first packet from the short packet container in accordance with the first pointer. In this embodiment method, the short packet container may further include a third packet and a second pointer corresponding to the third packet, and where the method further includes extracting the third packet in accordance with the second pointer. In an embodiment method, the long packet container is longer than the short packet container.

An embodiment system includes a packet splitter configured to receive an input packet stream and split the input packet stream into a first subset of packets in a short packet stream and a second subset of packets in a long packet stream, where packets of the short packet stream have lengths less than a length threshold and packets of the long packet stream have lengths greater than or equal to the length threshold. The system also includes a first photonic switch optically coupled to the packet splitter, where the first photonic switch is configured to switch the short packet stream and a second photonic switch optically coupled to the packet splitter, where the second photonic switch is configured to switch the long packet stream.

An embodiment system also includes a packet combiner optically coupled to the first photonic switch and the second photonic switch, where the packet combiner is configured to receive a switched short packet stream from the first photonic switch, receive a switched long packet stream from the second photonic switch, and combine the switched short packet stream and the switched long packet stream. In another embodiment, the first photonic switch is a first framed photonic switch having a first frame time, where the second photonic switch is a second framed photonic switch having a second frame time, and where the second frame time is longer than the first frame time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   obtaining a first packet, wherein the first packet has a length;
   comparing the length of the first packet to a length threshold;
   in response to the length of the first packet being greater than or equal to the length threshold, placing the first packet in a long packet container and transmitting the long packet container to a first photonic switch; and
   in response to the length of the first packet being less than the length threshold, placing the first packet in a first short packet container and transmitting the first short packet container to a second photonic switch switching in parallel with the first photonic switch.

2. The method of claim 1, wherein the first short packet container further contains a second packet.

3. The method of claim 1, further comprising:
   receiving an input; and
   adjusting the length threshold in accordance with the input.

4. The method of claim 1, wherein the first short packet container has a first container length, wherein the long packet container has a second container length, and wherein the first container length is less than the second container length.

5. The method of claim 4, wherein the first container length is less than 500 bytes.

6. The method of claim 1, further comprising:
receiving a timing control message from the second photonic switch; and
adjusting timing for transmitting the long packet container in accordance with the timing control message.

7. The method of claim 1, further comprising:
receiving a timing control message from the first photonic switch; and
adjusting timing for transmitting the first short packet container in accordance with the timing control message.

8. The method of claim 1, further comprising:
assigning a first sequence number to the first packet in accordance with a first destination of the first packet;
obtaining a second packet after obtaining the first packet;
assigning a second sequence number to the second packet in accordance with a second destination of the second packet and not based on the first sequence number;
obtaining a third packet after obtaining the second packet, wherein the third packet is destined for the first destination; and
assigning a third sequence number to the third packet in accordance with the first sequence number.

9. The method of claim 1, further comprising adding a header to the long packet container.

10. The method of claim 9, wherein the header comprises:
a source top-of-rack switch (TOR) address of the first packet;
a destination TOR address of the first packet;
a padding length indicator; and
a sequence number.

11. The method of claim 1, further comprising adding a header to the first short packet container.

12. The method of claim 11, wherein a container comprises:
a header comprising:
a source TOR address of the first packet,
a destination TOR address of the first packet, and
a pointer corresponding to a boundary of the first packet; and
a payload comprising:
the first packet, and
a sequence number for the first packet.

13. The method of claim 1, wherein transmitting the first short packet container comprises transmitting the first short packet container in accordance with a timer.

14. The method of claim 1, wherein transmitting the first short packet container comprises:
obtaining a second packet; and
determining whether the first short packet container has sufficient room for the second packet, wherein transmitting the first short packet container comprises transmitting the short packet container in response to determining that the first short packet container does not have sufficient room for the second packet.

15. The method of claim 1, further comprising:
obtaining a second packet;
determining whether a payload of the first short packet container has sufficient available space for the second packet;
adding the second packet to the first short packet container in response to the payload of the first short packet container having sufficient available space for the second packet; and
creating a second short packet container comprising placing the second packet in the second short packet container in response to the payload of the first short packet container not having sufficient available space for the second packet.

16. The method of claim 1, further comprising:
storing the first short packet container to produce a stored short packet container;
receiving a negative acknowledgment message corresponding to a transmission of the first short packet container; and
transmitting the stored short packet container to the first photonic switch in response to receiving the negative acknowledgment message.

17. A method comprising:
receiving, from a first photonic switch, a short packet container containing a first packet having a first length less than a length threshold;
extracting the first packet from the short packet container;
receiving, from a second photonic switch switching in parallel with the first photonic switch, a long packet container containing a second packet having a second length greater than or equal to the length threshold;
extracting the second packet from the long packet container; and
combining the first packet and the second packet to produce a packet stream.

18. The method of claim 17, wherein the short packet container and the long packet container originate from a same top-of-rack switch (TOR).

19. The method of claim 18, further comprising:
storing the first packet in a first region of a memory in accordance with the TOR and a first sequence number of the first packet;
storing the second packet in a second region of the memory in accordance with the TOR and a second sequence number of the second packet; and
reading from the memory in sequence number order for the TOR.

20. The method of claim 17, further comprising:
receiving a timing signal from the second photonic switch; and
aligning the short packet container in accordance with the timing signal.

21. The method of claim 17, wherein combining the first packet and the second packet comprises:
determining a first sequence number of the first packet;
determining a second sequence number of the second packet; and
placing the first packet in the packet stream immediately before the second packet in response to the first sequence number being immediately before the second sequence number.

22. The method of claim 17, further comprising:
reading a header of the long packet container, wherein the header comprises a destination address, a source address, and a padding length indicator; and
removing padding from the first packet in accordance with the padding length indicator.

23. The method of claim 17, wherein the short packet container comprises a first pointer corresponding to the first packet, wherein extracting the first packet from the short packet container comprises extracting the first packet from the short packet container in accordance with the first pointer.

24. The method of claim 23, wherein the short packet container further comprises a third packet and a second pointer corresponding to the third packet, and wherein the method further comprises extracting the third packet in accordance with the second pointer.

25. The method of claim 17, wherein the long packet container is longer than the short packet container.

26. A system comprising:
- a packet splitter configured to receive an input packet stream and split the input packet stream into a first subset of packets in a short packet stream and a second subset of packets in a long packet stream, wherein packets of the short packet stream have lengths less than a length threshold and packets of the long packet stream have lengths greater than or equal to the length threshold;
- a first photonic switch optically coupled to the packet splitter, wherein the first photonic switch is configured to switch the short packet stream;
- a second photonic switch optically coupled to the packet splitter, wherein the second photonic switch is configured to switch the long packet stream; and
- a packet combiner optically coupled to the first photonic switch and the second photonic switch such that the first and second photonic switches are coupled in parallel between the packet splitter and the packet combiner.

27. The system of claim 26, further comprising a packet combiner optically coupled to the first photonic switch and the second photonic switch, wherein the packet combiner is configured to receive a switched short packet stream from the first photonic switch, receive a switched long packet stream from the second photonic switch, and combine the switched short packet stream and the switched long packet stream.

28. The system of claim 26, wherein the first photonic switch is a first framed photonic switch having a first frame time, wherein the second photonic switch is a second framed photonic switch having a second frame time, and wherein the second frame time is longer than the first frame time.

* * * * *